United States Patent
Ishii et al.

(10) Patent No.: US 11,989,976 B2
(45) Date of Patent: *May 21, 2024

(54) NONVERBAL INFORMATION GENERATION APPARATUS, NONVERBAL INFORMATION GENERATION MODEL LEARNING APPARATUS, METHODS, AND PROGRAMS

(71) Applicant: NIPPON TELEGRAPH AND TELEPHONE CORPORATION, Tokyo (JP)

(72) Inventors: Ryo Ishii, Tokyo (JP); Ryuichiro Higashinaka, Tokyo (JP); Taichi Katayama, Tokyo (JP); Junji Tomita, Tokyo (JP); Nozomi Kobayashi, Tokyo (JP); Kyosuke Nishida, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 828 days.

This patent is subject to a terminal disclaimer.

(21) Appl. No.: 16/969,765

(22) PCT Filed: Feb. 15, 2019

(86) PCT No.: PCT/JP2019/005639
§ 371 (c)(1),
(2) Date: Aug. 13, 2020

(87) PCT Pub. No.: WO2019/160100
PCT Pub. Date: Aug. 22, 2019

(65) Prior Publication Data
US 2020/0401794 A1 Dec. 24, 2020

(30) Foreign Application Priority Data

Feb. 16, 2018 (JP) .................................. 2018-026516
Feb. 16, 2018 (JP) .................................. 2018-026517
(Continued)

(51) Int. Cl.
*G06V 40/20* (2022.01)
*G06N 20/00* (2019.01)
(Continued)

(52) U.S. Cl.
CPC ............. *G06V 40/28* (2022.01); *G06N 20/00* (2019.01); *G06V 40/10* (2022.01); *G10L 15/22* (2013.01); *G10L 2015/225* (2013.01)

(58) Field of Classification Search
CPC ...... G06V 40/28; G06V 40/10; G06V 40/107; G06V 40/174; G06N 20/00; G06N 20/10;
(Continued)

(56) References Cited

U.S. PATENT DOCUMENTS

| 5,990,878 A | 11/1999 | Ikeda et al. |
| 6,549,887 B1 * | 4/2003 | Ando ...................... G09B 5/02 704/271 |

(Continued)

FOREIGN PATENT DOCUMENTS

| JP | H08315185 A | 11/1996 |
| JP | 2001186430 A | 7/2001 |

(Continued)

OTHER PUBLICATIONS

Breitfuss et al, Automatic Generation of Non-verbal Behavior for Agents in Virtual Worlds: A System for Supporting Multimodal Conversations of Bots and Avatars, Online Communities and Social Computing. OCSC 2009. Lecture Notes in Computer Science, vol. 5621, Springer, 2009, pp. 153-161.

(Continued)

*Primary Examiner* — Mia M Thomas
(74) *Attorney, Agent, or Firm* — Harness, Dickey & Pierce, P.L.C.

(57) ABSTRACT

A nonverbal information generation apparatus includes a nonverbal information generation unit that generates time-information-stamped nonverbal information that corresponds to time-information-stamped text feature quantities on the basis of the time-information-stamped text feature quantities and a learned nonverbal information generation (Continued)

model. The time-information-stamped text feature quantities are configured to include feature quantities that have been extracted from text and time information representing times assigned to predetermined units of the text. The nonverbal information is information for controlling an expression unit that expresses behavior that corresponds to the text.

18 Claims, 39 Drawing Sheets

(30) Foreign Application Priority Data

| | | |
|---|---|---|
| May 21, 2018 | (JP) | 2018-097338 |
| May 21, 2018 | (JP) | 2018-097339 |
| Dec. 7, 2018 | (JP) | 2018-230310 |

(51) Int. Cl.
*G06V 40/10* (2022.01)
*G10L 15/22* (2006.01)

(58) Field of Classification Search
CPC ... G10L 15/22; G10L 2015/225; G10L 13/08; A63H 11/00; G06F 3/01; G06F 3/0481; G06F 3/16; G06T 13/40
See application file for complete search history.

(56) References Cited

U.S. PATENT DOCUMENTS

| | | | | |
|---|---|---|---|---|
| 6,657,628 | B1 | 12/2003 | Cook | |
| 9,582,080 | B1* | 2/2017 | Tilton | G06F 3/015 |
| 2010/0082345 | A1* | 4/2010 | Wang | G10L 13/00 |
| | | | | 704/E21.02 |
| 2014/0191939 | A1* | 7/2014 | Penn | G06F 3/015 |
| | | | | 345/156 |
| 2015/0042662 | A1* | 2/2015 | Latorre-Martinez | G10L 21/10 |
| | | | | 345/473 |
| 2017/0060828 | A1* | 3/2017 | Rainisto | G06F 40/169 |
| 2018/0004915 | A1* | 1/2018 | Talbot | G16H 50/20 |
| 2018/0166076 | A1* | 6/2018 | Higuchi | B25J 13/003 |
| 2019/0143527 | A1* | 5/2019 | Favis | G06N 3/008 |
| | | | | 700/264 |
| 2020/0074878 | A1* | 3/2020 | Hertsgaard | G09B 19/00 |
| 2020/0372915 | A1* | 11/2020 | Ishii | G10L 15/24 |
| 2021/0370519 | A1* | 12/2021 | Ishii | G10L 21/06 |

FOREIGN PATENT DOCUMENTS

| | | |
|---|---|---|
| JP | 2001-216530 A | 8/2001 |
| JP | 2003173452 A | 6/2003 |
| JP | 2003-345727 A | 12/2003 |
| JP | 2006525570 A | 11/2006 |
| JP | 2007034788 A | 2/2007 |
| JP | 2013-086226 A | 5/2013 |
| WO | WO-2004086208 A2 | 10/2004 |
| WO | WO-2017199585 A1 | 11/2017 |
| WO | WO-2019160090 A1 * | 8/2019 ............. G10L 13/04 |

OTHER PUBLICATIONS

Chiu et al., Predicting Co-verbal Gestures: A Deep and Temporal Modeling Approach, Intelligent Virtual Agent. IVA 2015. Lecture Notes in Computer Science, vol. 9238, Springer, 2015, pp. 152-166.
Cassell et al., BEAT: the Behavior Expression Animation Toolkit, Proceeding of the 28th annual conference on Computer graphics and interactive techniques, ACM, 2001, pp. 477-486.
Kadono et al., Automatic Generation of Iconic Gestures based on Image Data, Proceedings of the 30th Annual Conference of the Japanese Society for Artificial Intelligence, 2016 (with abstract).
International Search Report (in English and Japanese) issued in PCT/JP2019/005587, dated May 21, 2019.
International Search Report (in English and Japanese) issued in PCT/JP2019/005639, dated May 21, 2019.
International Search Report (in English and Japanese) issued in PCT/JP2019/005658, dated May 21, 2019.
International Search Report (in English and Japanese) issued in PCT/JP2019/005657, dated May 21, 2019.

* cited by examiner

FIG. 15

SUMMARY OF VARIATIONS OF CONFIGURATION

| LEARNING | INPUT DURING LEARNING | COMPONENTS | | INPUT FEATURE QUANTITIES DURING LEARNING |
|---|---|---|---|---|
| | | VOICE RECOGNITION UNIT | VOICE SYNTHESIS UNIT | |
| PATTERN 1 | VOICE | | | VOICE |
| PATTERN 2 | TEXT | | NEEDED | TEXT |
| PATTERN 3 | VOICE | NEEDED | | VOICE, RECOGNITION TEXT |
| PATTERN 4 | TEXT | | NEEDED | SYNTHESIZED VOICE, TEXT |

FIG. 16

VARIATIONS OF COMBINATION OF POSSIBLE CONFIGURATIONS DURING LEARNING AND DURING GENERATION

| CONFIGURATION PATTERN DURING LEARNING | CONFIGURATION PATTERN DURING GENERATION | INPUT FEATURE QUANTITY DURING LEARNING | INPUT FEATURE QUANTITY DURING GENERATION | AGREEMENT OF FEATURE QUANTITIES DURING LEARNING/GENERATION |
|---|---|---|---|---|
| PATTERN 1 | PATTERN 1 | VOICE | VOICE | ○ |
| PATTERN 1 | PATTERN 2 | VOICE | SYNTHESIZED VOICE | |
| PATTERN 2 | PATTERN 1 | TEXT | RECOGNITION TEXT | |
| PATTERN 2 | PATTERN 2 | TEXT | TEXT | ○ |
| PATTERN 3 | PATTERN 3 | VOICE, RECOGNITION TEXT | VOICE, RECOGNITION TEXT | ○ |
| PATTERN 3 | PATTERN 4 | VOICE, RECOGNITION TEXT | SYNTHESIZED VOICE, TEXT | |
| PATTERN 4 | PATTERN 3 | SYNTHESIZED VOICE, TEXT | VOICE, RECOGNITION TEXT | |
| PATTERN 4 | PATTERN 4 | SYNTHESIZED VOICE, TEXT | SYNTHESIZED VOICE, TEXT | ○ |

FIG. 24

| MORPHEME UNIT | | $t_{p,s}$ | | $t_{p,e}$ | | | |
|---|---|---|---|---|---|---|---|
| TEXT | | CHI | GA | I | MA | SU | |
| EMOTION | | ANGER | | - | - | | |

| MORPHEME UNIT | | $t_{p,s}$ | | $t_{p,e}$ | | | |
|---|---|---|---|---|---|---|---|
| TEXT | | CHI | GA | I | MA | SU | |
| EMOTION | | ANGER | | - | - | | |

NONVERBAL INFORMATION GENERATION APPARATUS, NONVERBAL INFORMATION GENERATION MODEL LEARNING APPARATUS, METHODS, AND PROGRAMS

CROSS-REFERENCE TO RELATED APPLICATIONS

This application is a 371 National Stage of International Application No. PCT/JP2019/005639, filed on Feb. 15, 2019, which claims priority to Japanese Application No. 2018-026516, filed on Feb. 16, 2018; Japanese Application No. 2018-026517, filed on Feb. 16, 2018; Japanese Application No. 2018-097338, filed on May 21, 2018; Japanese Application No. 2018-097339, filed on May 21, 2018 and Japanese Application No. 2018-230310, filed Dec. 7, 2018. The entire disclosures of the above applications are incorporated herein by reference.

TECHNICAL FIELD

The present invention relates to a nonverbal information generation apparatus, a nonverbal information generation model learning apparatus, methods, and programs.

BACKGROUND ART

In communication, in addition to verbal behavior, nonverbal behavior has an important function in transmitting emotions and intentions. Therefore, it is desired that communication robots and communication agents also exhibit nonverbal behavior in order to communicate smoothly with users. From such a background, a technique has been proposed in which a nonverbal action corresponding to an utterance is registered in a database (DB) in advance, and the nonverbal action is expressed in accordance with the reproduction of the utterance (for example, refer to Patent Document 1).

PRIOR ART DOCUMENT

Patent Document

Patent Document 1: Japanese Unexamined Patent Application First Publication No. 2003-173452

SUMMARY OF INVENTION

Problems to be Solved by the Invention

However, in the technique described in Patent Document 1, it is necessary to create and register in advance information on utterances and nonverbal actions (action commands composed of a set of gestures and spoken lines), and thus the cost of data creation is high.

The present invention has been made in view of the above circumstances, and has as its object to provide a nonverbal information generation apparatus, a nonverbal information generation model learning apparatus, methods, and programs capable of automating the association of at least one of voice information and text information with nonverbal information.

Means for Solving the Problems

In order to achieve the abovementioned object, a nonverbal information generation apparatus according to a first aspect is a nonverbal information generation apparatus that includes: a nonverbal information generation unit that generates time-information-stamped nonverbal information that corresponds to time-information-stamped text feature quantities on the basis of the time-information-stamped text feature quantities and a learned nonverbal information generation model, and the time-information-stamped text feature quantities are configured to include feature quantities that have been extracted from text and time information representing times assigned to predetermined units of the text, and the nonverbal information is information for controlling an expression unit that expresses behavior that corresponds to the text.

Moreover, a nonverbal information generation apparatus according to a second aspect is a nonverbal information generation apparatus that includes: a nonverbal information generation unit that generates time-information-stamped nonverbal information that corresponds to time-information-stamped voice feature quantities on the basis of the time-information-stamped voice feature quantities and a learned nonverbal information generation model, and the time-information-stamped voice feature quantities are configured to include feature quantities that have been extracted from voice information and time information representing times of predetermined units when the voice information is emitted, and the nonverbal information is information for controlling an expression unit that expresses behavior that corresponds to the voice information.

The nonverbal information generation apparatus of the present invention may further include a feature quantity extraction unit that performs a text analysis on text that has been input, assigns a playback time when it is assumed that the text will be output externally as voice to the text for each predetermined unit as the time information, and extracts the time-information-stamped text feature quantities.

The text feature quantities may include at least one of a dialogue act extracted from the text and thesaurus information.

The nonverbal information generation apparatus of the present invention may further include an expression unit that expresses the nonverbal information, and the nonverbal information generation unit may control the expression unit so that the time-information-stamped nonverbal information is expressed from the expression unit on the basis of time information assigned to the nonverbal information.

A nonverbal information generation model learning apparatus according to a third aspect includes: a learning information acquisition unit that acquires text information representing text corresponding to voice of a speaker and time information representing times assigned to predetermined units of the text; a nonverbal information acquisition unit that acquires nonverbal information representing information relating to behavior of the speaker when the speaker performed speaking corresponding to the text, and time information representing times at which the behavior was performed and corresponding to the nonverbal information, and creates time-information-stamped nonverbal information; a learning feature quantity extraction unit that extracts time-information-stamped text feature quantities representing feature quantities of the text information from the text information acquired by the learning information acquisition unit and the time information corresponding to the text information; and a learning unit that learns a nonverbal information generation model for generating the time-information-stamped nonverbal information acquired by the nonverbal information acquisition unit on the basis of the time-information-stamped text feature quantities extracted by the learning feature quantity extraction unit.

Moreover, a nonverbal information generation model learning apparatus according to a fourth aspect includes: a learning information acquisition unit that acquires voice information corresponding to voice of a speaker and time information representing times of predetermined units when the voice information is emitted; a nonverbal information acquisition unit that acquires nonverbal information representing information relating to behavior of the speaker when the speaker performed speaking corresponding to the voice and time information representing times at which the behavior was performed and corresponding to the nonverbal information, and creates time-information-stamped nonverbal information; a learning feature quantity extraction unit that extracts time-information-stamped voice feature quantities representing feature quantities of the voice information from the voice information acquired by the learning information acquisition unit and the time information corresponding to the voice information; and a learning unit that learns a nonverbal information generation model for generating the time-information-stamped nonverbal information acquired by the nonverbal information acquisition unit on the basis of the time-information-stamped voice feature quantities extracted by the learning feature quantity extraction unit.

Moreover, a nonverbal information generation method according to a fifth aspect includes: a step in which a nonverbal information generation unit generates time-information-stamped nonverbal information that corresponds to time-information-stamped text feature quantities on the basis of the time-information-stamped text feature quantities and a learned nonverbal information generation model, and the time-information-stamped text feature quantities are configured to include feature quantities that have been extracted from text and time information representing times assigned to predetermined units of the text, and the nonverbal information is information for controlling an expression unit that expresses behavior that corresponds to the text.

Moreover, a nonverbal information generation method according to a sixth aspect includes: a step in which a nonverbal information generation unit generates time-information-stamped nonverbal information that corresponds to time-information-stamped voice feature quantities on the basis of the time-information-stamped voice feature quantities and a learned nonverbal information generation model, and the time-information-stamped voice feature quantities are configured to include feature quantities that have been extracted from voice information, and time information representing times of predetermined units when the voice information is emitted, and the nonverbal information is information for controlling an expression unit that expresses behavior that corresponds to the voice information.

Moreover, a program of the present invention is a program for causing a computer to function as each unit that is included in the nonverbal information generation apparatuses.

A nonverbal information generation model learning apparatus according to a seventh aspect includes: a learning information acquisition unit that acquires text information representing text corresponding to voice of a speaker and time information representing times assigned to predetermined units of the text; a nonverbal information acquisition unit that acquires nonverbal information representing information relating to behavior of a listener of speaking of the speaker corresponding to the text when the speaker performed the speaking, and time information representing times at which the behavior was performed and corresponding to the nonverbal information, and creates time-information-stamped nonverbal information; a learning feature quantity extraction unit that extracts time-information-stamped text feature quantities representing feature quantities of the text information from the text information acquired by the learning information acquisition unit and the time information corresponding to the text information; and a learning unit that learns a nonverbal information generation model for generating the time-information-stamped nonverbal information acquired by the nonverbal information acquisition unit on the basis of the time-information-stamped text feature quantities extracted by the learning feature quantity extraction unit.

The text feature quantities may include at least one of a dialogue act extracted from the text and thesaurus information.

Moreover, a nonverbal information generation model learning apparatus according to an eighth aspect includes: a learning information acquisition unit that acquires voice information corresponding to voice of a speaker and time information representing times of predetermined units when the voice information is emitted; a nonverbal information acquisition unit that acquires nonverbal information representing information relating to behavior of a listener of speaking of the speaker corresponding to the voice when the speaker performed the speaking, and time information representing times at which the behavior was performed and corresponding to the nonverbal information, and creates time-information-stamped nonverbal information; a learning feature quantity extraction unit that extracts time-information-stamped voice feature quantities representing feature quantities of the voice information from the voice information acquired by the learning information acquisition unit and the time information corresponding to the voice information; and a learning unit that learns a nonverbal information generation model for generating the time-information-stamped nonverbal information acquired by the nonverbal information acquisition unit on the basis of the time-information-stamped voice feature quantities extracted by the learning feature quantity extraction unit.

Moreover, a nonverbal information generation model learning method according to a ninth aspect includes: a step in which a learning information acquisition unit acquires text information representing text corresponding to voice of a speaker and time information representing times assigned to predetermined units of the text; a step in which a nonverbal information acquisition unit acquires nonverbal information representing information relating to behavior of a listener of speaking of the speaker corresponding to the text when the speaker performed the speaking, and time information representing times at which the behavior was performed and corresponding to the nonverbal information, and creates time-information-stamped nonverbal information; a step in which a learning feature quantity extraction unit extracts time-information-stamped text feature quantities representing feature quantities of the text information from the text information acquired by the learning information acquisition unit and the time information corresponding to the text information; and a step in which a learning unit learns a nonverbal information generation model for generating the time-information-stamped nonverbal information acquired by the nonverbal information acquisition unit on the basis of the time-information-stamped text feature quantities extracted by the learning feature quantity extraction unit.

Moreover, a nonverbal information generation model learning method according to a tenth aspect includes: a step in which a learning information acquisition unit acquires voice information corresponding to voice of a speaker and time information representing times of predetermined units when the voice information is emitted; a step in which a nonverbal information acquisition unit acquires nonverbal information representing information relating to behavior of a listener of speaking of the speaker corresponding to the voice when the speaker performed the speaking, and time information representing times at which the behavior was performed and corresponding to the nonverbal information, and creates time-information-stamped nonverbal information; a step in which a learning feature quantity extraction unit extracts time-information-stamped voice feature quantities representing feature quantities of the voice information from the voice information acquired by the learning information acquisition unit and the time information corresponding to the voice information; and a step in which a learning unit learns a nonverbal information generation model for generating the time-information-stamped nonverbal information acquired by the nonverbal information acquisition unit on the basis of the time-information-stamped voice feature quantities extracted by the learning feature quantity extraction unit.

Moreover, a program of the present invention is a program for causing a computer to function as each unit included in the nonverbal information generation model learning apparatuses.

Advantageous Effects of the Invention

As described above, the nonverbal information generation apparatus, nonverbal information generation model learning apparatus, methods, and programs according to the present invention can automate the association of at least one of voice information and text information with nonverbal information.

BRIEF DESCRIPTION OF DRAWINGS

FIG. 15 is an explanatory diagram for describing a combination of configurations of other embodiments.

FIG. 16 is an explanatory diagram for describing a combination of configurations of other embodiments.

FIG. 24 is a diagram for describing a method of changing time information using additional information.

MODES FOR CARRYING OUT THE INVENTION

Hereinbelow, detailed descriptions will be given for examples of modes for carrying out the present invention with reference to the drawings.

Overview of Present Embodiment

In the embodiment of the present invention, a feature is used in which transmission of voice information and verbal information included in the voice information and nonverbal behavior co-occur when a human performs communication. Specifically, in the present embodiment, letting at least one of the voice information of an utterance and the text information representing the content of the utterance be an input X, and letting nonverbal information representing the nonverbal behavior of the speaker generated together with the utterance of the speaker be an output Y, the output Y is generated by machine learning from the input X. The nonverbal information is information related to behavior, and is information other than the language itself. Examples of nonverbal behavior include, for example, the types (classes) of head action, gaze direction, hand gestures, upper body action, lower body action, and the like.

The nonverbal information obtained in the present embodiment is used in gesture generation and the like in communication robots and communication agents that have the same physicality as humans and communicate with humans and computer graphics (CG) animation used in games and interactive systems.

First Embodiment

<Configuration of Nonverbal Information Generation Model Learning Apparatus>

Figure 1:
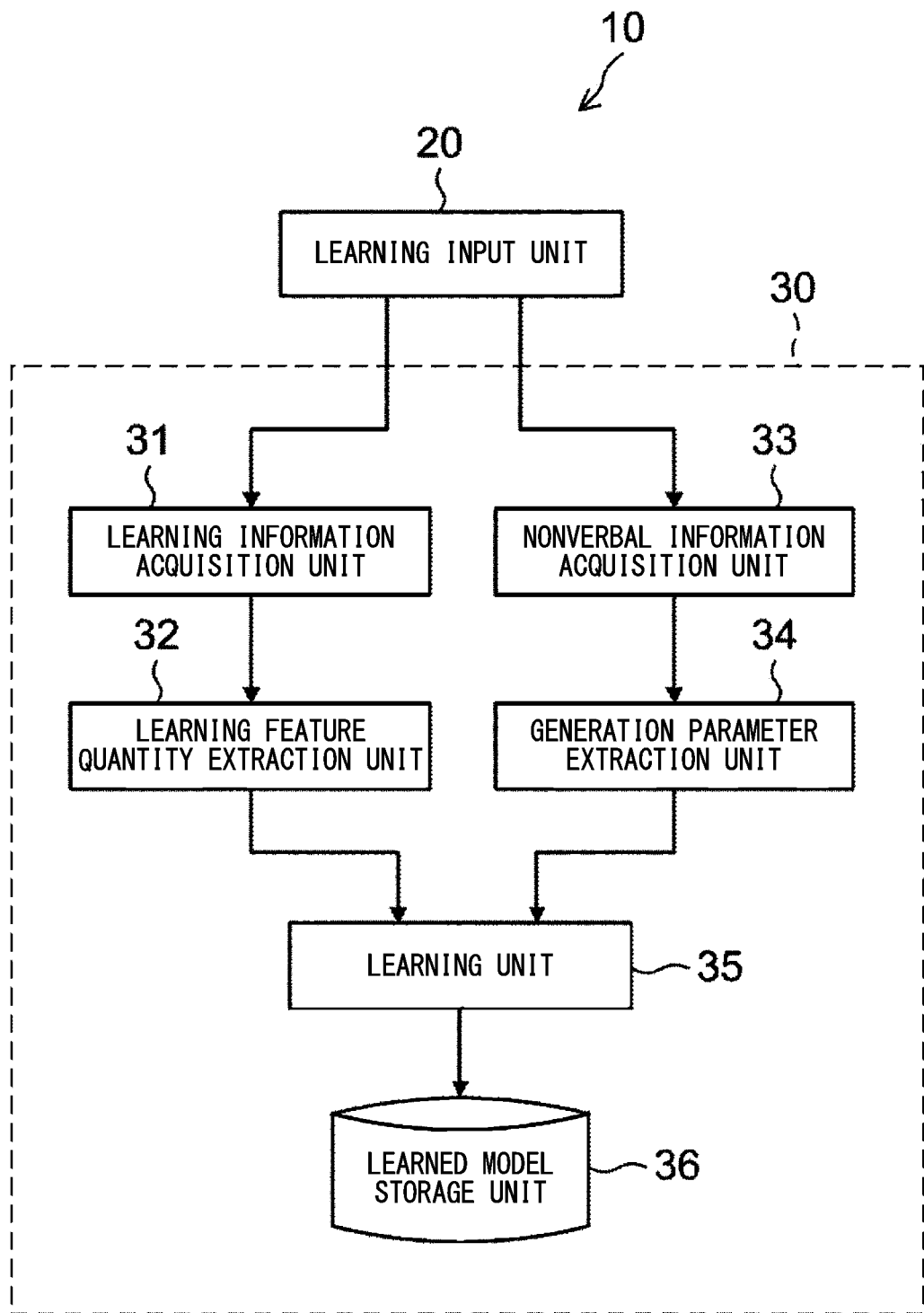
FIG. 1 is a block diagram showing an example of the configuration of a nonverbal information generation model learning apparatus in accordance with a first embodiment.

FIG. 1 is a block diagram showing an example of the configuration of a nonverbal information generation model learning apparatus 10 in accordance with the first embodiment. As shown in FIG. 1, the nonverbal information generation model learning apparatus 10 in accordance with the present embodiment is configured by a computer provided with a central processing unit (CPU), a random access memory (RAM), and a read only memory (ROM) that stores a program for executing a learning processing routine described later. The nonverbal information generation model learning apparatus 10 is functionally provided with a learning input unit 20 and a learning calculation unit 30.

The learning input unit 20 receives voice information for learning and nonverbal information for learning that represents information relating to behavior different from language.

Figure 2:
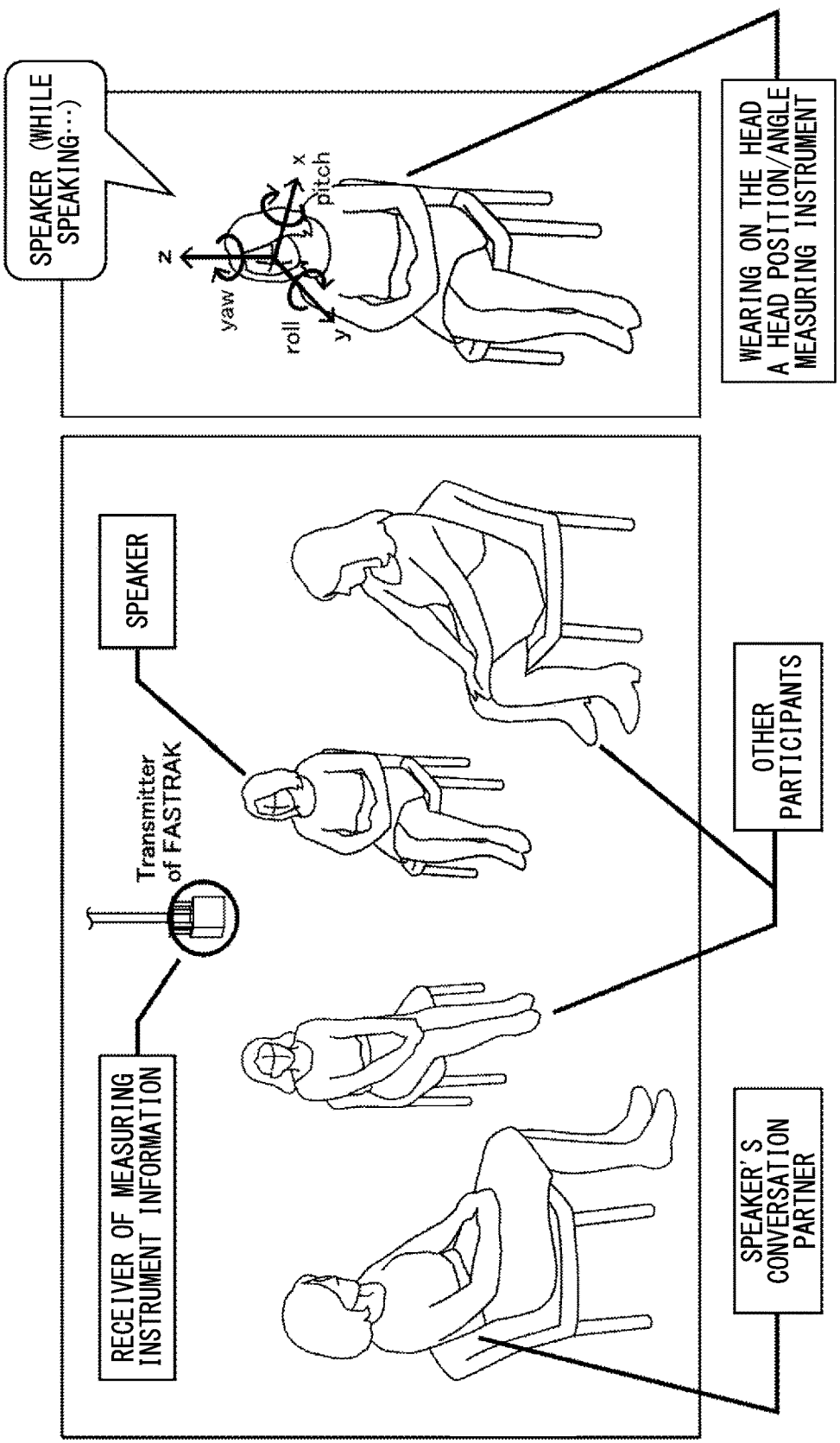
FIG. 2 is an explanatory diagram for describing a method of acquiring learning data.

Learning data representing a combination of voice information for learning and nonverbal information for learning, which are the input data of the nonverbal information generation model learning apparatus 10 of the present embodiment, is created by acquiring nonverbal information (Y) of a speaker who is speaking using a predetermined measuring apparatus at the same time as acquiring the voice information (X) of the speaker who is speaking in, for example, the scene shown in FIG. 2. It should be noted that the voice information (X) corresponds to voice information when a speaker who is speaking is making external utterances.

The learning calculation unit 30 generates a nonverbal information generation model for generating time-information-stamped nonverbal information, on the basis of the learning data received by the learning input unit 20. As shown in FIG. 1, the learning calculation unit 30 is provided with a learning information acquisition unit 31, a learning feature quantity extraction unit 32, a nonverbal information acquisition unit 33, a generation parameter extraction unit 34, a learning unit 35, and a learned model storage unit 36.

The learning information acquisition unit 31 acquires the voice information for learning received by the learning input unit 20. Further, the learning information acquisition unit 31 acquires time information indicating the time from a start time to an end time of the voice information for learning being emitted.

The learning feature quantity extraction unit 32 extracts time-information-stamped voice feature quantities for learning, which represent feature quantities of the voice information for learning, from the voice information for learning and time information acquired by the learning information acquisition unit 31.

Figure 3:
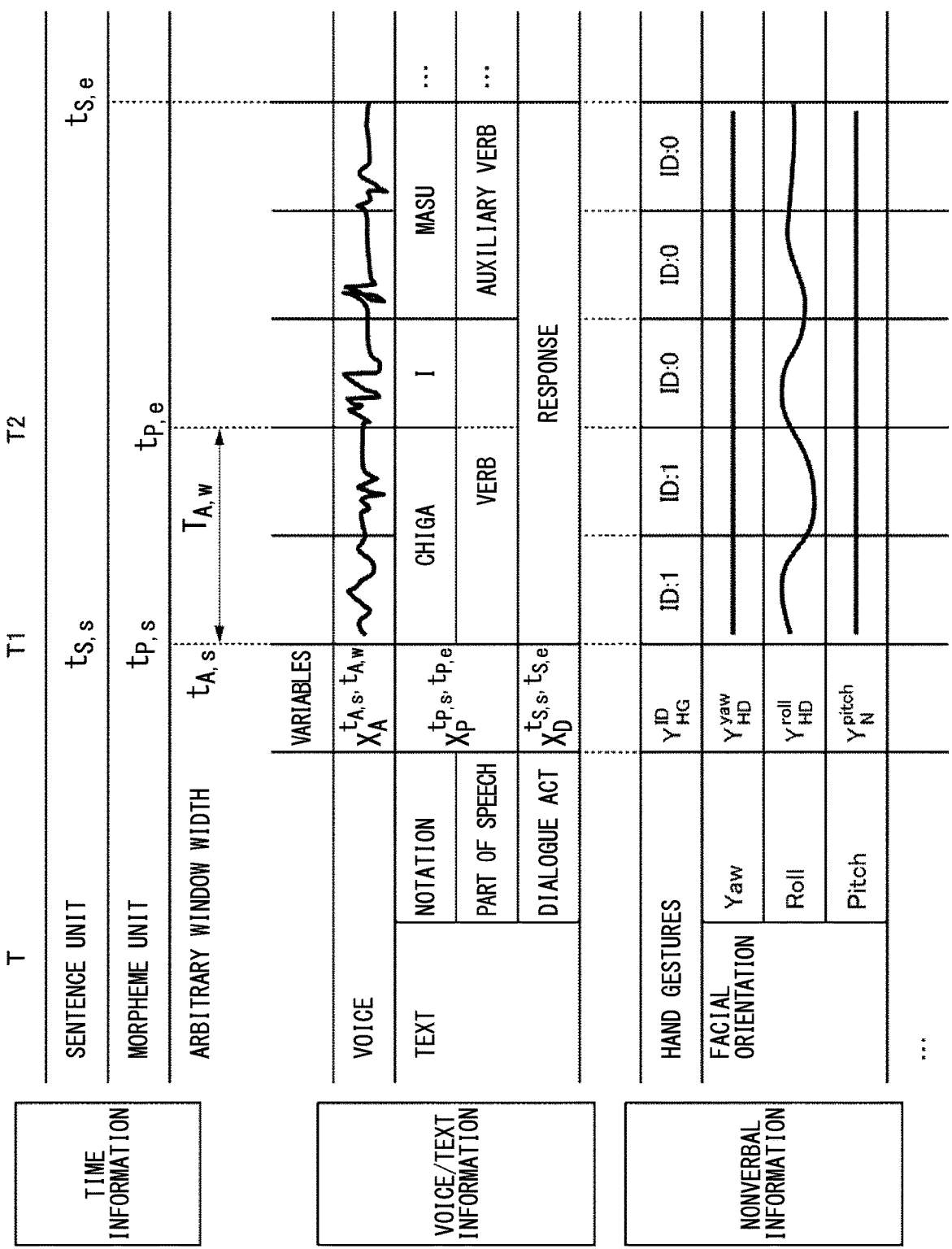
FIG. 3 is an explanatory diagram for describing voice feature quantities and text feature quantities used in the present embodiment.

For example, the learning feature quantity extraction unit 32 performs predetermined voice information processing on the voice information for learning acquired by the learning information acquisition unit 31, and extracts the fundamental frequency (F0), power, Mel frequency cepstral coefficients (MFCC), and the like as voice feature quantities. As shown in FIG. 3, these voice feature quantities can be calculated using a window width $T_{A,w}$ of an arbitrary time and voice information. As shown in FIG. 3, these multidimensional voice feature quantities can be expressed as $$X_A^{t,T_A,W} \qquad \text{[Expression 1]}$$

Here, $$X_A^{t,T_A,w} \qquad \text{[Expression 2]}$$

is a voice feature quantity calculated from the voice information corresponding to the window width $T_{A,w}$ from the time $t_{A,s}$. It should be noted that the window width does not need to be the same for all voice feature quantities, and the feature quantities may be extracted separately. These methods for extracting voice feature quantities are common, and various techniques have already been proposed (for example, see Reference Document 1). For this reason, any technique may be used.

[Reference Document 1]: Seiichi Nakagawa, "Spoken Language Processing and Natural Language Processing", Mar. 1, 2013, Corona Publishing Co., Ltd.

The nonverbal information acquiring unit 33 acquires the nonverbal information for learning received by the learning input unit 20, and acquires the time information representing the time from the start time to the end time when behavior represented by the nonverbal information for learning is performed.

The nonverbal information acquisition unit 33 acquires information relating to nodding, face orientation, hand gestures, gaze, facial expression, body posture, and the like as nonverbal information for learning. Examples of parameters representing information relating to nodding, face orientation, hand gestures, gaze, facial expression, body posture, and the like are given below.

TABLE 1

| Type | Parameter |
|---|---|
| Nodding | Presence or absence of nodding $Y_N^P$, number of times $Y_N^T$, and depth $Y_N^D$ |
| Face orientation | Angles of yaw, roll, and pitch ($Y_{HD}^{yaw}$, $Y_{HD}^{roll}$, $Y_N^{pitch}$) |
| Hand gesture | Motion ID ($Y_{HG}^{ID}$) |
| Gaze (eyeballs) | Positions of X and Y ($Y_{EB}^x$, $Y_{EB}^y$) |
| Facial expression (FACS) | Strength of 47 AU ($Y_{FACS}^i$ (i = 1, . . . , 47)) |
| Body posture | Front/back, left/right posture position ($Y_{BP}^{FB}$, $Y_{BP}^{RL}$) |

It should be noted that FACS stands for Facial Action Coding System, and AU stands for Action Unit. For example, in AU1, nonverbal information is represented by a label, such as "lifts the inside of eyebrows (AU1)". Nonverbal information other than the above includes, for example, gaze behavior, head action, breathing action, and mouth shape change of the speaker.

As described above, the nonverbal information may be any parameter related to events such as joints, positions, and movements of the body. Various techniques are conceivable for the measurement technique, and any technique may be used (for example, see Reference Documents 2 and 3).

[Reference Document 2]: Masaaki Makikawa, Masayuki Nambu, Narihiro Shiozawa, Shima Okada, and Masaki Yoshida, "Measurement technologies of mind and body condition in daily life for the development of human friendly products", Oct. 1, 2010, Corona Publishing Co., Ltd.

[Reference Document 3]: Shihong Xia, Lin Gao, Yu-Kun Lai, Ming-Ze Yuan, and Jinxiang Chai, "A Survey on Human Performance Capture and Animation", Journal of Computer Science and Technology, Volume 32, Issue 3, pp. 536-554, (2017).

As shown in FIG. 2, with regard to for example the orientation of a face, the head direction of a human or a conversational humanoid can be measured by a behavior capture apparatus such as a head measurement apparatus (head tracker). It is also possible to acquire the orientation of a face from animation data such as CG. Further, as shown in FIG. 2, the orientation of a face is represented by, for example, the angles of the three axes of Yaw, Roll, and Pitch.

The generation parameter extraction unit 34 discretizes a parameter (sensory scale) represented by nonverbal information for learning acquired by the nonverbal information acquisition unit 33, and extracts the time-information-stamped discretized nonverbal information. For example, facial orientation is represented by Yaw, Roll, and Pitch angle information, and thus arbitrary thresholds $\alpha$ and $\beta$ ($\alpha<\beta$) may be determined in advance and it is converted into a nominal scale as shown below. It should be noted that only Yaw is presented in the following example.

$-\alpha<Yaw<\alpha$: front $\alpha \leq Yaw<\beta$: facing slightly left $\beta<Yaw$: facing greatly left $-\beta<Yaw\leq-\alpha$: facing slightly right $-\beta\geq Yaw$: facing greatly right In this way, the nonverbal information for learning acquired by the nonverbal information acquisition unit 33 is discretized, and that to which time information is assigned is converted into a multidimensional vector $$Y^{tN,s,tN,e} \qquad \text{[Expression 3]}$$

Here, $t_{N,s}$, $t_{N,e}$ are the start time and the end time at which the nonverbal information is obtained, respectively.

The learning unit 35 learns a nonverbal information generation model for generating time-information-stamped nonverbal information from time-information-stamped voice feature quantities on the basis of the time-information-stamped voice feature quantities for learning extracted by the learning feature quantity extraction unit 32, and time-information-stamped discretized nonverbal information acquired by the generation parameter extraction unit 34.

Specifically, the learning unit 35 constructs a nonverbal information generation model that takes time-information-stamped voice feature quantities for learning extracted by the learning feature quantity extraction unit 32

$$X_A^{t,TA,w} \qquad \text{[Expression 4]}$$

as input and outputs time-information-stamped nonverbal information $$Y^{tN,stN,e} \qquad \text{[Expression 5]}$$

In constructing the nonverbal information generation model, any machine learning technique may be used, but a support vector machine (SVM) is used in the present embodiment. For example, using an SVM, a classifier for the parameters of each dimension in $$Y^{tN,stN,e} \qquad \text{[Expression 6]}$$

is constructed, or a regression model by support vector machine for regression (SVR) in which an SVM is applied to regression is constructed.

In addition, in the present embodiment, for each type of action represented by the nonverbal information, an SVM model for estimating the presence or absence of the type of action is created.

It should be noted that in the nonverbal information generation model, whether to estimate the nonverbal information at what time resolution and using what time parameters is arbitrary. Here is shown an example of a feature quantity used in the case of estimating a gesture $$Y^{T1,T2} \qquad \text{[Expression 7]}$$

at an arbitrary time section T1 to T2. The voice feature quantities $$X_A^{T1,TA,w} \sim X_A^{T2,TA,w} \qquad \text{[Expression 8]}$$

obtained at times T1 to T2, which are the target of estimation, and the gesture to be output $$Y^{T1,T2} \qquad \text{[Expression 9]}$$

are paired, and learning is performed using learning data including a plurality of sets of data of these pairs. Then let $$M^{T1,T2} \qquad \text{[Expression 10]}$$

be the learned nonverbal information generation model.

The learned model storage unit 36 stores the learned nonverbal information generation model learned by the learning unit 35. The learned nonverbal information generation model generates time-information-stamped nonverbal information from the time-information-stamped voice feature quantities.

<System Configuration of Nonverbal Information Generation Apparatus>

Figure 4:
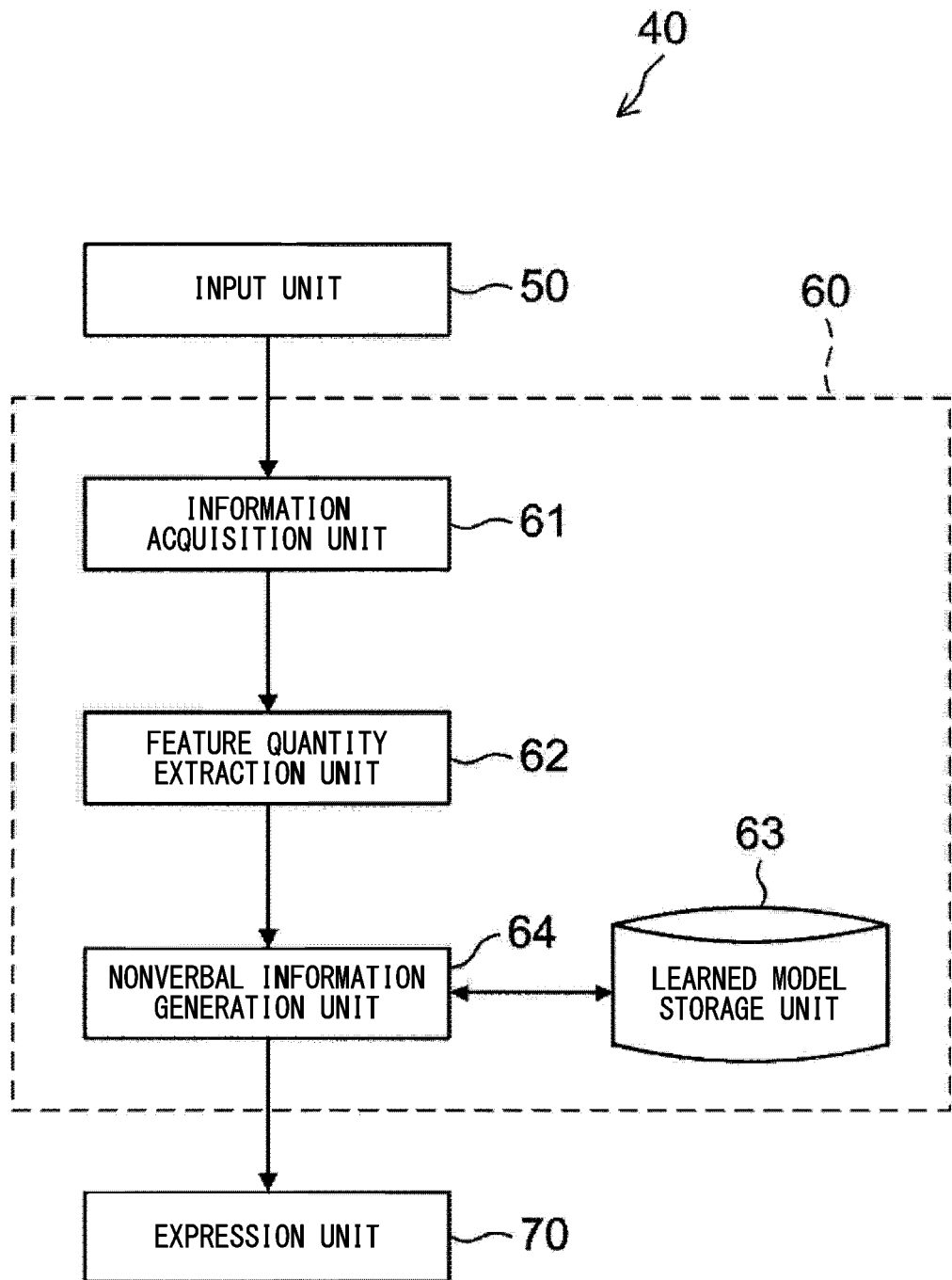
FIG. 4 is a block diagram showing an example of the configuration of a nonverbal information generation apparatus in accordance with the first embodiment.

FIG. 4 is a block diagram showing an example of the configuration of a nonverbal information generation apparatus 40 in accordance with the first embodiment. As shown in FIG. 4, the nonverbal information generation apparatus 40 in accordance with the present embodiment is configured by a computer provided with a central processing unit (CPU), a random access memory (RAM), and a read only memory (ROM) that stores a program for executing a nonverbal information generation processing routine described later. The nonverbal information generation apparatus 40 is functionally provided with an input unit 50, a calculation unit 60, and an expression unit 70.

The input unit 50 receives voice information and time information indicating the time from a start time to an end time of the voice information being emitted.

The calculation unit 60 is provided with an information acquisition unit 61, a feature quantity extraction unit 62, a learned model storage unit 63, and a nonverbal information generation unit 64.

The information acquisition unit 61 acquires the voice information and the time information indicating the time from the start time to the end time when the voice information is emitted, which are received by the input unit 50.

Similarly to the learning feature quantity extraction unit 32, the feature quantity extraction unit 62 extracts time-information-stamped voice feature quantities, indicating feature quantities of the voice information, from the voice information and the time information acquired by the information acquisition unit 61.

The learned model storage unit 63 stores the same learned nonverbal information generation model as the learned nonverbal information generation model stored in the learned model storage unit 36.

The nonverbal information generation unit 64 generates time-information-stamped nonverbal information corresponding to the time-information-stamped voice feature quantities extracted by the feature quantity extraction unit 62 on the basis of the time-information-stamped voice feature quantities extracted by the feature quantity extraction unit 62 and the learned nonverbal information generation model stored in the learned model storage unit 63.

For example, the nonverbal information generation unit 64, using the learned nonverbal information generation model $$M^{T1,T2} \quad \text{[Expression 11]}$$

stored in the learned model storage unit 63, receives an input of arbitrary feature quantities as time-information-stamped voice feature quantities $$X_A^{T1,T_{A,w}} \sim X_A^{T2,T_{A,w}} \quad \text{[Expression 12]}$$

to acquire a gesture $$Y^{T1,T2} \quad \text{[Expression 13]}$$

as time-information-stamped nonverbal information.

Then, the nonverbal information generating unit 64 controls the expression unit 70 so that the time-information-stamped nonverbal information that has been generated is output from the expression unit 70 on the basis of the time information assigned to the nonverbal information.

Specifically, the nonverbal information generating unit 64 causes the gesture $$Y^{T1,T2} \quad \text{[Expression 14]}$$

to be reflected as an action of an arbitrary target (for example, an animation character, a robot, or the like) in the expression unit 70.

The expression unit 70 causes the voice information received by the input unit 50 and the nonverbal information generated by the nonverbal information generation unit 64 to be expressed under the control of the nonverbal information generation unit 64.

Examples of the expression unit 70 include a communication robot, a communication agent displayed on a display, a CG animation used in a game and an interactive system, and the like.

<Operation of Nonverbal Information Generation Model Learning Apparatus 10>

Figure 5:
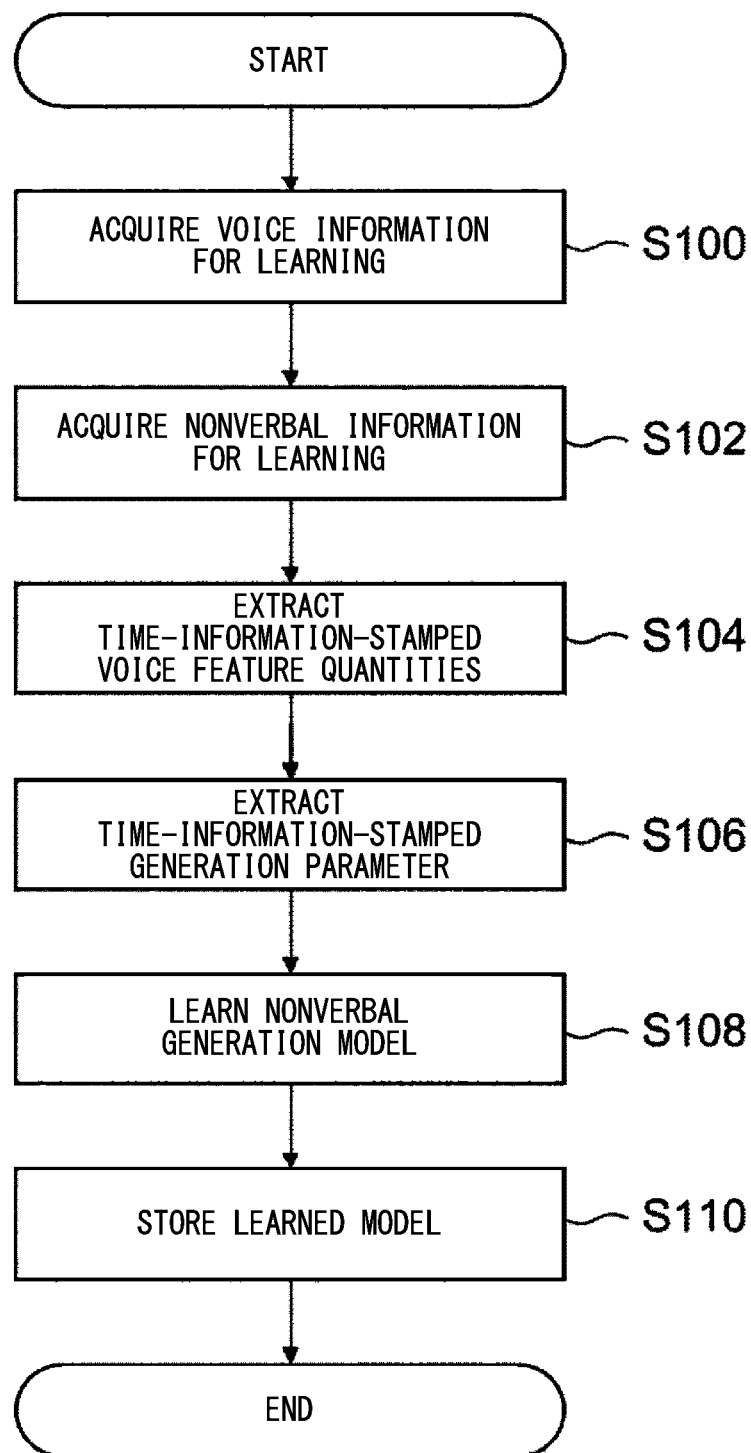
FIG. 5 is a flowchart showing an example of the flow of the learning process in accordance with the first embodiment.

Next, the operation of the nonverbal information generation model learning apparatus 10 in accordance with the present embodiment will be described. First, when learning data representing a combination of a plurality of pieces of voice information for learning and a plurality of pieces of nonverbal information for learning are input to the learning input unit 20 of the nonverbal information generation model learning apparatus 10, the nonverbal information generation model learning apparatus 10 executes the learning processing routine shown in FIG. 5.

First, in Step S100, the learning information acquiring unit 31 acquires, from among the plurality of sets of learning data received by the learning input unit 20, the voice information for learning and the time information indicating the time from the start time to the end time of the voice information for learning being emitted.

In Step S102, the nonverbal information acquisition unit 33 acquires, from among the plurality of sets of learning data received by the learning input unit 20, the nonverbal information for learning and the time information indicating the time from the start time to the end time when the behavior represented by the nonverbal information for learning is performed.

In Step S104, the learning feature quantity extraction unit 32 extracts time-information-stamped voice feature quantities for learning, from the voice information for learning and the time information acquired in Step S100.

In Step S106, the generation parameter extraction unit 34 extracts time-information-stamped discretized nonverbal information from the nonverbal information for learning and the time information acquired in Step S102.

In Step S108, the learning unit 35 learns a nonverbal information generation model for generating time-information-stamped nonverbal information from the time-information-stamped voice feature quantities on the basis of the time-information-stamped voice feature quantities for learning extracted in Step S104 and the time-information-stamped nonverbal information acquired in Step S106.

In Step S110, the learning unit 35 stores the learned nonverbal information generation model obtained in Step S108 in the learned model storage unit 36, and ends the learning processing routine.

<Operation of Nonverbal Information Generation Apparatus 40>

Figure 6:
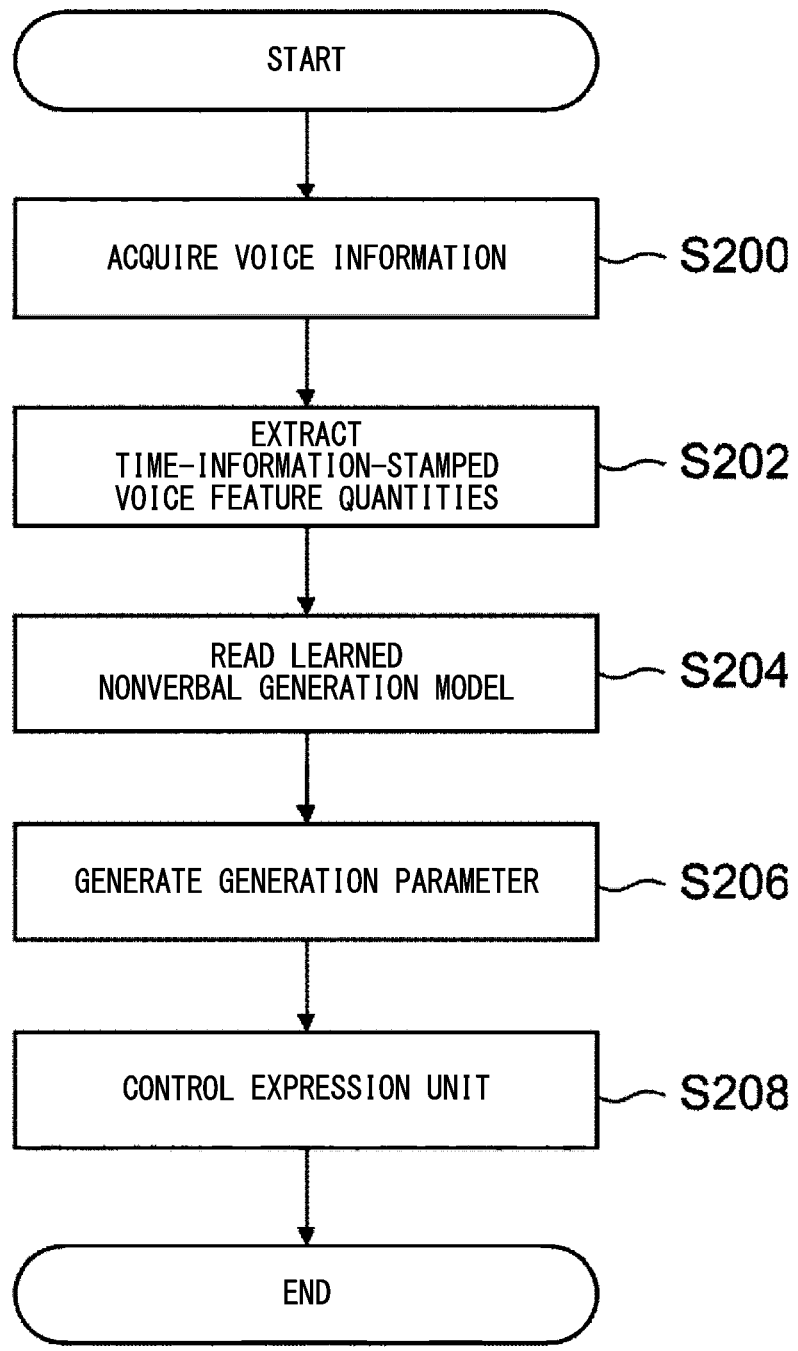
FIG. 6 is a flowchart showing an example of the flow of the nonverbal information generation process in accordance with the first embodiment.

Next, the operation of the nonverbal information generation apparatus 40 in accordance with the present embodiment will be described. First, when the learned nonverbal information generation model stored in the learned model storage unit 36 of the nonverbal information generation model learning apparatus 10 is input to the nonverbal information generation apparatus 40, the learned nonverbal information generation model is stored in the learned model storage unit 63 of the nonverbal information generation apparatus 40. Then, when voice information that is a target of nonverbal information generation is input to the input unit 50, the nonverbal information generation apparatus 40 executes the nonverbal information generation processing routine shown in FIG. 6.

In Step S200, the information acquisition unit 61 acquires the voice information and the time information representing the time from the start time to the end time when the voice information is emitted, which have been received by the input unit 50.

In Step S202, the feature quantity extraction unit 62 extracts the time-information-stamped voice feature quantities from the voice information and time information acquired in Step S200, similarly to the learning feature quantity extraction unit 32.

In Step S204, the nonverbal information generation unit 64 reads the learned nonverbal information generation model stored in the learned model storage unit 63.

In Step S206, the nonverbal information generation unit 64 generates time-information-stamped nonverbal information corresponding to the time-information-stamped voice feature quantities extracted in Step S202, on the basis of the time-information-stamped voice feature quantities extracted in Step S202 and the learned nonverbal information generation model read in Step S204.

In Step S208, the nonverbal information generation unit 64 controls the expression unit 70 such that the time-information-stamped nonverbal information generated in Step S206 is output from the expression unit 70 on the basis of the time information assigned to the nonverbal information, and ends the nonverbal information generation processing routine.

As described above, the nonverbal information generation apparatus 40 in accordance with the first embodiment extracts time-information-stamped voice feature quantities from the voice information and the time information, and generates time-information-stamped nonverbal information corresponding to the time-information-stamped voice feature quantities on the basis of the time-information-stamped voice feature quantities that have been extracted and the learned nonverbal information generation model for generating time-information-stamped nonverbal information. Thereby, the voice information and the nonverbal information are automatically associated, and so a cost reduction can be achieved.

When a communication robot, a conversational agent, or the like is made to perform actions such as gestures in accordance with uttered voice or of text corresponding thereto, it is necessary to decide what kind of action should be performed and at what sort of timing in accordance with the utterance. Conventionally, these have all been manually created and set as scenarios, leading to a high production cost.

In contrast, in the present embodiment, by generating a learned nonverbal information generation model for generating time-information-stamped nonverbal information from time-information-stamped voice feature quantities, with voice information as input, time-information-stamped nonverbal information (nonverbal information to which output timing has been assigned) corresponding to an action that corresponds to the input is output.

Thereby, with the present embodiment, it becomes possible to automatically generate nonverbal information from voice information, and thus it is not necessary to individually register nonverbal information for an utterance as in the conventional art, and so costs are greatly reduced. Further, by using the present embodiment, it is possible to generate nonverbal behavior at a human-like natural timing for the input voice information. Thereby, advantageous effects are attained such as an improvement in the human-like nature and naturalness of agents, robots, and the like, facilitation of transmission of intention by nonverbal behavior, enlivening of conversation, and the like.

In addition, by using a nonverbal information generation model learned in advance, an uttered voice or text serves as input, with information on an action corresponding to the input and the timing thereof being output. Thereby, scenario creation costs can be reduced. Also, since the action is generated based on actual human actions, the action can be reproduced with a more natural timing.

Moreover, the nonverbal information generation model learning apparatus 10 in accordance with the first embodiment learns a nonverbal information generation model for generating time-information-stamped nonverbal information from the time-information-stamped voice feature quantities on the basis of the time-information-stamped voice feature quantities for learning and the time-information-stamped nonverbal information for learning. Thereby, it is possible to obtain a nonverbal information generation model for generating nonverbal information from voice feature quantities, while reducing the cost of associating voice information with nonverbal information.

Also, by using a learned nonverbal information generation model, it is possible to generate nonverbal behavior at a natural timing.

In the first embodiment, the case in which nonverbal information is generated from voice feature quantities has been described as an example. In the first embodiment, it is possible to generate nonverbal information with a minimum necessary configuration based on information expressed as voice feature quantities (for example, an emotion or the like) without delving into the spoken content.

It should be noted that in the first embodiment, since the content being spoken is not delved into (verbal information is not used), for example, a sensor may be attached to an animal to acquire nonverbal information and voice information (for example, cries and the like), and then an animal-type robot may be operated.

Second Embodiment

<Configuration of Nonverbal Information Generation Model Learning Apparatus>

Next, a second embodiment of the present invention will be described. It should be noted that components with the same configuration as those in the first embodiment are denoted by the same reference signs, with descriptions thereof being omitted.

In the second embodiment, text information is used as input instead of voice information. The difference from the first embodiment is that learning of a nonverbal information generation model for generating nonverbal information from text information is performed. It should be noted that the text information used in the second embodiment is text information indicating uttered content, when a speaker is speaking externally via voice.

Figure 7:
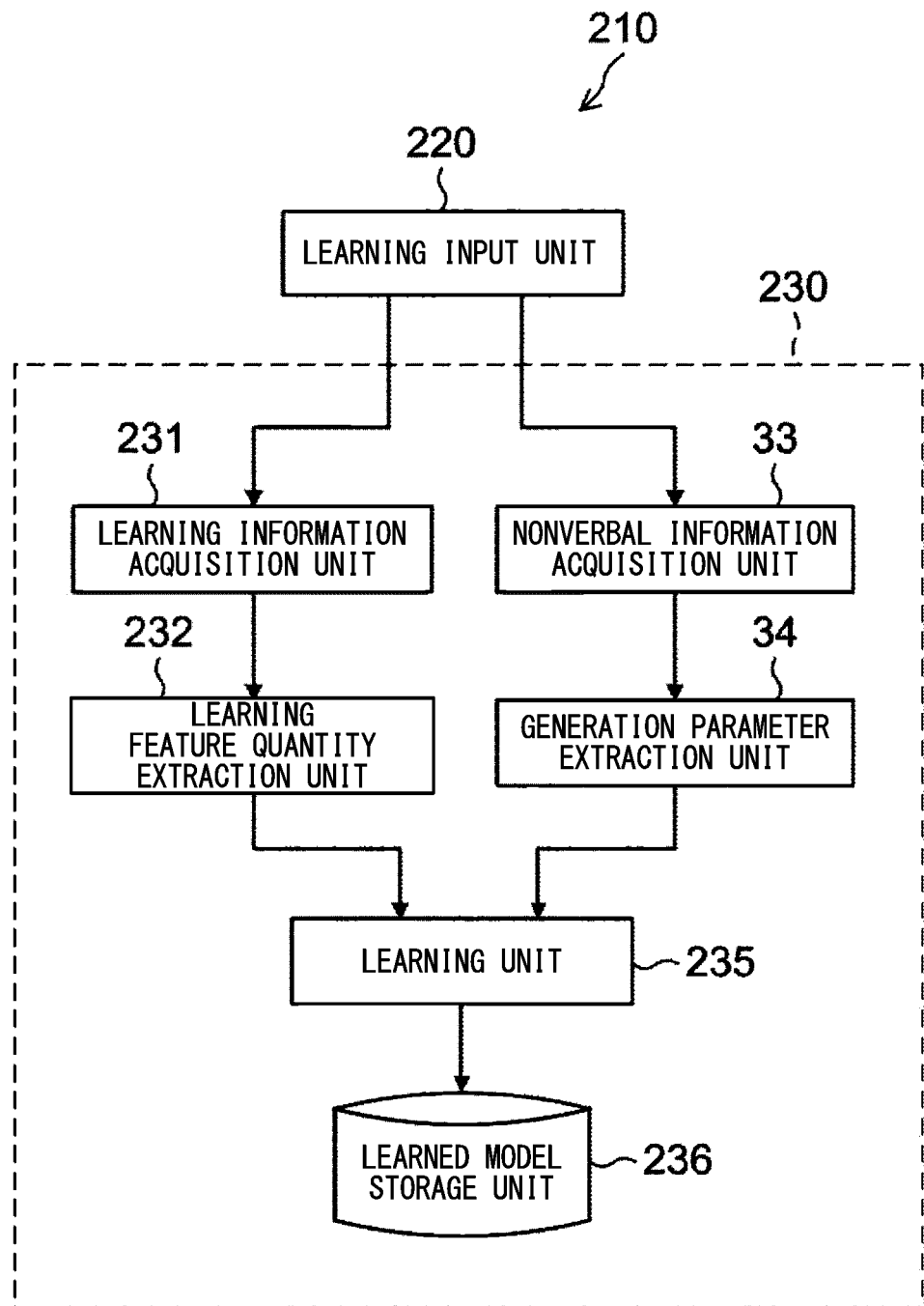
FIG. 7 is a block diagram illustrating an example of the configuration of the nonverbal information generation model learning apparatus in accordance with a second embodiment.

FIG. 7 is a block diagram showing an example of the configuration of a nonverbal information generation model learning apparatus 210 in accordance with the second embodiment. As shown in FIG. 7, the nonverbal information generation model learning apparatus 210 in accordance with the second embodiment is configured by a computer provided with a CPU, a RAM, and a ROM storing a program for executing a learning processing routine described later. The nonverbal information generation model learning apparatus 210 is functionally provided with a learning input unit 220 and a learning calculation unit 230.

The learning input unit 220 receives text information for learning and nonverbal information for learning.

The learning calculation unit 230 generates a nonverbal information generation model for generating time-information-stamped nonverbal information on the basis of the learning data received by the learning input unit 220. As illustrated in FIG. 7, the learning calculation unit 230 is provided with a learning information acquisition unit 231, a learning feature quantity extraction unit 232, a nonverbal information acquisition unit 33, a generation parameter extraction unit 34, a learning unit 235, and a learned model storage unit 236.

Figure 8:
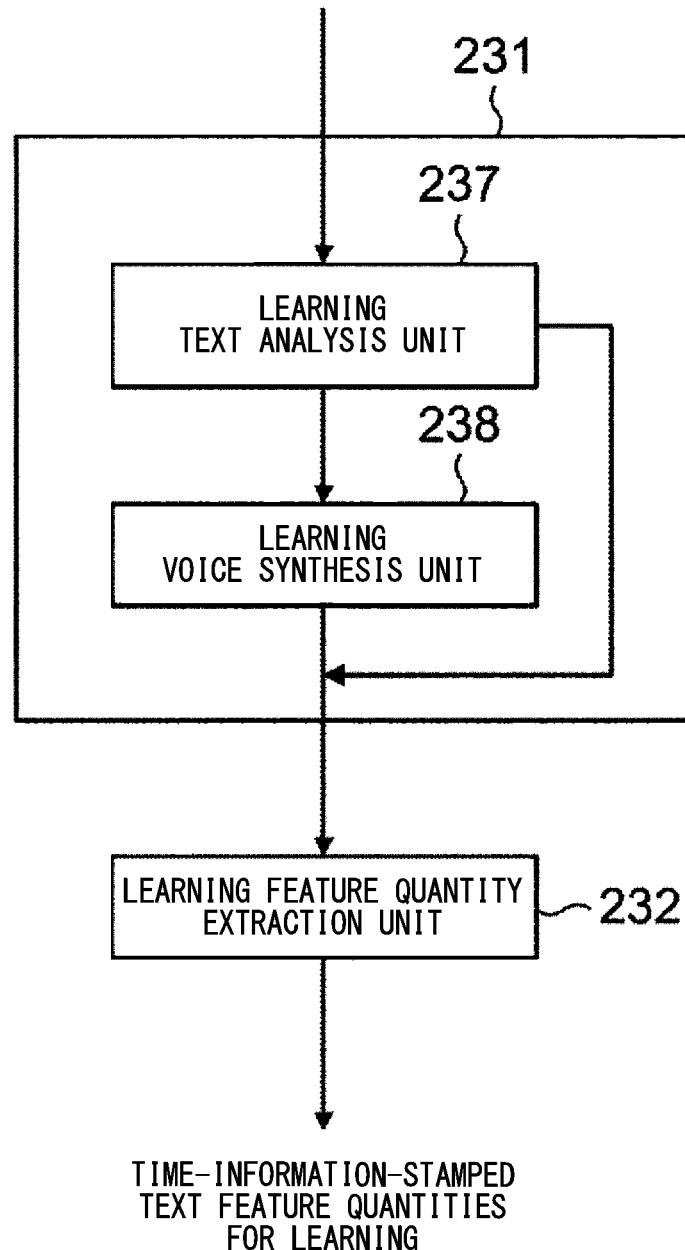
FIG. 8 is a diagram illustrating a detailed configuration example of a learning information acquisition unit in accordance with the second embodiment.

The learning information acquisition unit 231 acquires voice information for learning corresponding to the text information for learning, and acquires time information indicating the time from a start time to an end time of the voice information being emitted. As shown in FIG. 8, the learning information acquisition unit 231 is provided with a learning text analysis unit 237 and a learning voice synthesis unit 238.

The learning text analysis unit 237 performs a predetermined text analysis on the text information for learning, and acquires a result of the text analysis. For example, the learning text analysis unit 237 performs text analysis such as morphological analysis on the text information for learning, and for each morpheme extracts word notation (morpheme) information, a part of speech, category information, an evaluative expression, an emotional expression, a sensibility expression, sound onomatopoeia/mimetic word/voice onomatopoeia, a named entity, a theme, the number of characters, position, thesaurus information, and the like, and for each sentence extracts the dialogue act of the utterance. It should be noted that word notation (morpheme) information, a part of speech, category information, an evaluative expression, an emotional expression, a named entity, a theme, the number of characters, position, thesaurus information, and the like may be extracted for each clause instead of each morpheme. Also, word notation (morpheme) information, a part of speech, category information, an evaluative expression, an emotional expression, a sensibility expression, sound onomatopoeia/mimetic word/voice onomatopoeia, a named entity, a theme, number of characters, position, and thesaurus information and the like may be extracted in arbitrary units other than morphemes and clauses. For example, the extraction may be in units of characters, and in the case of English, may be in units of character strings delimited by spaces, or in units of phrases. Also, the extraction of a theme may be performed for each sentence or each utterance. Here, a dialogue act is an abstraction of intention in an utterance and an abstraction serving as a label. A theme is information indicating a topic or a focus in the text. The number of characters is the number of characters in a morpheme or a clause. The position refers to a position of a morpheme or a clause from the beginning or end of a sentence. Thesaurus information refers to thesaurus information of a morpheme or a word in a clause based on the Japanese Lexicon. The method for extracting these text feature quantities may be a general one, and various techniques have already been proposed (see Reference Document 1 above and Reference Documents 4 to 6 below). In the present embodiment, an example will be described for the case of using, among these types of information, word notation (morpheme) information, a part of speech, a dialogue act, the number of characters, position, and thesaurus information.

[Reference Document 4]: R. Higashinaka, K. Imamura, T. Meguro, C. Miyazaki, N. Kobayashi, H. Sugiyama, T. Hirano, T. Makino, and Y. Matsuo, "Towards an open-domain conversational system fully based on natural language processing", In Proceedings of International conference on Computational linguistics, pp. 928-939, 2014

[Reference Document 5]: Japanese Unexamined Patent Application First Publication No. 2014-222399

[Reference Document 6] Japanese Unexamined Patent Application First Publication No. 2015-045915

The learning voice synthesis unit 238 synthesizes voice information for learning corresponding to the text information for learning, on the basis of the text analysis result acquired by the learning text analysis unit 237. For example, the learning voice synthesis unit 238 performs voice synthesis using the text analysis result, generates an utterance corresponding to the text information, and sets the utterance as voice information for learning corresponding to the text information for learning.

Also, the learning voice synthesis unit 238 acquires time information representing the time from the start time to the end time of the voice information for learning being emitted. Specifically, the learning voice synthesis unit 238 acquires time information corresponding to the start time to the end time of the voice of the utterance generated by the voice synthesis. This time information corresponds to each morpheme of the text information corresponding to the utterance. It should be noted that the start time and the end time may also be obtained for each character included in the text information.

The learning feature quantity extraction unit 232 extracts time-information-stamped text feature quantities for learning, which represent feature quantities of the text information for learning, from the text information for learning and the time information acquired by the learning voice synthesis unit 238. Specifically, the learning feature quantity extraction unit 232 assigns time information to the text information for each predetermined analysis unit, and extracts time-information-stamped text feature quantities.

Specifically, the learning feature quantity extraction unit 232 performs sentence partition on the text information for learning output by the learning voice synthesis unit 238. Next, the learning feature quantity extraction unit 232 extracts text feature quantities $$X_D^{t_{S,s}, t_{S,e}}$$ [Expression 15]

related to the dialogue act obtained by the learning text analysis unit 237 for each sentence. It should be noted that $$t_{S,s}, t_{S,e}$$ [Expression 16]

is the start time and end time of utterance corresponding to one sentence.

Moreover, for each of a plurality of morphemes constituting each sentence obtained by the partitioning, the learning feature quantity extraction unit 232 extracts at least the word notation information, among the word notation information, the part of speech, the category information (for example, noun, named entity, or declinable word), the evaluative expression, the emotional expression, the named entity, the number of characters, the position in the sentence, the thesaurus information, and the like. Then, the learning feature quantity extraction unit 232 puts these multidimensional feature quantities into the form of $$X_P^{t_{P,s}, t_{P,e}}$$ [Expression 17]

It should be noted that $$t_{P,s}, t_{P,e}$$ [Expression 18]

are the start time and end time of the uttered voice corresponding to the morpheme unit, respectively. FIG. 3 shows an example of time-information-stamped text feature quantities. The start time and end time of each morpheme of the text information are obtained as shown in FIG. 3.

It should be noted that for each of the plurality of clauses constituting each sentence obtained by the partitioning, the word notation information, part of speech, category information (for example, noun, named entity, declinable word, and the like), evaluative expression, emotional expression, named entity, number of characters, position in the sentence, thesaurus information, and the like may be extracted. Then, the learning feature quantity extraction unit 232 puts these multidimensional feature quantities into the form of $$X_C^{t_{C,s}, t_{C,e}}$$ [Expression 19]

It should be noted that $$t_{C,s}, t_{C,e}$$ [Expression 20]

are the start time and end time of uttered voice corresponding to a clause unit, respectively.

In the learning information acquisition unit 231, information obtained when performing voice recognition and voice synthesis may be diverted.

The learning unit 235 learns a nonverbal information generation model for generating time-information-stamped nonverbal information from the time-information-stamped text feature quantities, on the basis of the time-information-stamped text feature quantities for learning extracted by the learning feature quantity extraction unit 232, and the time-information-stamped discretized nonverbal information for learning extracted by the generation parameter extraction unit 34.

Specifically, the learning unit 235 constructs a nonverbal information generation model that takes the time-information-stamped text feature quantities for learning extracted by the learning feature extracting unit 232

$$X_D^{t_{S,s}, t_{S,e}}$$ [Expression 21]

$$X_P^{t_{P,s}, t_{P,e}}$$ [Expression 22]

as inputs, and outputs nonverbal information $$Y^{t_{N,s}, t_{N,e}}$$ [Expression 23]

When constructing the nonverbal information generation model, any machine learning technique may be used, and SVM is used in the present embodiment.

It should be noted that in the nonverbal information generation model, what kind of time resolution is used and which time parameter is used to estimate the nonverbal information are arbitrary. Here is shown an example of a feature quantity used in the case of estimating a gesture $$Y^{T1,T2}$$ [Expression 24]

in an arbitrary time section T1 to T2. The verbal feature quantities $$X_D^{T1,T2}, X_P^{T1,T2}$$ [Expression 25]

and the gesture to be output $$Y^{T1,T2}$$ [Expression 26]

obtained in the time between times T1 to T2, which is the target of estimation, are paired, and learning is performed using learning data including a plurality of sets of data of these pairs. The learned nonverbal information generation model becomes $$M^{T1,T2}$$ [Expression 27]

It should be noted that as a setting method of T1 and T2, for example, when nonverbal information is estimated in morpheme units, the start time and end time of each morpheme are set to T1 and T2, respectively. In this case, the window width from T2 to T1 differs for each morpheme.

The learned model storage unit 236 stores the learned nonverbal information generation model learned by the learning unit 235. The learned nonverbal information generation model generates time-information-stamped nonverbal information from the time-information-stamped text feature quantities.

<Configuration of Nonverbal Information Generation Apparatus>

Figure 9:
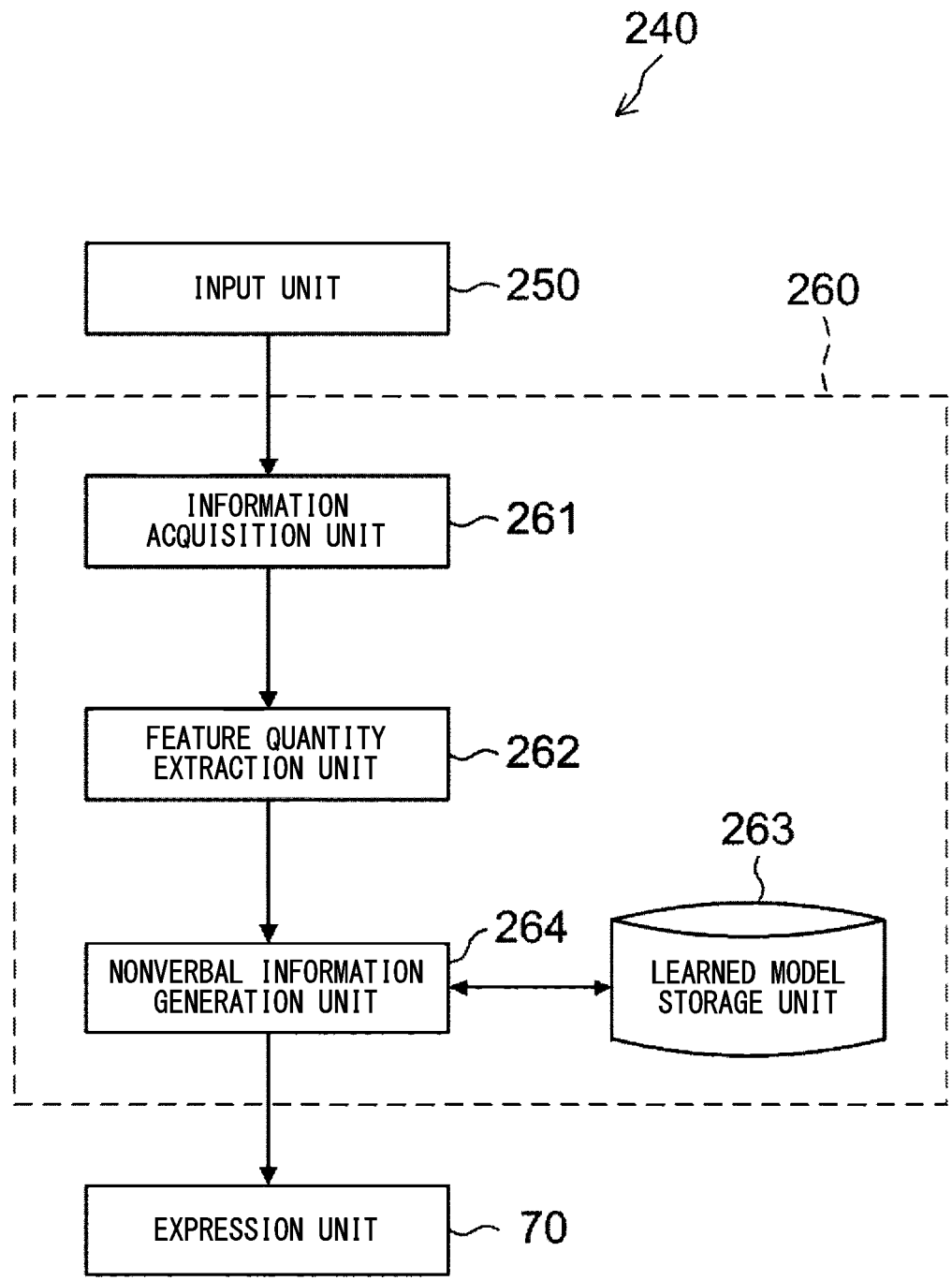
FIG. 9 is a block diagram showing an example of the configuration of a nonverbal information generation apparatus in accordance with the second embodiment.

FIG. 9 is a block diagram illustrating an example of the configuration of a nonverbal information generation apparatus 240 in accordance with the second embodiment. As shown in FIG. 9, the nonverbal information generation apparatus 240 in accordance with the present embodiment is configured by a computer provided with a central processing unit (CPU), a random access memory (RAM), and a read only memory (ROM) that stores a program for executing a nonverbal information generation processing routine described later. The nonverbal information generation apparatus 240 is functionally provided with an input unit 250, a calculation unit 260, and an expression unit 70.

The input unit 250 receives text information.

The calculation unit 260 is provided with an information acquisition unit 261, a feature quantity extraction unit 262, a learned model storage unit 263, and a nonverbal information generation unit 264.

Figure 10:
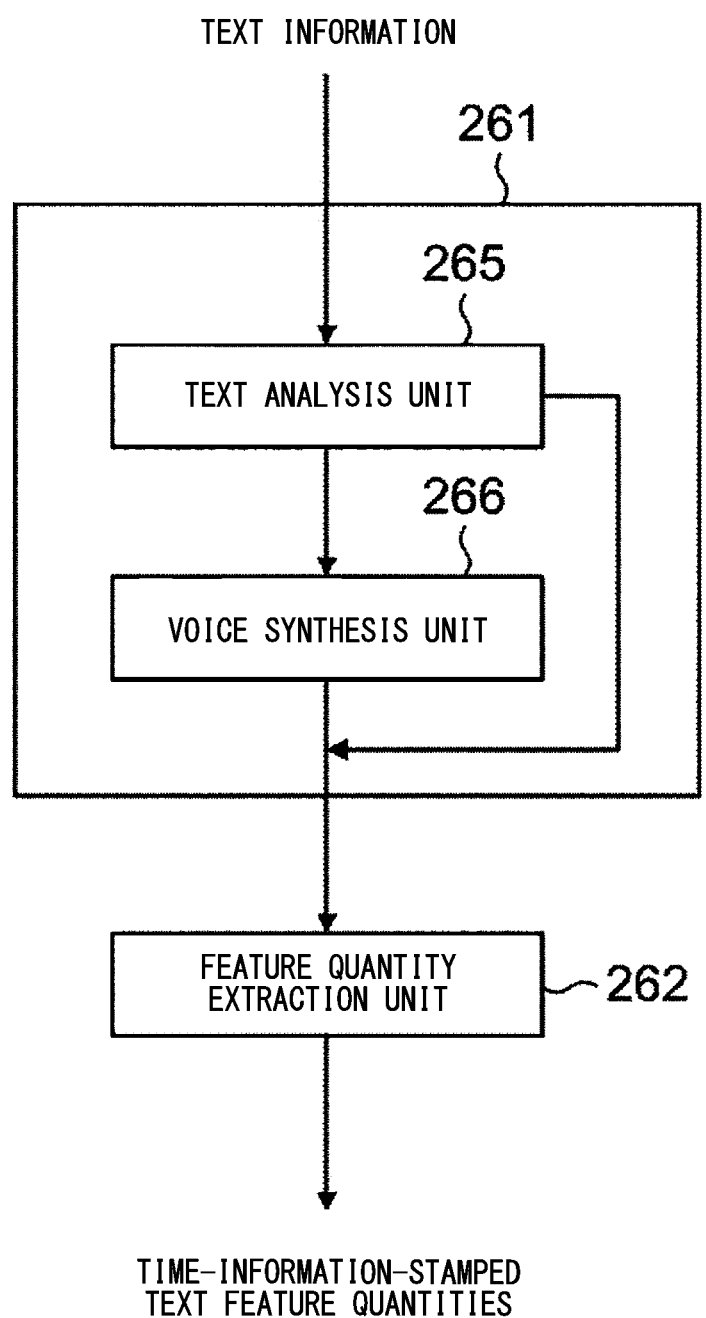
FIG. 10 is a diagram showing a detailed configuration example of an information acquisition unit in accordance with the second embodiment.

The information acquisition unit 261 acquires the text information received by the input unit 250. Further, the information acquisition unit 261 acquires voice information corresponding to the text information, and acquires time information representing the time from a start time to an end time of the voice information being emitted. As shown in FIG. 10, the information acquisition unit 261 is provided with a text analysis unit 265 and a voice synthesis unit 266.

Similarly to the learning text analysis unit 237, the text analysis unit 265 performs a predetermined text analysis on the text information received by the input unit 250, and acquires a result of the text analysis.

Similarly to the learning voice synthesis unit 238, the voice synthesis unit 266 synthesizes voice information corresponding to the text information on the basis of the text analysis result obtained by the text analysis unit 265. Then, the voice synthesis unit 266 acquires time information corresponding to the start time to the end time of the voice of the utterance generated by the voice synthesis.

Similarly to the learning feature quantity extraction unit 232, the feature quantity extraction unit 262 extracts time-information-stamped text feature quantities representing feature quantities of the text information from the text information and the time information acquired by the information acquisition unit 261.

The same learned nonverbal information generation model as the learned nonverbal information generation model stored in the learned model storage unit 236 is stored in the learned model storage unit 263.

The nonverbal information generation unit 264 generates time-information-stamped nonverbal information corresponding to the time-information-stamped text feature quantities extracted by the feature quantity extraction unit 262, on the basis of the time-information-stamped text feature quantities extracted by the feature quantity extraction unit 262 and the learned nonverbal information generation model stored in the learned model storage unit 263.

For example, the nonverbal information generation unit 264, using the learned nonverbal information generation model $$M^{T1,T2} \quad [\text{Expression 28}]$$

stored in the learned model storage unit 263, receives an input of arbitrary feature quantities as a time-information-stamped text feature quantities $$X_D^{T1,T2} \searrow X_P^{T1,T2} \quad [\text{Expression 29}]$$

to acquire a gesture $$Y^{T1,T2} \quad [\text{Expression 30}]$$

as a generation parameter corresponding to time-information-stamped nonverbal information.

Then, the nonverbal information generation unit 264 controls the expression unit 70 so that the time-information-stamped generation parameter that has been generated is output from the expression unit 70.

Specifically, the nonverbal information generation unit 264 causes the gesture $$Y^{T1,T2} \quad [\text{Expression 31}]$$

to be reflected as an action of an arbitrary target (for example, an animation character, a robot, or the like) in the expression unit 70.

The expression unit 70 causes the voice information corresponding to the text information received by the input unit 250 and the nonverbal information generated by the nonverbal information generation unit 264 to be expressed under the control of the nonverbal information generation unit 264.

<Operation of Nonverbal Information Generation Model Learning Apparatus 210>

Figure 11:
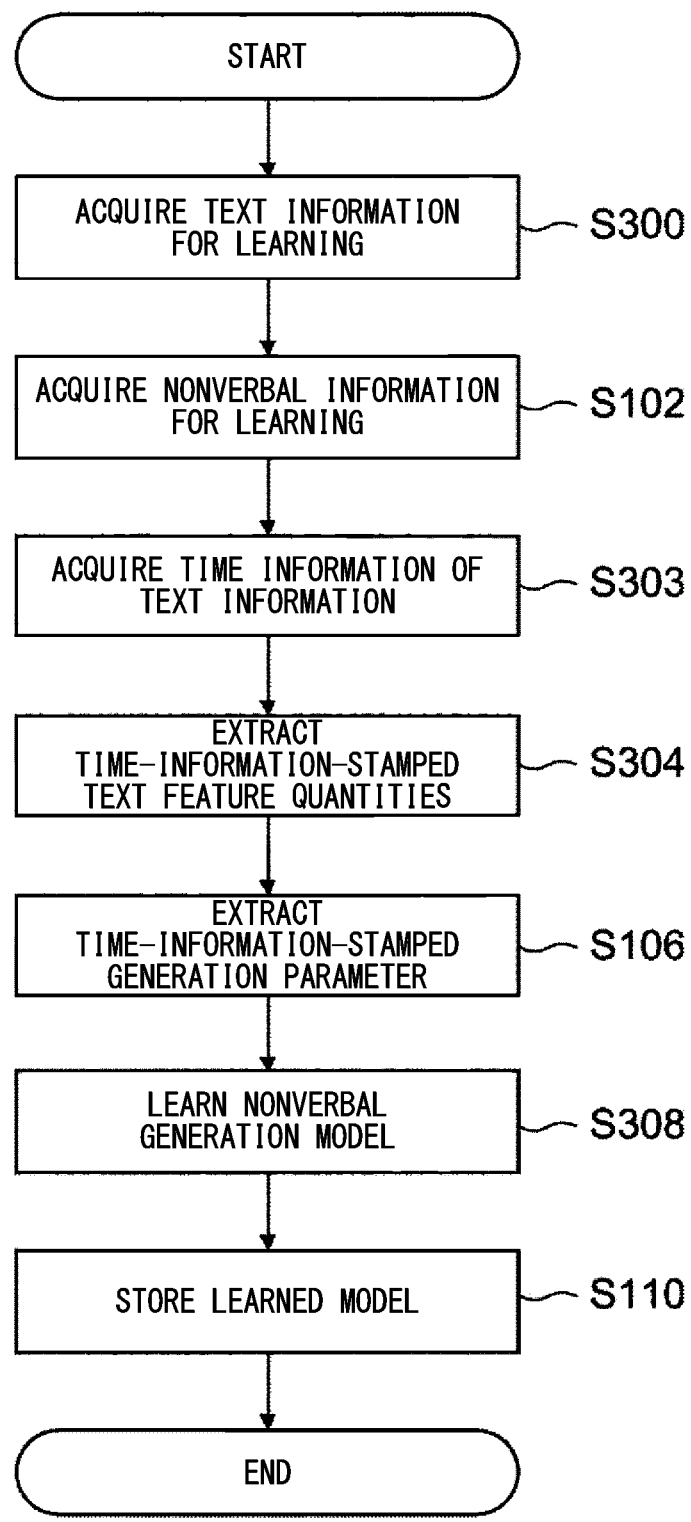
FIG. 11 is a flowchart showing an example of the flow of the learning process in accordance with the second embodiment.

Next, the operation of the nonverbal information generation model learning apparatus 210 in accordance with the second embodiment will be described. First, when learning data representing a combination of a plurality of pieces of text information for learning and a plurality of pieces of nonverbal information for learning is input to the learning input unit 220 of the nonverbal information generation model learning apparatus 210, the nonverbal information generation model learning apparatus 210 executes the learning processing routine shown in FIG. 11.

First, in Step S300, the learning information acquisition unit 231 acquires text information for learning from among the plurality of sets of learning data received by the learning input unit 220 (specifically, pairs of text information and nonverbal information).

In Step S303, the learning text analysis unit 237 performs a predetermined text analysis on the text information for learning acquired in Step S300 and acquires a result of the text analysis. Further, the learning voice synthesis unit 238 synthesizes voice information for learning corresponding to the text information for learning on the basis of the text analysis result acquired by the learning text analysis unit 237. Then, the learning voice synthesis unit 238 acquires time information representing the time from the start time to the end time when the voice information for learning is emitted.

In Step S304, the learning feature quantity extraction unit 232 extracts time-information-stamped text feature quantities for learning from the text information for learning and time information acquired in Step S303.

In Step S308, the learning unit 235 learns a nonverbal information generation model for generating a time-information-stamped generation parameter from the time-information-stamped text feature quantities, on the basis of the time-information-stamped text feature quantities for learning extracted in Step S304 and the time-information-stamped generation parameter for learning acquired in Step S106.

<Operation of Nonverbal Information Generation Apparatus 240>

Figure 12:
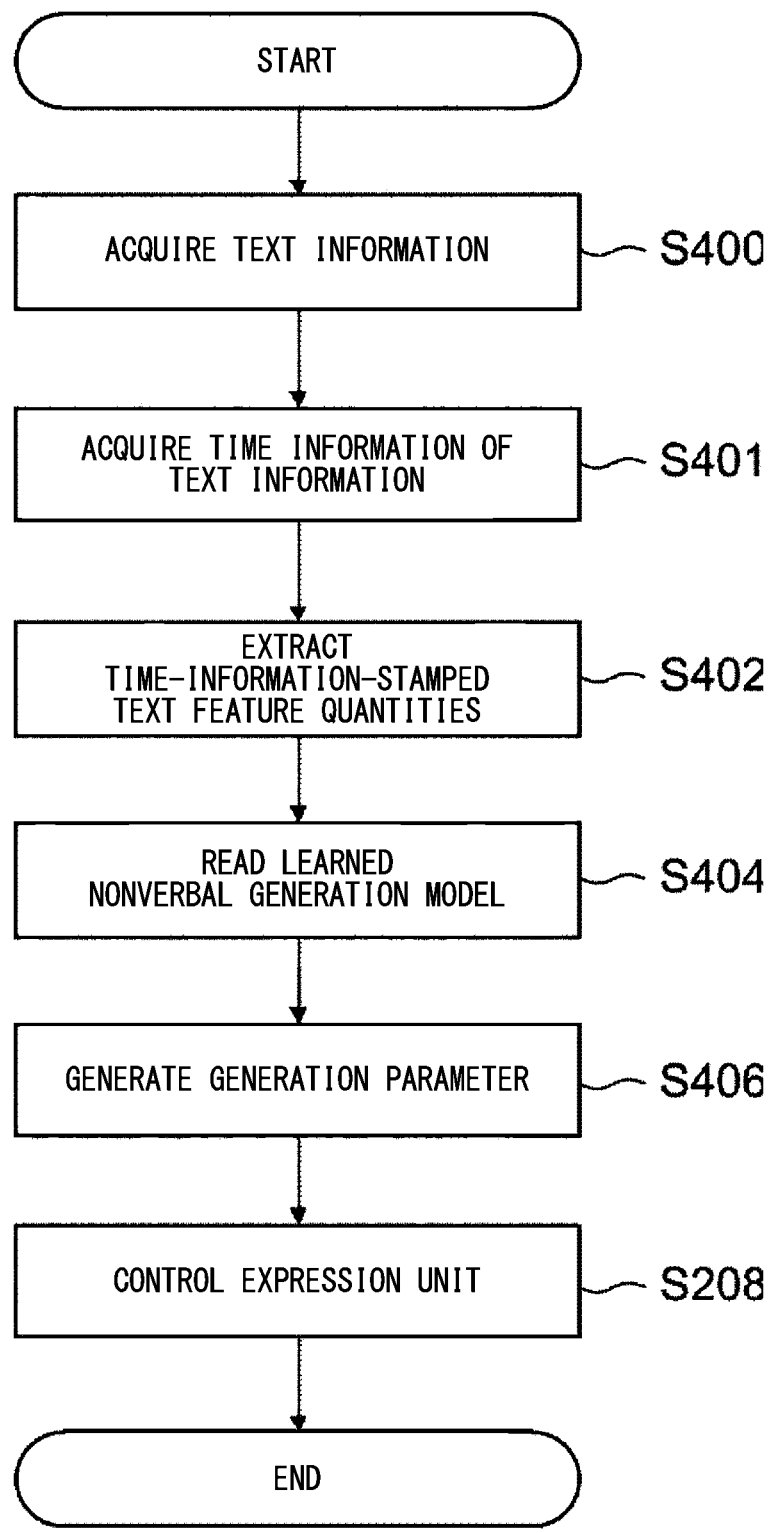
FIG. 12 is a flowchart showing an example of the flow of the nonverbal information generation process in accordance with the second embodiment.

Next, the operation of the nonverbal information generation apparatus 240 in accordance with the second embodiment will be described. First, when the learned nonverbal information generation model stored in the learned model storage unit 236 of the nonverbal information generation model learning apparatus 210 is input to the nonverbal information generation apparatus 240, the learned nonverbal information generation model is stored in the learned model storage unit 263 of the nonverbal information generation apparatus 240. Then, when text information that is the target of nonverbal information generation is input to the input unit 250, the nonverbal information generation apparatus 240 executes the nonverbal information generation processing routine shown in FIG. 12.

In Step S400, the information acquisition unit 261 acquires the text information received by the input unit 250.

In Step S401, the text analysis unit 265 performs a predetermined text analysis on the text information acquired in Step S400, and acquires a result of the text analysis. Further, the voice synthesis unit 266 synthesizes voice information corresponding to the text information on the basis of the text analysis result obtained by the text analysis unit 265. Then, the voice synthesizing unit 266 acquires time information representing the time from the start time to the end time when the voice information is emitted.

In Step S402, the feature quantity extraction unit 262 extracts time-information-stamped text feature quantities from the text information and the time information acquired in Step S401.

In Step S404, the nonverbal information generation unit 264 reads the learned nonverbal information generation model stored in the learned model storage unit 263.

In Step S406, the nonverbal information generation unit 264 generates a time-information-stamped generation parameter corresponding to the time-information-stamped text feature quantities extracted in Step S402, on the basis of the time-information-stamped text feature quantities extracted in Step S402 and the learned nonverbal information generation model read in Step S404.

It should be noted that since other configurations and operations of the nonverbal information generation apparatus and the nonverbal information generation model learning apparatus in accordance with the second embodiment are the same as those in the first embodiment, descriptions thereof will be omitted.

As described above, the nonverbal information generation apparatus 240 in accordance with the second embodiment acquires voice information corresponding to text information, acquires time information representing the time from the start time to the end time when the voice information is emitted, and generates time-information-stamped nonverbal information corresponding to the time-information-stamped text feature quantities on the basis of the time-informationstamped text feature quantities and the learned model for generating time-information-stamped nonverbal information. This makes it possible to automatically associate the text information with the nonverbal information and to reduce the cost of doing so.

Also, in the present embodiment, by generating a learned nonverbal information generation model for generating time-information-stamped nonverbal information from the time-information-stamped text feature quantities, text information is set as input, and time-information-stamped nonverbal information (nonverbal information to which the output timing has been assigned) corresponding to an action that corresponds to the input is output.

Thereby, with the present embodiment, it is possible to automatically generate nonverbal information from text information, and thus it is not necessary to individually register nonverbal information for an utterance as in the conventional art, and so costs are greatly reduced. Further, by using the present embodiment, it is possible to generate nonverbal behavior at a human-like natural timing for the input text information. Thereby, advantageous effects are attained such as an improvement in the human-like nature and naturalness of agents, robots, or the like, facilitation of transmission of intention by nonverbal behavior, enlivening of conversation, and the like.

Further, the nonverbal information generation model learning apparatus 210 in accordance with the second embodiment learns a nonverbal information generation model for generating time-information-stamped nonverbal information from the time-information-stamped text feature quantities on the basis of the time-information-stamped text feature quantities for learning and the time-information-stamped nonverbal information for learning. Thereby, it is possible to obtain a nonverbal information generation model for generating nonverbal information from text feature quantities while reducing the cost of associating text information with nonverbal information.

Further, in the second embodiment described above, the case in which nonverbal information is generated from text feature quantities has been described as an example. In the second embodiment described above, it is possible to generate nonverbal information by using information such as word notation, parts of speech, and dialogue acts as clues. By using such a configuration, it is possible to generate nonverbal information with the minimum required configuration when the input does not involve voice, such as dialogue in a chat.

Third Embodiment

Next, a third embodiment of the present invention will be described. It should be noted that components with the same configuration as those in the first or second embodiment are denoted by the same reference signs, with descriptions thereof being omitted.

In the third embodiment, both voice information and text information are used as inputs. The difference from the first and second embodiments is that nonverbal information is generated from voice information and text information. It should be noted that the text information used in the third embodiment is text information representing uttered content, when a speaker is speaking externally via voice.

Figure 13A:
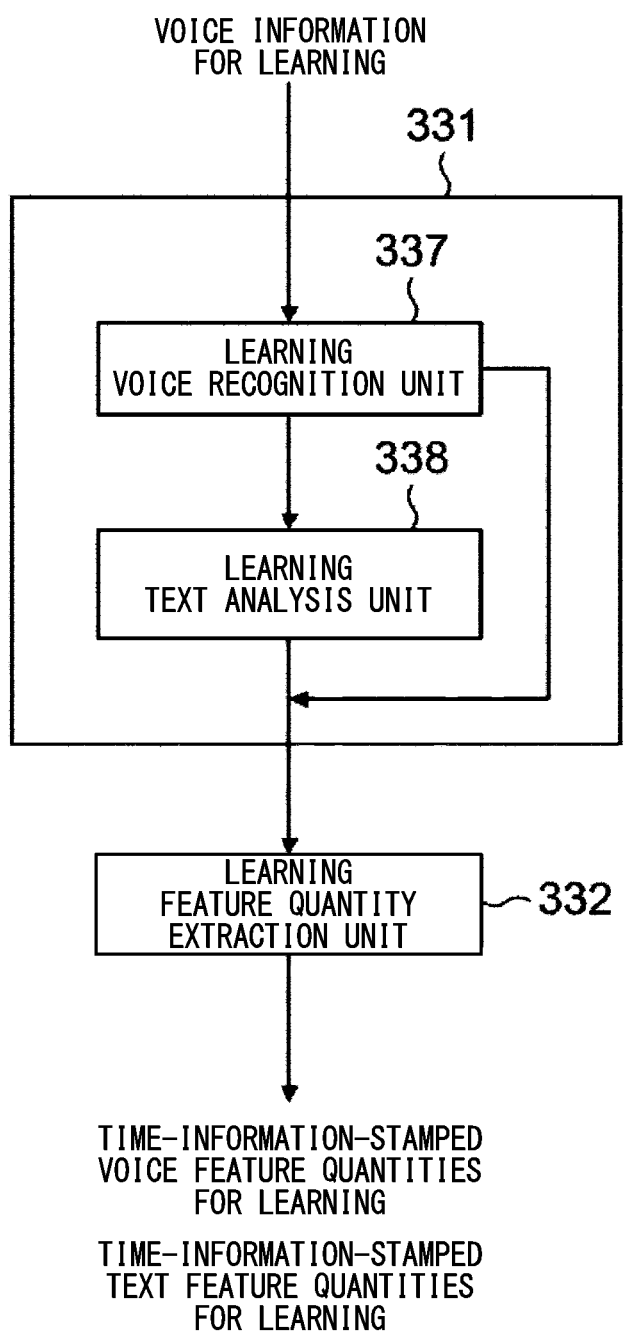
FIG. 13A is an explanatory diagram for describing the learning information acquisition unit and a learning feature quantity extraction unit in accordance with the third embodiment.

FIG. 13A shows a configuration example of a learning information acquisition unit 331 and a learning feature quantity extraction unit 332 in the nonverbal information generation model learning apparatus of the third embodiment.

As shown in FIG. 13A, when voice information for learning is input, a learning voice recognition unit 337 performs a predetermined voice recognition process on the voice information for learning and acquires text information corresponding to the voice information for learning (hereinafter referred to as recognition text for learning).

Then, a learning text analysis unit 338 performs a predetermined text analysis on the recognition text for learning and acquires a result of the text analysis.

Then, the learning feature quantity extraction unit 332 extracts time-information-stamped voice feature quantities from the voice information for learning. The learning feature quantity extraction unit 332 additionally extracts time-information-stamped text feature quantities from the recognition text for learning.

Then, the learning unit (not shown) of the third embodiment learns a nonverbal information generation model on the basis of the time-information-stamped voice feature quantities for learning and the time-information-stamped text feature quantities for learning, and the nonverbal information for learning. Thereby, it is possible to obtain a nonverbal information generation model for generating time-information-stamped nonverbal information from the time-information-stamped voice feature quantities and the time-information-stamped text feature quantities.

Figure 13B:
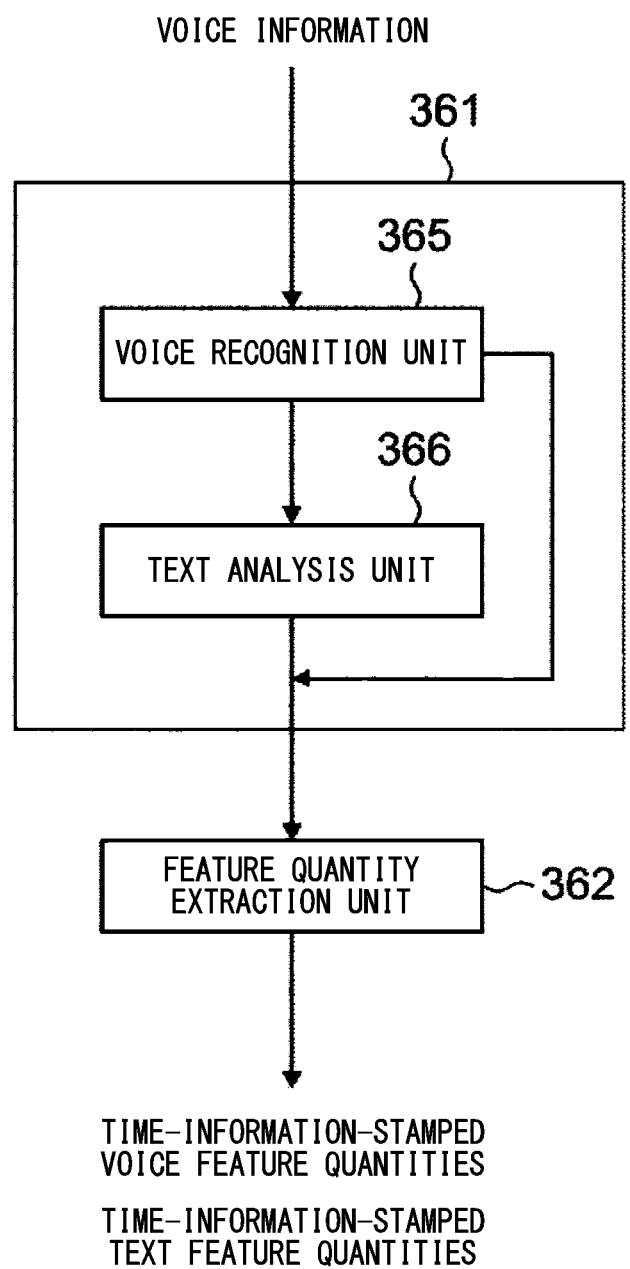
FIG. 13B is an explanatory diagram for describing an information acquisition unit and a feature quantity extraction unit in accordance with the third embodiment.

FIG. 13B shows a configuration example of an information acquisition unit 361 and a feature quantity extraction unit 362 in the nonverbal information generation apparatus of the third embodiment.

As shown in FIG. 13B, when voice information is input, a voice recognition unit 365 performs a predetermined voice recognition process on the voice information, and acquires text information corresponding to the voice information (hereinafter, referred to as recognition text). Then, a text analysis unit 366 performs a predetermined text analysis on the recognition text and acquires a result of the text analysis.

Then, the feature quantity extraction unit 362 extracts time-information-stamped voice feature quantities from the voice information. The feature quantity extraction unit 362 also extracts time-information-stamped text feature quantities from the recognition text.

Then, a nonverbal information generation unit (not shown) of the third embodiment generates time-information-stamped nonverbal information on the basis of the time-information-stamped voice feature quantities, the time-information-stamped text feature quantities, and the learned nonverbal information generation model. Thereby, it is possible to appropriately generate the nonverbal information using both the time-information-stamped voice feature quantities and the time-information-stamped text feature quantities.

It should be noted that when generating the nonverbal information using both the voice feature quantities and the text feature quantities, it is preferable that there be correspondence and agreement between the voice feature quantities and the text feature quantities on the time axis of the time information, as shown in FIG. 3.

In addition, when generating the nonverbal information using both the voice feature quantities and the text feature quantities and expressing the nonverbal information with the expression unit, it is also possible to present the voice information or text information serving as input together with synthesized voice obtained from the text information, or recognition text obtained from the voice information.

As described above, the nonverbal information generation apparatus in accordance with the third embodiment generates time-information-stamped nonverbal information on the basis of the time-information-stamped voice feature quantities and the time-information-stamped text feature quantities, and the learned nonverbal information generation model for generating time-information-stamped nonverbal information. Thereby, it is possible to reduce the cost of associating voice information and text information with nonverbal information.

Further, the nonverbal information generation model learning apparatus in accordance with the third embodiment can obtain a nonverbal information generation model for generating time-information-stamped nonverbal information from the time-information-stamped voice feature quantities and the time-information-stamped text feature quantities on the basis of time-information-stamped voice feature quantities for learning and the time-information-stamped text feature quantities for learning.

It should be noted that in the third embodiment described above, the case in which the input information is voice information has been described as an example, but the present invention is not limited thereto. For example, the input information may be text information.

Figure 14A:
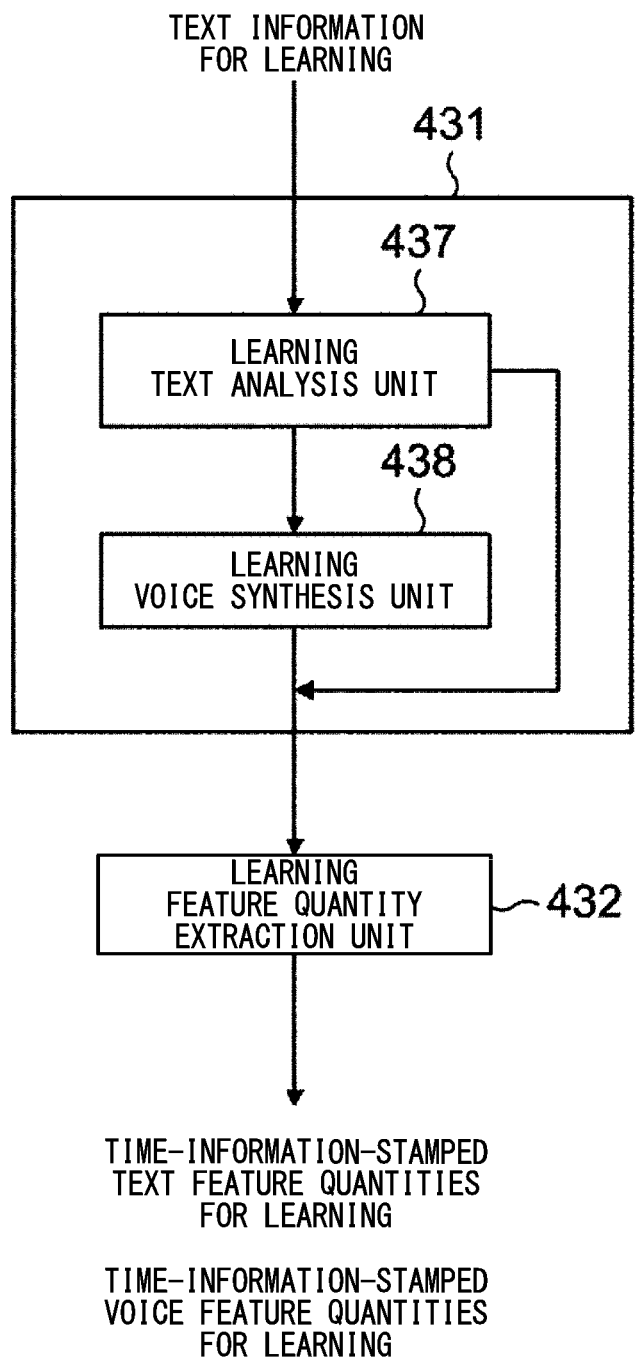
FIG. 14A is an explanatory diagram for describing a modified example of the third embodiment.

FIG. 14A shows a configuration example of a learning information acquisition unit 431 and a learning feature quantity extraction unit 432 in the nonverbal information generation model learning apparatus when the input information is text information.

As illustrated in FIG. 14A, when text information for learning is input, a learning text analysis unit 437 performs a predetermined text analysis process on the text information for learning and obtains a result of the text analysis corresponding to the text information for learning.

Then, a learning voice synthesis unit 438 performs a predetermined voice synthesis process on the text analysis result and acquires voice information for learning.

Then, the learning feature quantity extraction unit 432 extracts time-information-stamped voice feature quantities from the voice information for learning. Further, the learning feature quantity extraction unit 432 extracts time-information-stamped text feature quantities from the text information for learning.

The learning unit (not shown) learns a nonverbal information generation model on the basis of the time-information-stamped voice feature quantities for learning, the time-information-stamped text feature quantities for learning, and the nonverbal information for learning. Thereby, it is possible to obtain a nonverbal information generation model for generating time-information-stamped nonverbal information from the time-information-stamped voice feature quantities and the time-information-stamped text feature quantities.

Figure 14B:
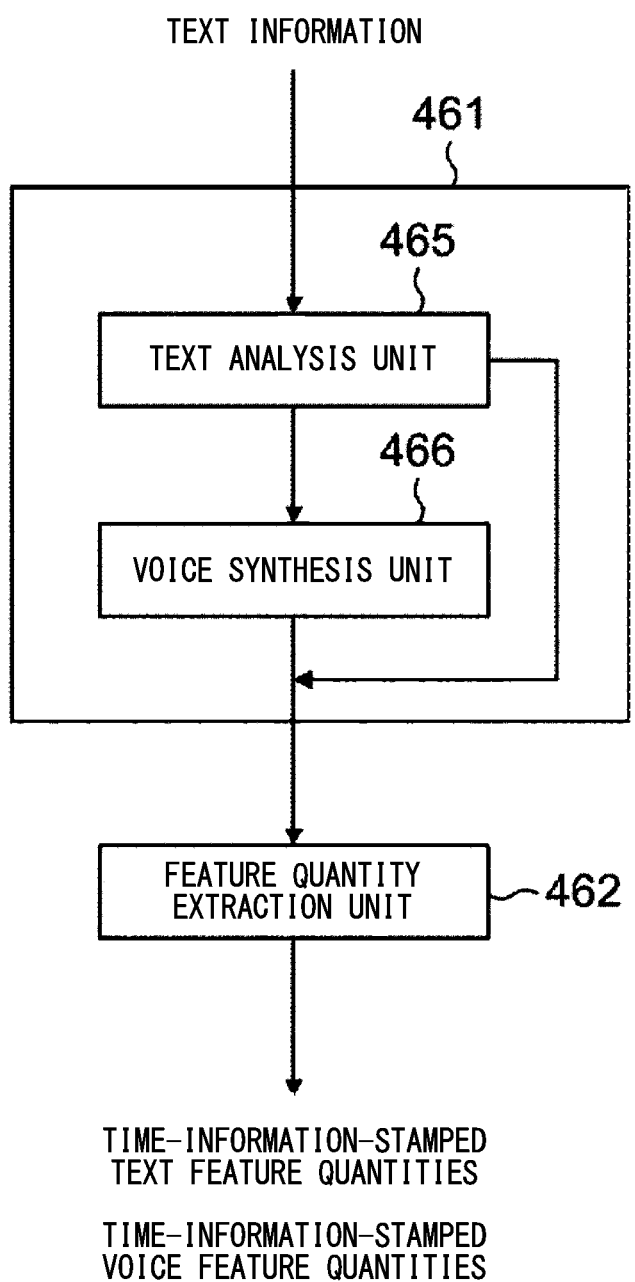
FIG. 14B is an explanatory diagram for describing a modified example of the third embodiment.

Further, FIG. 14B shows a configuration example of an information acquisition unit 461 and a feature quantity extraction unit 462 in the nonverbal information generation apparatus when the input information is text information.

As shown in FIG. 14B, when text information is input, a text analysis unit 465 performs a predetermined text analysis process on the text information and acquires a result of the text analysis corresponding to the text information.

Then, a voice synthesis unit 466 performs a predetermined voice synthesis process on the text analysis result and acquires voice information.

Then, the feature quantity extraction unit 462 extracts time-information-stamped voice feature quantities from the voice information. Further, the feature quantity extraction unit 462 extracts time-information-stamped text feature quantities from the text information.

Then, the nonverbal information generation unit (not shown) acquires a generation parameter representing nonverbal information on the basis of the time-information-stamped voice feature quantities, the time-information-stamped text feature quantities, and the nonverbal information generation model learned in advance.

It should be noted that the present invention is not limited to the above-described embodiments, and various modifications and applications are possible without departing from the gist of the present invention.

For example, as shown in FIG. 15, there are a total of four patterns of the configuration corresponding to a combination of the information acquisition unit (or the learning information acquisition unit) and the feature quantity extraction unit (or the learning feature quantity extraction unit) in each of the above-described embodiments. In addition, the patterns shown in FIG. 16 are possible variations as combinations of configurations during learning and during nonverbal information generation. It should be noted that the accuracy at the time of nonverbal information generation is higher when the feature quantities at the time of learning and at the time of generation are the same.

The present invention can also be realized by installing a program in a well-known computer via a medium or a communication line.

Further, although the above-described apparatuses have a computer system inside, if the "computer system" uses a World Wide Web (WWW) system, the computer system may include a homepage providing environment (or display environment).

Further, in the specification of the present application, an embodiment in which the program is preinstalled has been described, but the program can also be provided by being stored in a computer-readable recording medium.

It should be noted that other embodiments will be described below.

Outline of Other Embodiments

Learning data used in the nonverbal information generation model learning apparatus is created by using a measuring apparatus to acquire nonverbal information (Y) of a conversation partner who is an interlocutor of a speaker who is speaking, at the same time as acquiring voice information (X) of the speaker who is speaking, in for example the scene depicted in FIG. 2.

When performing learning of a nonverbal information generation model on the basis of learning data created in this way, it becomes possible to realize agents, robots, and the like that perform nonverbal behavior of reactions (for example, throwing in an appropriate word) at an appropriate timing in response to the voice information or text information serving as input information.

Moreover, in the scene as shown in FIG. 2 above, it is also possible to create learning data by acquiring the voice information (X) of the speaker who is speaking and simultaneously acquiring the nonverbal information (Y) of the other participants by using the measuring apparatus.

In this way, if learning of a nonverbal information generation model is performed on the basis of the nonverbal information of each of a plurality of participants, a plurality of robots and agents can be made to react at appropriate and different timings to voice information or text information serving as input information.

In this case, a learned nonverbal information generation model learns a combination of the voice information acquired from the speaker and nonverbal information representing information about the behavior of an interlocutor of the speaker (for example, a listener of the conversation or a participant of the conversation) as learning data. Here, not only a listener of the conversation and a participant of the conversation but also observers of the conversation may be included as interlocutors of the speaker, and so "entities that exhibit some reaction to the speaker's voice (and the content thereof)" are also expressed as "listeners to an utterance".

Further, when targeting text information, a learned nonverbal information generation model learns a combination of text information corresponding to voice information acquired from the speaker and nonverbal information representing information about the behavior of an interlocutor of the speaker (for example, the listener of the conversation or a participant of the conversation) as learning data.

It should be noted that the following fourth to sixth embodiments are the first to third modification examples.

Fourth Embodiment

In the fourth embodiment, with voice information targeted, a nonverbal information generation model learning apparatus learns a nonverbal information generation model for generating time-information-stamped nonverbal information from time-information-stamped voice feature quantities, on the basis of time-information-stamped voice feature quantities for learning extracted from the voice information for learning output from the speaker ("speaker" in FIG. 2) and nonverbal information for learning representing information about the behavior of an interlocutor of the speaker (for example, "other participants" or "speaker's conversation partner" in FIG. 2). Thereby, a learned nonverbal information generation model representing the behavior of the interlocutor of the speaker can be obtained in accordance with the voice information acquired from the speaker. It should be noted that, as shown in FIG. 2, "speaker" represents a person who produces voices such as an utterance. Further, the "speaker's conversation partner" represents, for example, a person who is listening to an utterance or the like uttered by the speaker, and corresponds to an "other participants" and "speaker's conversation partner" shown in FIG. 2. Further, the behavior of the interlocutor of the speaker is, for example, the reaction of the interlocutor of the speaker in response to the voice uttered by the speaker.

Also, when the voice information that is the target of nonverbal information generation is input, the nonverbal information generation apparatus generates time-information-stamped nonverbal information on the basis of the time-information-stamped voice feature quantities extracted from the voice information acquired from the speaker and the learned nonverbal information generation model.

It should be noted that since other configurations and operations of the nonverbal information generation model learning apparatus and the nonverbal information generation apparatus of the fourth embodiment are the same as those of the first embodiment, descriptions thereof will be omitted.

Fifth Embodiment

In the fifth embodiment, with text information targeted, a nonverbal information generation model learning apparatus learns a nonverbal information generation model for generating time-information-stamped nonverbal information from time-information-stamped text feature quantities, on the basis of time-information-stamped text feature quantities for learning extracted from text corresponding to voice information for learning obtained from a speaker and nonverbal information for learning representing information related to the behavior of the interlocutor of the speaker. Thereby, a learned nonverbal information generation model representing the behavior of the interlocutor of the speaker is obtained in accordance with the text information corresponding to the voice information acquired from the speaker.

Further, when the text information of the nonverbal information generation target has been input, the nonverbal information generation apparatus generates time-information-stamped nonverbal information on the basis of the time-information-stamped text feature quantities extracted from the text information corresponding to the voice information acquired from the speaker, and the learned nonverbal information generation model.

It should be noted that since other configurations and operations of the nonverbal information generation model learning apparatus and the nonverbal information generation apparatus of the fifth embodiment are the same as those of the second embodiment, descriptions thereof will be omitted.

Sixth Embodiment

In the sixth embodiment, with both voice information and text information targeted, a nonverbal information generation model learning apparatus learns a nonverbal information generation model for generating time-information-stamped nonverbal information from time-information-stamped voice feature quantities and time-information-stamped text feature quantities, on the basis of time-information-stamped voice feature quantities for learning, time-information-stamped text feature quantities for learning, and nonverbal information for learning representing information related to the behavior of the interlocutor of the speaker. Thereby, a learned nonverbal information generation model representing the behavior of the interlocutor of the speaker is obtained in accordance with the voice information and the text information.

Further, when both voice information and text information of the nonverbal information generation target have been input, the nonverbal information generation apparatus generates time-information-stamped nonverbal information on the basis of the time-information-stamped voice feature quantities, the time-information-stamped text feature quantities, and the learned nonverbal information generation model.

It should be noted that since other configurations and operations of the nonverbal information generation model learning apparatus and the nonverbal information generation apparatus of the sixth embodiment are the same as those of the third embodiment, descriptions thereof will be omitted.

Seventh Embodiment

<Configuration of Nonverbal Information Generation Model Learning Apparatus>

Next, a seventh embodiment of the present invention will be described. It should be noted that components with the same configuration as those in the first embodiment are denoted by the same reference signs, with descriptions thereof being omitted.

In the seventh embodiment, a gesture corresponding to an input utterance is generated on the basis of a learned machine learning model. At that time, as the gesture, not only the presence/absence of behavior but also information about the magnitude, the number of times, and the ratio of the pause length is generated. Moreover, a point of difference from the first embodiment is, in addition to uttered voice or text being used as input, a variable that influences the generation of a gesture is further used as "additional information" to perform learning of a nonverbal information generation model that generates nonverbal information.

It should be noted that the text information used in the seventh embodiment is text information representing the utterance content when a speaker is speaking externally via voice.

Figure 17:
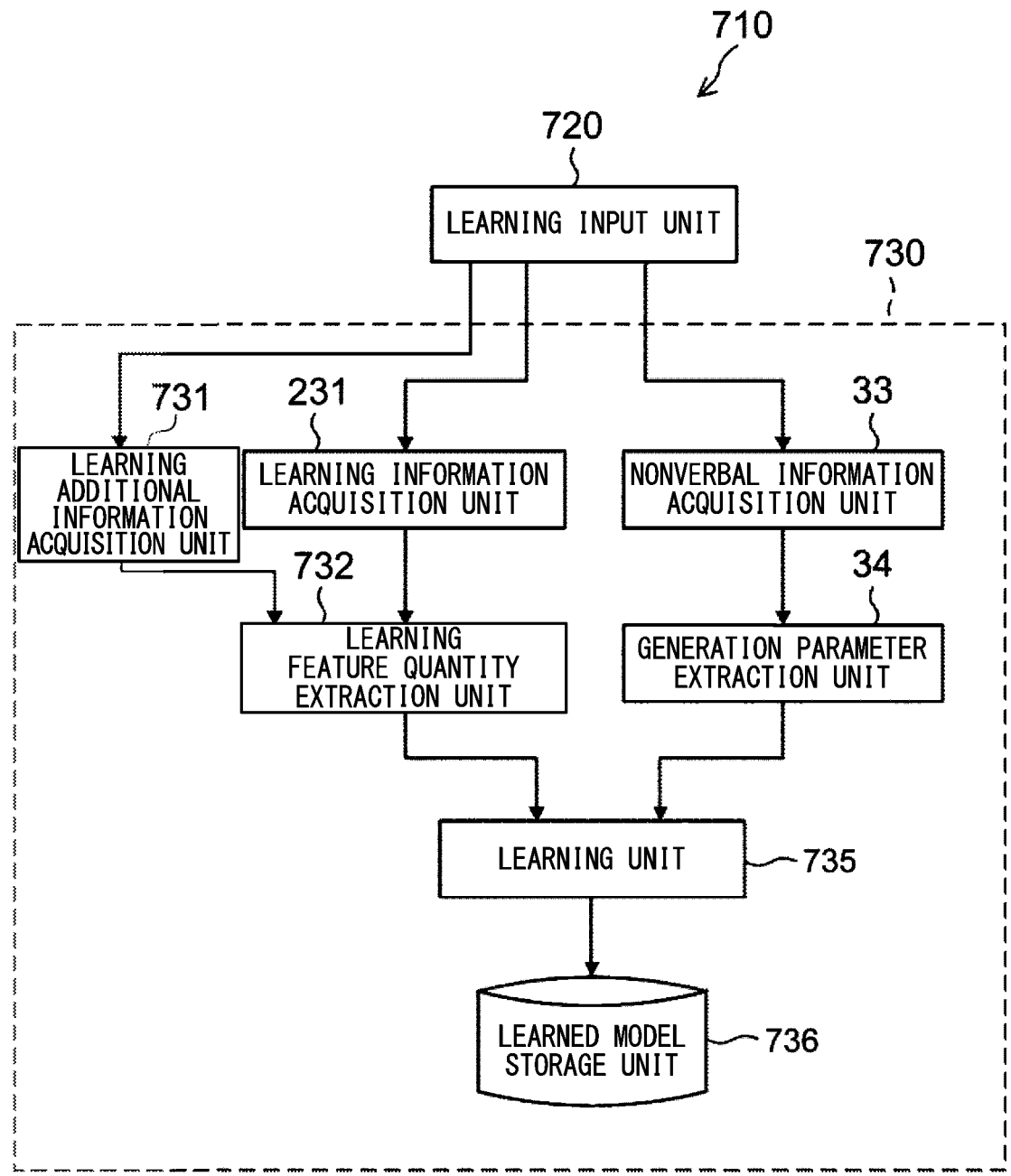
FIG. 17 is a block diagram showing an example of the configuration of the nonverbal information generation model learning apparatus in accordance with a seventh embodiment.

FIG. 17 is a block diagram showing an example of the configuration of a nonverbal information generation model learning apparatus 710 in accordance with the seventh embodiment. As shown in FIG. 17, the nonverbal information generation model learning apparatus 710 in accordance with the seventh embodiment is configured by a computer provided with a CPU, a RAM, and a ROM that stores a program for executing a learning processing routine described later. The nonverbal information generation model learning apparatus 710 is functionally provided with a learning input unit 720 and a learning calculation unit 730.

The learning input unit 720 receives learning data including a combination of text information for learning, nonverbal information for learning, and additional information for learning.

The received nonverbal information includes not only the presence/absence of behavior but also information about the magnitude, number of times, and ratio of pause length.

Specifically, the nonverbal information includes any behavior included in the behavior list tables shown in Tables 2 to 4 below.

TABLE 2

| No. | Primary Item | Secondary Item | Content | End Position |
|---|---|---|---|---|
| 1 | Head_pitch | Initial | Normal state (front) | Initial |
| 2 | | nod_1l | 1 large nod | Initial |

TABLE 2-continued

| No. | Primary Item | Secondary Item | Content | End Position |
|---|---|---|---|---|
| 3 | | nod_1m | 1 moderate nod | Initial |
| 4 | | nod_1s | 1 small nod | Initial |
| 5 | | nod_2l | 2 large nods | Initial |
| 6 | | nod_2m | 2 moderate nods | Initial |
| 7 | | nod_2s | 2 small nods | Initial |
| 8 | | nod_3l | 3 large nods | Initial |
| 9 | | nod_3m | 3 moderate nods | Initial |
| 10 | | nod_3s | 3 small nods | Initial |
| 11 | | nod_4l | 3 large nods | Initial |
| 12 | | nod_4m | 3 moderate nods | Initial |
| 13 | | nod_4s | 3 small nods | Initial |
| 14 | | nod_5l | 5 or more large nods | Initial |
| 15 | | nod_5m | 5 or more moderate nods | Initial |
| 16 | | nod_5s | 5 or more small nods | Initial |
| 17 | | upper_l | Large head rotation upward | Upper_L |
| 18 | | down_l | Large head rotation downward | Down_L |
| 19 | | upper_m | Moderate head rotation upward | Upper_M |
| 20 | | down_m | Moderate head rotation downward | Down_M |
| 21 | | upper_s | Small head rotation upward | Upper_S |
| 22 | | down_s | Small head rotation downward | Down_S |
| 24 | Head_yaw | initial | Normal state (front) | Initial |
| 25 | | right_l | Large look to right | Right_L |
| 26 | | left_l | Large look to left | Left_L |
| 27 | | right_m | Moderate look to right | Right_M |
| 28 | | left_m | Moderate look to left | Left_M |
| 29 | | right_s | Small look to right | Right_S |
| 30 | | left_s | Small look to left | Left_S |
| 31 | | shake_l | Shake head side to side greatly | Initial |
| 32 | | shake_m | Shake head side to side moderately | Initial |
| 33 | | shake_s | Shake head side to side slightly | Initial |

TABLE 3

| No. | Primary Item | Secondary Item | Content | End Position |
|---|---|---|---|---|
| 35 | Head_roll | initial | Normal state (front) | Initial |
| 36 | | tilt_right_l | Tilt head greatly to right | Tilt_right_L |
| 37 | | tilt_left_l | Tilt head greatly to left | Tilt_left_L |
| 38 | | tilt_right_m | Tilt head moderately to right | Tilt_right_M |
| 39 | | tilt_left_m | Tilt head moderately greatly to left | Tilt_left_M |
| 40 | | tilt_right_s | Tilt head slightly to right | Tilt_right_S |
| 41 | | tilt_left_s | Tilt head slightly to left | Tilt_left_S |
| 43 | Hand_gesture | initial_down | Normal state (hands down) | Initial_down |
| 44 | | initial_chest | Normal state (hands bent and spread out, at arm height) | Initial_chest |
| 46a | | iconic_1 | Express scenic portrayal and action | Initial_chest |
| 46b | | iconic_2 | Express scenic portrayal and action | Initial_chest |
| 46c | | iconic_6 | Express scenic portrayal and action | Initial_chest |
| 47a | | metaphoric_1 | Pictorial, graphic gesture | Initial_chest |
| 47b | | metaphoric_2 | Pictorial, graphic gesture | Initial_chest |
| 47c | | metaphoric_7 | Pictorial, graphic gesture | Initial_chest |
| 48a | | beat_1 | Adjust tone of utterance and emphasize remark | Initial_chest |
| 48b | | beat_2 | Adjust tone of utterance and emphasize remark | Initial_chest |
| 48c | | beat_8 | Adjust tone of utterance and emphasize remark | Initial_chest |
| 49a | | deictic_1 | Pointing | Initial_chest |
| 49b | | deictic_2 | Pointing | Initial_chest |
| 49c | | deictic_9 | Pointing | Initial_chest |
| 50a | | feedback_1 | Sympathize/agree with/respond to utterance of another person | Initial_chest |
| 50b | | feedback_2 | Sympathize/agree with/respond to utterance of another person | Initial_chest |
| 50c | | feedback_10 | Sympathize/agree with/respond to utterance of another person | Initial_chest |

TABLE 3-continued

| | | | |
|---|---|---|---|
| 51a | compellation_1 | Call the other person | Initial_chest |
| 51b | compellation_2 | Call the other person | Initial_chest |
| 51c | compellation_11 | Call the other person | Initial_chest |
| 52a | hesitate_1 | Hesitate to mention | Initial_chest |
| 52b | hesitate_2 | Hesitate to mention | Initial_chest |
| 52c | hesitate_12 | Hesitate to mention | Initial_chest |
| 53a | others_1_1 | Touch one's cheeks | Others_1_1 |
| 53b | others_1_2 | Touch one's cheeks | Others_1_2 |
| 53c | others_1_13 | Touch one's cheeks | Others_1_3 |
| 54 | others_2 | Count numbers | Others_2 |
| 55 | others_3 | Cross arms | Others_3 |

TABLE 4

| | | | | |
|---|---|---|---|---|
| 56 | Facial_expression | initial | Normal state | Initial |
| 57 | | smile_l | Large smile | Smile_L |
| 58 | | smile_m | Medium smile | Smile_M |
| 59 | | smile_s | Small smile | Smile_S |
| 60 | | anger_l | Strong anger | Anger_L |
| 61 | | anger_m | Moderate anger | Anger_M |
| 62 | | anger_s | Slight anger | Anger_S |
| 63 | | sad_l | Strong sadness | Sad_L |
| 64 | | sad_m | Moderate sadness | Sad_M |
| 65 | | sad_s | Slight sadness | Sad_S |
| 66 | | surprise_l | Strong surprise | Surprise_L |
| 67 | | surprise_m | Moderate surprise | Surprise_M |
| 68 | | surprise_s | Slight surprise | Surprise_S |
| 69 | | dislike_l | Strong dislike | Dislike_L |
| 70 | | dislike_m | Moderate dislike | Dislike_M |
| 71 | | dislike_s | Slight dislike | Dislike_S |
| 72 | | fear_l | Strong fear | Fear_L |
| 73 | | fear_m | Moderate fear | Fear_M |
| 74 | | fear_s | Slight fear | Fear_S |
| 75 | Upper_body_posture | initial | Upright (appropriately swaying) | Initial |
| 76 | | forward_l | Leaning forward greatly (appropriately swaying) | Forward_L |
| 77 | | forward_m | Leaning forward moderately (appropriately swaying) | Forward_M |
| 78 | | forward_s | Leaning forward slightly (appropriately swaying) | Forward_S |
| 79 | | backward_l | Leaning forward greatly (appropriately swaying) | Backward_L |
| 80 | | backward_m | Leaning forward moderately (appropriately swaying) | Backward_M |
| 81 | | backward_s | Leaning forward slightly (appropriately swaying) | Backward_S |
| 82 | | bow | Bowing | Bow |

Here, the text information for learning was obtained by manually transcribing utterance of each person based on uttered voice data, with the speech sections being separated by sections of 200 msec or more of silence.

Also, the nonverbal information for learning is assigned in consideration of the movement at the time of utterance corresponding to the uttered voice data. The nonverbal information includes, for example, a nod, face orientation, hand gesture, gaze, facial expression, body posture, body joint, position, movement, size of pupil diameter, and presence/absence of blinking.

The hand gestures included in the nonverbal information for learning are, for example, annotated while considering the uttered content in addition to a hand movement during the utterance. Further, the hand gestures included in the nonverbal information for learning may be obtained by automatic recognition. With regard to automatic recognition of hand gestures, many methods using image processing (for example, Reference Document 7) have been proposed, and any method may be used.

[Reference Document 7]: Siddharth S. Rautaray and Anupam Agrawal, "Vision based hand gesture recognition for human computer interaction: a survey", Artificial Intelligence Review, January 2015, Volume 43, Issue 1, pp. 1-54.

Here, as the type of hand gesture, the same type of that described in Reference Document 8 may be used. For example, (A) Iconic, (B) Metaphoric, (C) Beat, (D) Deictic, (E) Feedback, (F) Compellation, (G) Hesitate, and (H) Others are detailed types of hand gestures.

[Reference Document 8]: D. McNeill, "Hand and Mind: What Gestures Reveal About Thought", Chicago: University of Chicago Press, 1992.

(A) Iconic is a gesture used to represent scenic portrayal and actions. (B) Metaphoric, like Iconic, is a pictorial and graphic gesture, but the contents that are instructed are abstract matters and concepts (such as the passage of time). (C) Beat is a gesture for adjusting the tone of an utterance or emphasizing a remark, and is a gesture of oscillating the hands or waving the hands in response to an utterance. (D) Deictic is a gesture that directly points to a direction, a place, or an object such as pointing. (E) Feedback is a gesture indicating sympathizing, agreement with, or response to the utterance of another person, a gesture that accompanies when a person speaks out in response to a prior utterance or gesture of another person, or a gesture of the same shape imitating the gesture of the other person. (F) Compellation is a gesture to call the other person. (G) Hesitate is a gesture that appears when one hesitates to mention. (H) Others refers to gestures that seem to have some meaning but are hard to judge.

It should be noted that, regarding annotations for hand gestures, not only the type of hand gesture described above but also annotations indicating the four states of Prep, Hold, Stroke, and Return may be assigned.

Prep indicates a state in which the hand is raised to make a gesture from the home position, while Hold indicates a state in which the hand is raised in the air (standby time until the gesture starts). In addition, Stroke indicates the state of performing a gesture, and provides annotations of types (A) to (H) above as detailed information of this state. Return indicates a state in which the hand is returned to the home position.

Also, with regard to a nod gesture included in the nonverbal information for learning, for example, an annotation was performed with respect to a nod section in which the head is lowered and returned during an utterance. Moreover, annotations were performed by treating the action of putting the head forward and back or the action of pulling the head back and then returning it as nodding. The actions of hanging one's head or shaking one's head side to side were not regarded as nodding.

In the case of nodding two or more times consecutively without a pause in between, the continuous sections are combined, with the number of times of nodding assigned thereto. The number of times of nodding is classified by "1 time, 2 times, 3 times, 4 times, and 5 times or more".

The additional information for learning that is received is additional information for each predetermined processing unit (for example, for each morpheme). As the additional information, at least one of a personal attribute, an environment variable, a physical feature, the posture of an action target, the content of dialogue, a human relationship, and an emotion is received. Specifically, personal attributes include gender, age, personality, nationality, and cultural sphere, while environmental variables include the number of people in a dialogue (one to one, one to many, many to many), temperature, indoor/outdoor, on land/in air/in water, bright/dark, and the like. In addition, the physical feature includes three heads tall, clothing (such as the existence of pockets, the wearing of a skirt, wearing a hat), and factors that affect action, while the posture of the action target includes standing, sitting, and holding something with the hands. Further, the content of the dialogue includes discussion, chatting, explaining, and the like, while the human relationship includes the human relationship between the person who generates the gesture and the dialogue partner, such as who has a higher standing and whether there is goodwill therebetween. The emotion represents internal states including joy, anger, sadness, and mental states such as tension/relaxation.

It should be noted that if additional information is information that does not change for each predetermined processing unit (for example, gender), it need not be received for each predetermined processing unit. In this case, upon being received, the additional information may be deployed in the additional information for each predetermined processing unit on the apparatus side.

The learning calculation unit 730 generates a nonverbal information generation model for generating time-information-stamped nonverbal information on the basis of the learning data received by the learning input unit 720. As shown in FIG. 17, the learning calculation unit 730 is provided with the learning information acquisition unit 231, a learning additional information acquisition unit 731, a learning feature quantity extraction unit 732, the nonverbal information acquisition unit 33, the generation parameter extraction unit 34, a learning unit 735, and a learned model storage unit 736.

The learning information acquisition unit 231 acquires the voice information for learning corresponding to the text information for learning and acquires the time information representing the time from the start time to the end time when the voice information is emitted.

The learning additional information acquisition unit 731 acquires additional information for learning.

Figure 18:
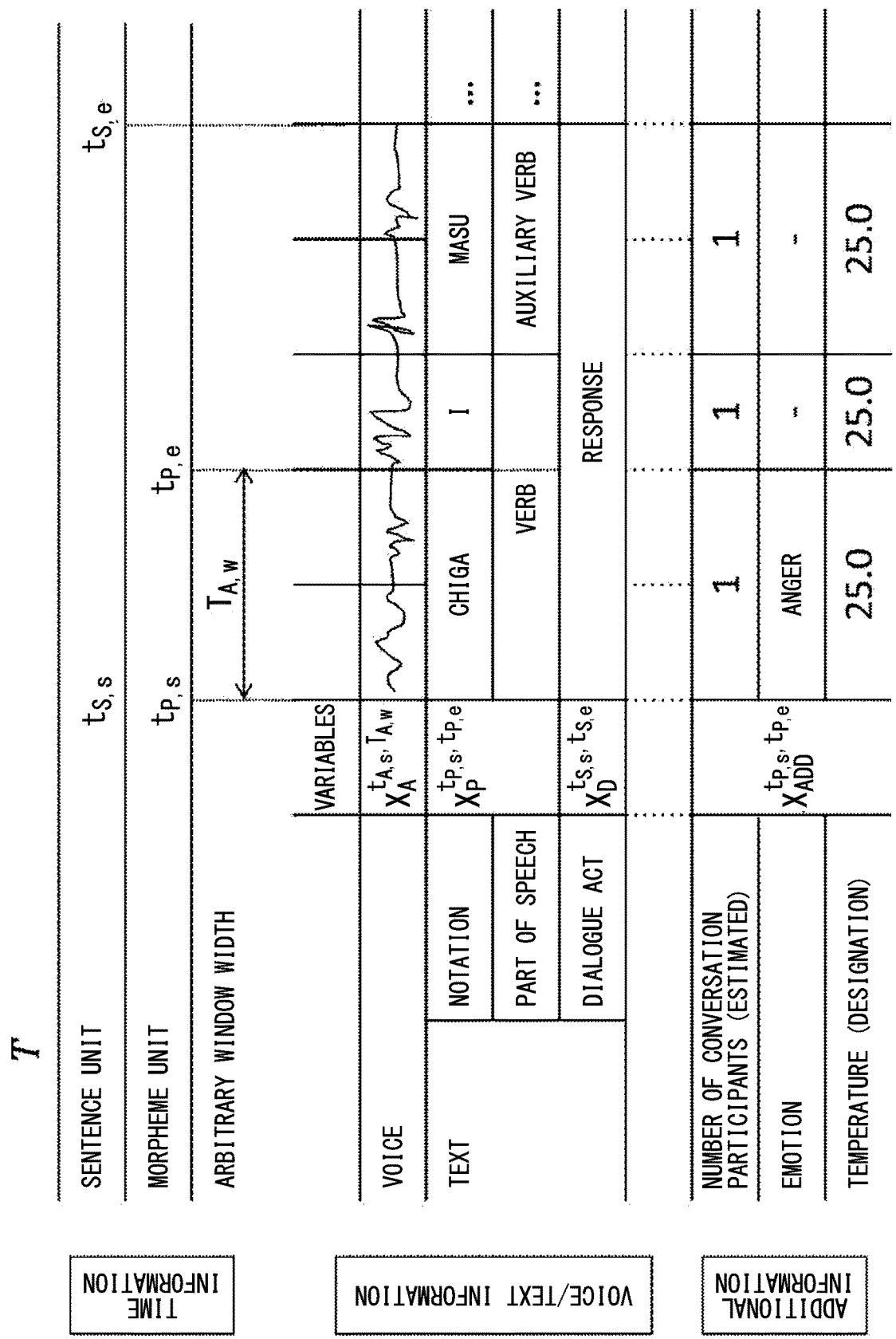
FIG. 18 is an explanatory diagram for describing additional information used in the present embodiment.

The learning feature quantity extraction unit 732 extracts time-information-stamped text feature quantities for learning, which represent the feature quantities of text information for learning, from the text information for learning and time information acquired by the learning information acquisition unit 231. Specifically, the learning feature quantity extraction unit 732 assigns time information to the text information for each predetermined analysis unit, and extracts time-information-stamped text feature quantities. FIG. 18 shows an example of the time-information-stamped text feature quantities. As shown in FIG. 18, the start time and end time of each morpheme of text information are acquired.

Also, the learning feature quantity extraction unit 732 generates time-information-stamped additional information for learning from the additional information for learning acquired by the learning additional information acquisition unit 731 and the time information acquired by the learning information acquisition unit 231. Specifically, the learning feature quantity extraction unit 732 assigns the time information to the additional information for each predetermined analysis unit to generate the time-information-stamped additional information.

FIG. 18 shows an example of time-information-stamped additional information. As shown in FIG. 18, the start time and end time of the morpheme are acquired for the additional information of each morpheme. Further, when there are a plurality of types of additional information (for example, the number of dialogue participants, emotion, and temperature), the additional information is represented as a vector array storing a plurality of types of additional information.

The learning feature quantity extraction unit 732 sets the vector array of additional information in the form of $$X_{ADD}^{t_{P,s}, t_{P,e}}$$ [Expression 32]

It should be noted that $$t_{P,s}, t_{P,e}$$ [Expression 33]

is the start time and end time of the uttered voice corresponding to the morpheme unit.

The learning unit 735 learns a nonverbal information generation model for generating time-information-stamped nonverbal information from the time-information-stamped text feature quantities and the additional information on the basis of the time-information-stamped text feature quantities for learning extracted by the learning feature quantity extraction unit 732, the time-information-stamped additional information, and the time-information-stamped discretized nonverbal information for learning extracted by the generation parameter extraction unit 34.

Specifically, the learning unit 735 constructs a nonverbal information generation model that takes the time-information-stamped text feature quantities for learning extracted by the learning feature quantity extraction unit 732

$$X_D^{tS,s,tS,e} \quad \text{[Expression 34]}$$

$$X^{tP,s,tP,e} \quad \text{[Expression 35]}$$

and the time-information-stamped additional information for learning $$X_{ADD}^{tP,s,tP,e} \quad \text{[Expression 36]}$$

as inputs, and outputs the nonverbal information $$Y^{tN,s,tN,e} \quad \text{[Expression 37]}$$

When constructing the nonverbal information generation model, any machine learning technique may be used, and SVM is used in the present embodiment. For example, for each type (A) to (H) above, an SVM model is created for estimating which action among the actions belonging to each type the gesture is. That is, for each type of (A) to (H) above, an SVM model is created for estimating which behavior the gesture is among the plurality of actions described as the contents belonging to each type in the above behavior list tables.

It should be noted that in the nonverbal information generation model, what kind of time resolution is used and which time parameter is used to estimate the nonverbal information are arbitrary. Here is shown an example of a feature quantity used in the case of estimating a gesture $$Y^{T1,T2} \quad \text{[Expression 38]}$$

in an arbitrary time section T1 to T2. The verbal feature quantities $$X_D^{T1,T2}, X_P^{T1,T2}, \quad \text{[Expression 39]}$$

the additional information $$X_{ADD}^{T1,T2}, \quad \text{[Expression 40]}$$

and the gesture to be output $$Y^{T1,T2} \quad \text{[Expression 41]}$$

obtained in the time between T1 to T2, which is the target of estimation, are paired, and learning is performed using learning data including a plurality of sets of data of these pairs. The learned nonverbal information generation model becomes $$M^{T1,T2} \quad \text{[Expression 42]}$$

It should be noted that as a setting method of T1 and T2, for example, when nonverbal information is estimated in morpheme units, the start time and end time of each morpheme are set to T1 and T2, respectively. In this case, the window width from T2 to T1 differs for each morpheme.

Also, $$Y^{T1,T2} \quad \text{[Expression 43]}$$

may be an average value of nonverbal information obtained in T1 to T2, a combination of nonverbal information that has appeared, or a pattern that takes into account the order of appearance. For example, when a hand gesture ID $$Y_{HG}^{ID} \quad \text{[Expression 44]}$$

$$Y_{HG_1}^{ID} \quad \text{[Expression 45]}$$

within the section from T1 to T3 (T1<T3<T2) and is $$Y_{HG_2}^{ID} \quad \text{[Expression 46]}$$

within the section from T3 to T2, as $$Y^{T1,T2}, \quad \text{[Expression 47]}$$

the ID having a higher appearance time, $$\{Y_{HG_1}^{ID}, Y_{HG_2}^{ID}\}, \quad \text{[Expression 48]}$$

which is combination information, and $$Y_{HG_1}^{ID} - Y_{HG_2}^{ID} \quad \text{[Expression 49]}$$

as an n-gram pattern are adopted.

When using an n-gram pattern, time information of nonverbal information in the n-gram pattern (in the above example, the respective start times of $$Y_{HG_1}^{ID} - Y_{HG_2}^{ID} \quad \text{[Expression 50]}$$

) is allocated using a predetermined method preset for each nonverbal information. However, the time information of the nonverbal information in this n-gram pattern may also be estimated. In this case, the time information is estimated based on the learning data, using a feature quantity used when estimating the n-gram pattern and the estimated n-gram.

The learned model storage unit 736 stores the learned nonverbal information generation model learned by the learning unit 735. The learned nonverbal information generation model generates time-information-stamped nonverbal information from the time-information-stamped text feature quantities.

<Configuration of Nonverbal Information Generation Apparatus>

Figure 19:
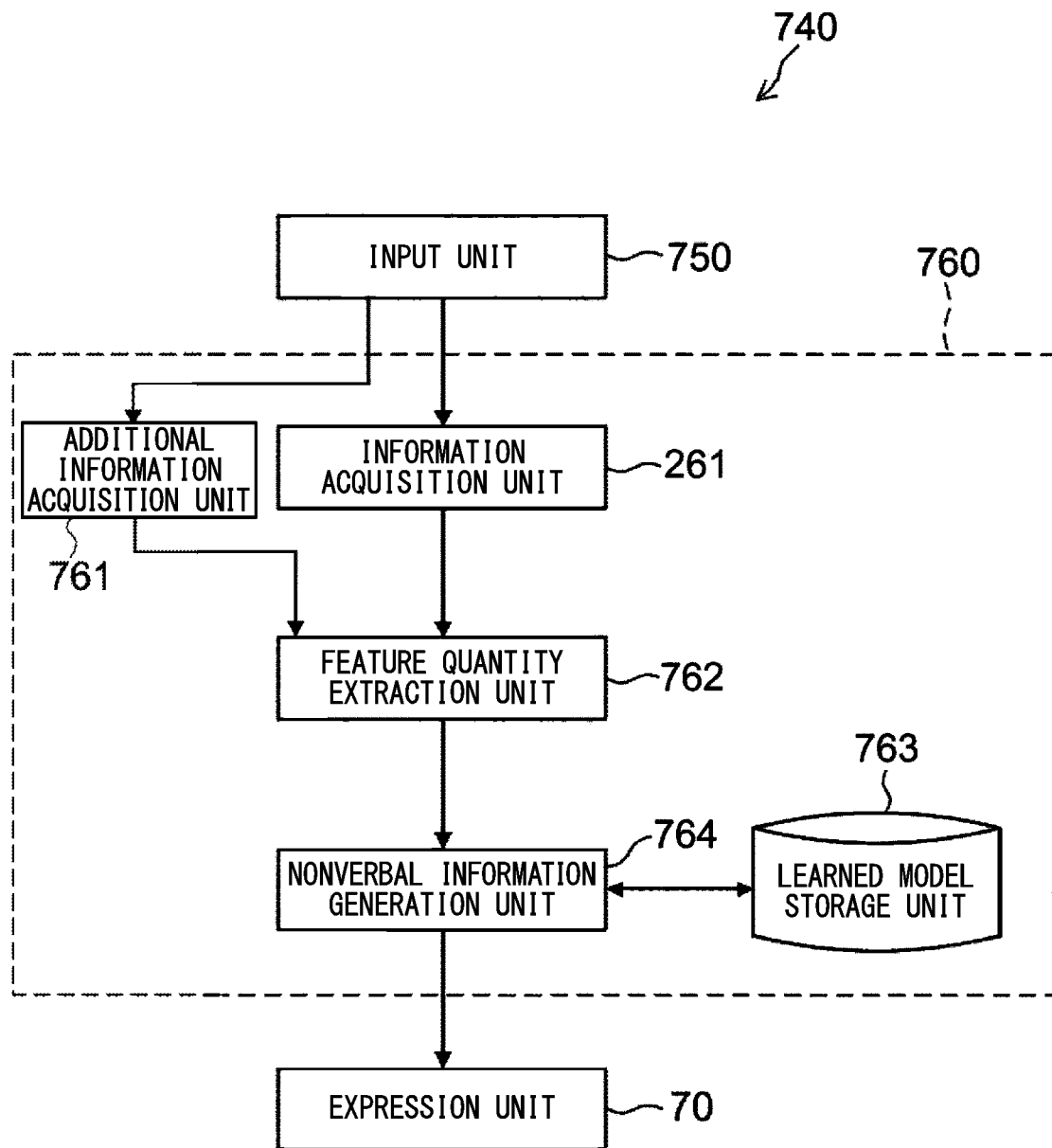
FIG. 19 is a block diagram showing an example of the configuration of the nonverbal information generation apparatus in accordance with the seventh embodiment.

FIG. 19 is a block diagram showing an example of the configuration of a nonverbal information generation apparatus 740 in accordance with the seventh embodiment. As illustrated in FIG. 19, the nonverbal information generation apparatus 740 in accordance with the present embodiment is configured by a computer provided with a central processing unit (CPU), a random access memory (RAM), and a read only memory (ROM) that stores a program for executing a nonverbal information generation processing routine described later. The nonverbal information generation apparatus 740 is functionally provided with an input unit 750, a calculation unit 760, and an expression unit 70.

The input unit 750 receives text information and additional information. The additional information to be received is additional information for each predetermined processing unit (for example, for each morpheme).

The calculation unit 760 is provided with an information acquisition unit 261, an additional information acquisition unit 761, a feature quantity extraction unit 762, a learned model storage unit 763, and a nonverbal information generation unit 764.

The information acquisition unit 261 acquires the text information received by the input unit 750. Moreover, the information acquisition unit 261 acquires voice information corresponding to the text information and acquires time information representing the time from a start time to an end time of the voice information being emitted.

The additional information acquisition unit 761 acquires the additional information received by the input unit 750.

Similarly to the learning feature quantity extraction unit 732, the feature quantity extraction unit 762 extracts time-information-stamped text feature quantities representing feature quantities of the text information from the text information and the time information acquired by the information acquisition unit 261. Further, similarly to the learning feature quantity extraction unit 732, the feature quantity extraction unit 762 generates time-information-stamped additional information from the additional information acquired by the additional information acquisition unit 761 and the time information acquired by the information acquisition unit 261.

The learned model storage unit 763 stores the same learned nonverbal information generation model as the learned nonverbal information generation model stored in the learned model storage unit 736.

The nonverbal information generation unit 764 generates time-information-stamped nonverbal information corresponding to the time-information-stamped text feature quantities and additional information extracted by the feature quantity extraction unit 762 on the basis of the time-information-stamped text feature quantities and time-information-stamped additional information extracted by the feature quantity extraction unit 762, and the learned nonverbal information generation model stored in the learned model storage unit 763.

For example, the nonverbal information generation unit 764, using the learned nonverbal information generation model stored in the learned model storage unit 763

$$M^{T1,T2} \qquad \text{[Expression 51]}$$

takes arbitrary feature quantities as the time-information-stamped text feature quantities $$X_D^{T1,T2} \searrow X_P^{T1,T2} \qquad \text{[Expression 52]}$$

and the time-information-stamped additional information $$X_{ADD}^{T1,T2} \qquad \text{[Expression 53]}$$

as inputs, and obtains the gesture $$Y^{T1,T2} \qquad \text{[Expression 54]}$$

as a generation parameter corresponding to the time-information-stamped nonverbal information.

Then, the nonverbal information generation unit 764 controls the expression unit 70 such that the time-information-stamped generation parameter that has been generated is output from the expression unit 70 on the basis of the time information assigned to the generation parameter.

Specifically, the nonverbal information generation unit 764 causes the gesture $$Y^{T1,T2} \qquad \text{[Expression 55]}$$

to be reflected as an action of an arbitrary target (for example, an animation character, a robot, or the like) in the expression unit 70.

The expression unit 70 causes the voice information corresponding to the text information received by the input unit 750 and the nonverbal information generated by the nonverbal information generation unit 764 to be expressed under the control of the nonverbal information generation unit 764.

<Operation of Nonverbal Information Generation Model Learning Apparatus 710>

Figure 20:
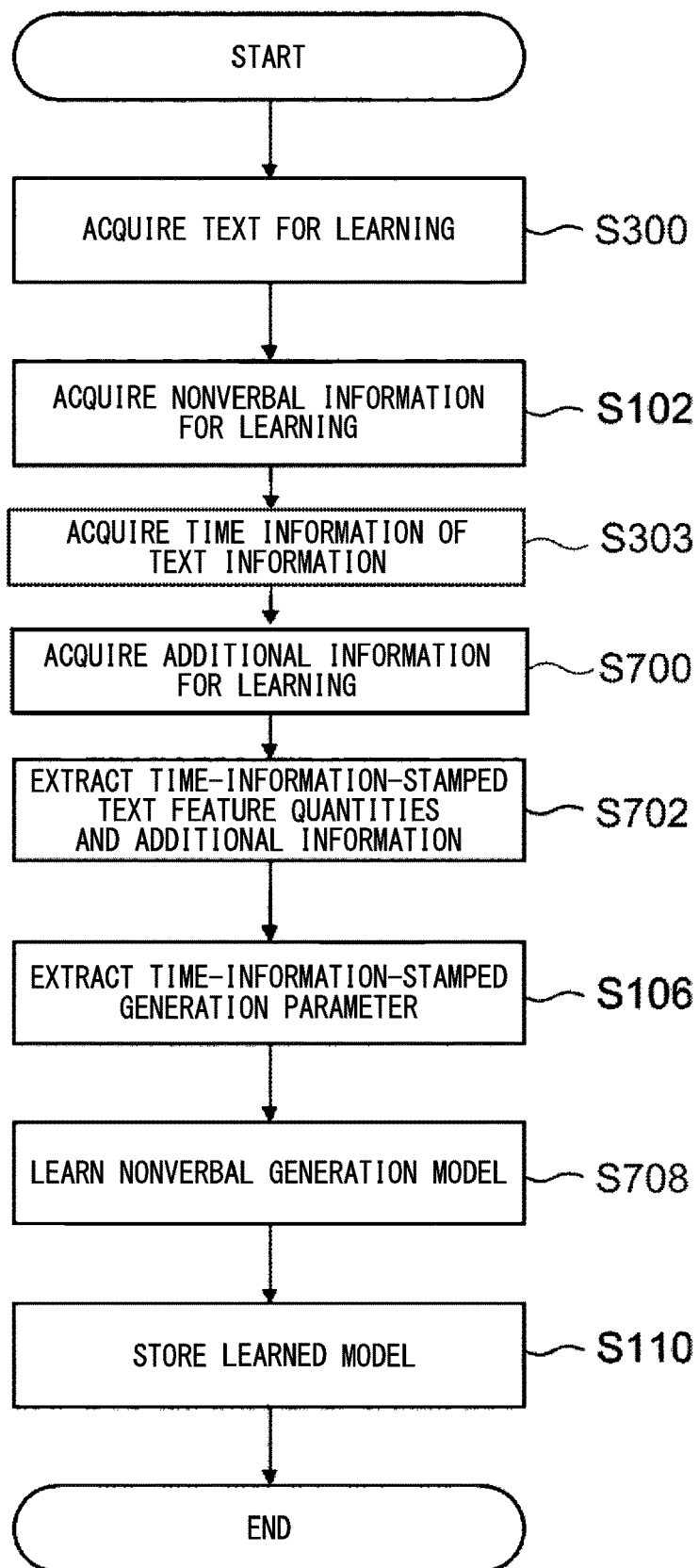
FIG. 20 is a flowchart illustrating an example of the flow of the learning process in accordance with the seventh embodiment.

Next, the operation of the nonverbal information generation model learning apparatus 710 in accordance with the seventh embodiment will be described. First, when learning data representing a combination of a plurality of pieces of text information for learning, a plurality of pieces of additional information for learning, and a plurality of pieces of nonverbal information for learning is input to the learning input unit 720 of the nonverbal information generation model learning apparatus 710, the nonverbal information generation model learning apparatus 710 executes the learning processing routine shown in FIG. 20.

First, in Step S300, the learning information acquisition unit 231 acquires the text information for learning from among the plurality of sets of learning data received by the learning input unit 720 (specifically, the pairs of the text information, the additional information, and the nonverbal information).

In Step S102, the nonverbal information acquisition unit 33 acquires, from among the plurality of sets of learning data received by the learning input unit 720, nonverbal information for learning and time information representing the time from the start time to the end time when the behavior represented by the nonverbal information for learning is performed.

In Step S303, the learning text analysis unit 237 performs a predetermined text analysis on the text information for learning acquired in Step S300 and acquires a result of the text analysis. Further, the learning voice synthesis unit 238 synthesizes voice information for learning corresponding to the text information for learning on the basis of the text analysis result acquired by the learning text analysis unit 237. Then, the learning voice synthesis unit 238 acquires time information indicating the time from the start time to the end time when the voice information for learning is emitted.

In Step S700, the learning additional information acquisition unit 731 acquires the additional information for learning from among the plurality of sets of learning data received by the learning input unit 720.

In Step S702, the learning feature quantity extraction unit 732 extracts time-information-stamped text feature quantities for learning from the text information for learning and the time information acquired in Step S303. Further, the learning feature quantity extraction unit 732 generates time-information-stamped additional information for learning from the additional information for learning acquired in Step S700 and the time information acquired in Step S303.

In Step S106, the generation parameter extraction unit 34 extracts time-information-stamped discretized nonverbal information from the nonverbal information for learning and time information acquired in Step S102.

In Step S708, the learning unit 735 learns a nonverbal information generation model for generating a time-information-stamped generation parameter from the time-information-stamped text feature quantities and the additional information on the basis of the time-information-stamped text feature quantities for learning and the time-information-stamped additional information for learning extracted in Step S702 and the time-information-stamped generation parameter for learning acquired in Step S106.

In Step S110, the learning unit 735 stores the learned nonverbal information generation model obtained in Step S708 in the learned model storage unit 736, and ends the learning processing routine.

<Operation of Nonverbal Information Generation Apparatus 740>

Figure 21:
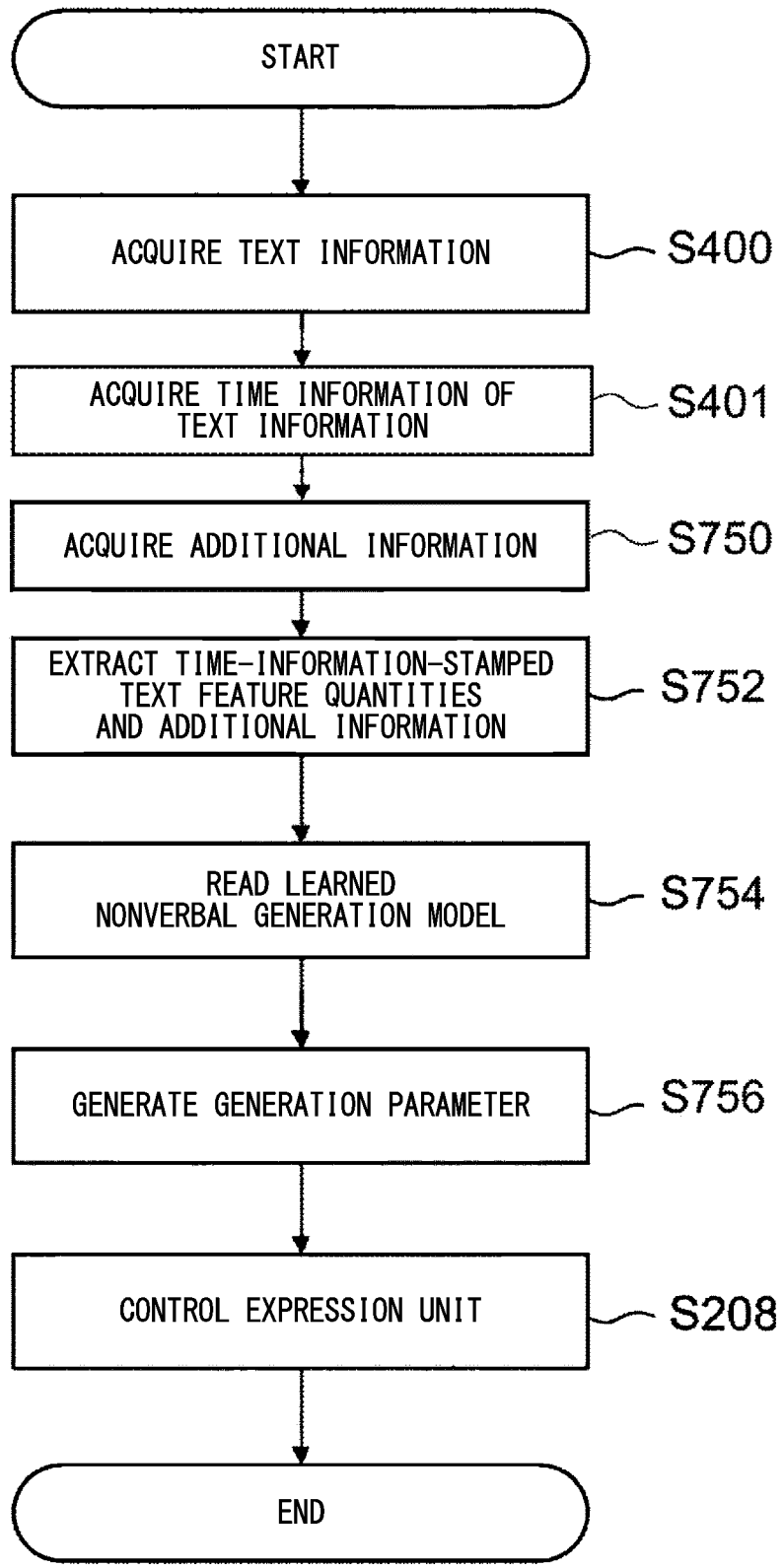
FIG. 21 is a flowchart illustrating an example of the flow of the nonverbal information generation process in accordance with the seventh embodiment.

Next, the operation of the nonverbal information generation apparatus 740 in accordance with the seventh embodiment will be described. First, when the learned nonverbal information generation model stored in the learned model storage unit 736 of the nonverbal information generation model learning apparatus 710 is input to the nonverbal information generation apparatus 740, the learned nonverbal information generation model is stored in the learned model storage unit 763 of the nonverbal information generation apparatus 740. Then, when text information and additional information that are the target of nonverbal information generation are input to the input unit 750, the nonverbal information generation apparatus 740 executes the nonverbal information generation processing routine shown in FIG. 21.

In Step S400, the information acquisition unit 261 acquires the text information received by the input unit 750.

In Step S401, the text analysis unit 265 performs a predetermined text analysis on the text information acquired in Step S400 and acquires a result of the text analysis. Further, the voice synthesis unit 266 synthesizes voice information corresponding to the text information on the basis of the text analysis result obtained by the text analysis unit 265. Then, the voice synthesis unit 266 acquires time information representing the time from the start time to the end time when the voice information is emitted.

In Step S750, the additional information acquisition unit 761 acquires the additional information received by the input unit 750.

In Step S752, the feature quantity extraction unit 762 extracts time-information-stamped text feature quantities from the text information and time information acquired in Step S401, and generates time-information-stamped additional information from the additional information acquired in Step S750 and the time information acquired in Step S401.

In Step S754, the nonverbal information generation unit 764 reads the learned nonverbal information generation model stored in the learned model storage unit 763.

In Step S756, the nonverbal information generation unit 764 generates a time-information-stamped generation parameter corresponding to the time-information-stamped text feature quantities and additional information extracted in Step S752, on the basis of the time-information-stamped text feature quantities and additional information extracted in Step S752, and the learned nonverbal information generation model read in Step S754.

In Step S208, the nonverbal information generation unit 764 controls the expression unit 70 such that the time-information-stamped nonverbal information generated in Step S756 is output from the expression unit 70 on the basis of the time information assigned to the nonverbal information, and ends the nonverbal information generation processing routine.

It should be noted that since other configurations and operations of the nonverbal information generation apparatus and the nonverbal information generation model learning apparatus in accordance with the seventh embodiment are the same as those in the first embodiment, descriptions thereof will be omitted.

As described above, the nonverbal information generation apparatus 740 in accordance with the seventh embodiment acquires the additional information and generates time-information-stamped nonverbal behavior corresponding to the time-information-stamped text feature quantities on the basis of the time-information-stamped text feature quantities and the additional information, and the learned model for generating time-information-stamped nonverbal information including the number of times that behavior is performed or the magnitude of behavior. Thereby, it is possible to automatically associate the text information with the nonverbal information including the number of times that behavior is performed or the magnitude of behavior, and so the cost of doing so can be reduced.

Further, by finely setting the type of nonverbal information, including the magnitude of behavior and the number of times that the behavior is performed, more detailed nuances can be represented, and so representing intention with nonverbal information becomes easy. Further, by the association of the time information or by combining with the additional information, it is possible to more finely represent changes in an action due to a difference in the additional information, which makes it easier to represent emotions, for example.

Further, the nonverbal information generation model learning apparatus 710 in accordance with the seventh embodiment learns a nonverbal information generation model for generating time-information-stamped nonverbal information from time-information-stamped text feature quantities and additional information on the basis of time-information-stamped text feature quantities for learning and additional information, and time-information-stamped nonverbal information for learning including the number of times that behavior is performed or the magnitude of behavior. Thereby, it is possible to obtain a nonverbal information generation model for generating nonverbal information from text feature quantities while reducing the cost of associating text information with nonverbal information including the number of times that behavior is performed or the magnitude of behavior.

Figure 22:
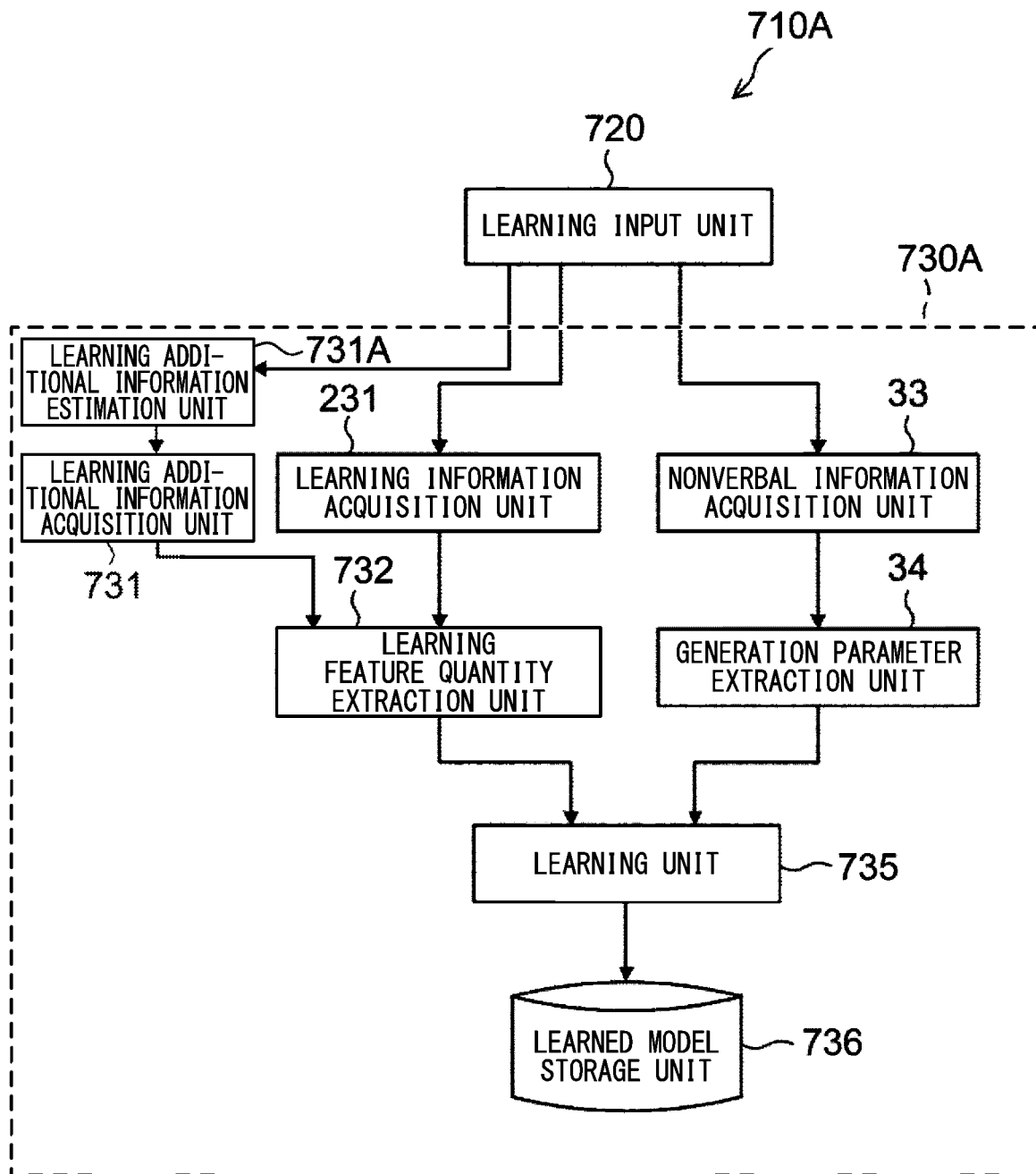
FIG. 22 is a block diagram showing an example of the configuration of the nonverbal information generation model learning apparatus in accordance with another example of the seventh embodiment.

It should be noted that in the above embodiment, the case in which the additional information is input has been described as an example, but the present invention is not limited thereto, and the additional information may be estimated. In this case, as illustrated in FIG. 22, a learning calculation unit 730A of a nonverbal information generation model learning apparatus 710A is provided with a learning additional information estimation unit 731A that estimates additional information from the text information included in the learning data received by the learning input unit 720 and outputs the additional information to the learning additional information acquisition unit 731. For example, it is possible to estimate the content of a dialogue and emotions from the text information.

Figure 23:
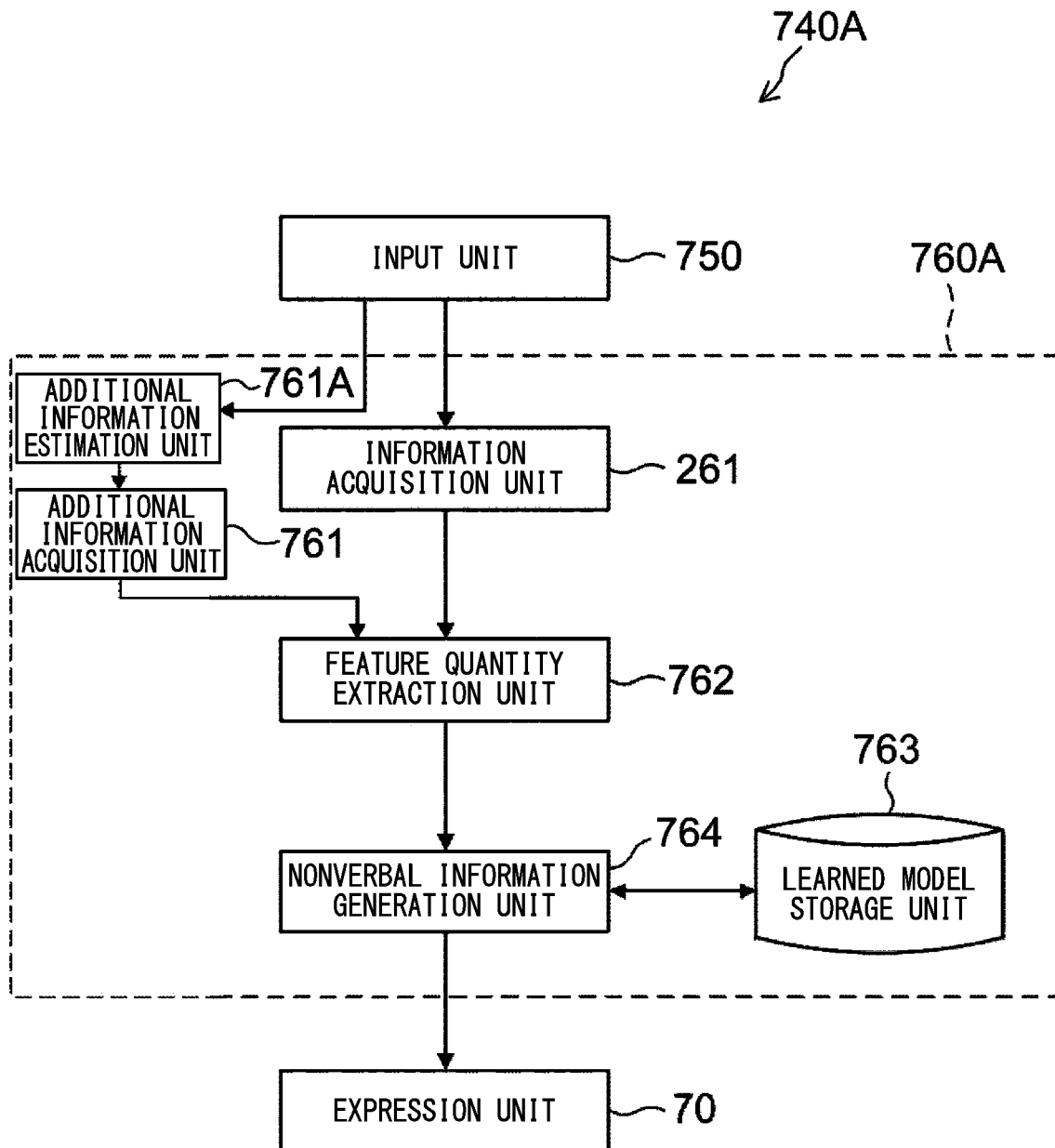
FIG. 23 is a block diagram showing an example of the configuration of the nonverbal information generation apparatus in accordance with another example of the seventh embodiment.

Moreover, as shown in FIG. 23, a calculation unit 760A of a nonverbal information generation apparatus 740A is provided with an additional information estimation unit 761A that estimates the additional information from the text information received by the input unit 750 and outputs the additional information to the additional information acquisition unit 761.

When voice information or video information, and not text information, is input, the additional information may be estimated from the voice information or video information. For example, age, gender, environmental variables, physical feature, and the like may be estimated from the video information, while the number of people in a dialogue, emotions, nationalities, indoors/outdoors and the like may be estimated from the voice information.

As mentioned above, when estimating the additional information, time information can also be automatically assigned to the additional information. In addition, when estimating additional information, it is possible to generate an estimated value of nonverbal information for each unit at the time of estimation.

Moreover, in the nonverbal information generation apparatus, other additional information may be changed in accordance with specific additional information obtained by estimation. Specifically, other additional information may be changed so as to switch to designated information defined in advance for the specific additional information. For example, when it can be estimated from the voice information that a switch between indoors and outdoors has occurred, other additional information is changed so as to change designated content of clothing, which is a physical feature. Further, the utterance speed of voice synthesis or the display speed of text may be changed in accordance with emotions. In addition, when a satiety state is detected, the additional information is changed so that the body shape is set to be plump, and when the emotion of anger is detected, the additional information is changed so that the dialogue content is changed to "discussion".

Further, when emotion labels of predetermined processing units are arranged in the order of "normal" and "anger" in a time series as a result of the estimation of the additional information and when outputting voice at the same time as gestures, the additional information of each predetermined processing unit is passed as a parameter (talk speed) to the voice synthesis unit (not shown). Thereby, for a predetermined processing unit for which the emotion label "anger" has been estimated, the time information of the text information is changed to be shortened so that a certain number is added to the talk speed or the talk speed is multiplied by a predetermined amount (FIG. 24). It should be noted that in FIG. 24, the horizontal axis with an arrow indicates the time axis.

Also, the time information of the time-information-stamped voice feature quantities of the period in which "anger" has been estimated may be changed.

In addition, a case in which the nonverbal information includes the magnitude of behavior or the number of times that behavior is performed has been described as an example, but the present invention is not limited thereto, and the ratio of the pause length may also be included.

Eighth Embodiment

Next, an eighth embodiment of the present invention will be described. It should be noted that components with the same configuration as those in the first embodiment are denoted by the same reference signs, with descriptions thereof being omitted.
<Outline of Eighth Embodiment>

When the input is text, there are times when detailed time information of the text cannot be obtained. For example, the case of (1) voice synthesis (or voice recognition) not having a function of outputting time information of a required granularity corresponding to each text, and the case of (2) outputting only text when a gesture is generated (no need for voice synthesis) and there being no resource for performing voice synthesis, or the case of voice synthesis processing time not being securable (when the input is voice, there is no need to output the original voice information, or there are insufficient resources).

The above case (1) occurs when, for example, deep neural network (DNN)-based voice synthesis is used. Moreover, the case of (2) above occurs due to constraints or the like at the time of actual service.

Therefore, in the present embodiment, when the time information of a required granularity (for example, a character or a morpheme) cannot be obtained as in (1) above, a voice synthesizer is used to obtain the time information of the required granularity using the voice time length of each clause (which is coarser than the required granularity but is the closest) that can be acquired when generating voice corresponding to text. Specifically, using unit numbers that match the pronunciation characteristics of the target language (the number of moras in Japanese, the number of accents in English, etc.), the time information is partitioned into obtainable units and used as time information of the required unit.

<Configuration of Nonverbal Information Generation Model Learning Apparatus>

Figure 25:
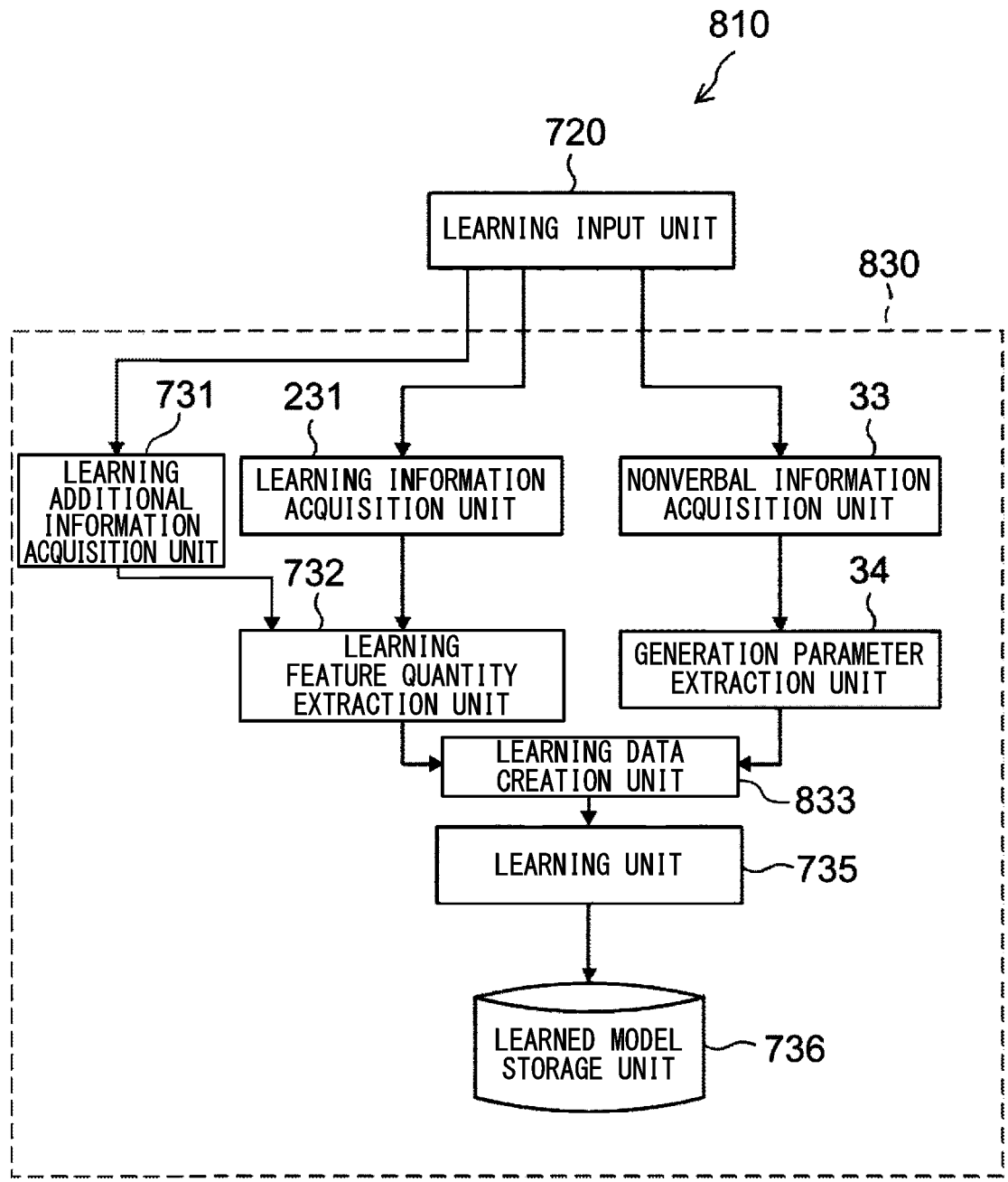
FIG. 25 is a block diagram showing an example of the configuration of the nonverbal information generation model learning apparatus in accordance with an eighth embodiment.

As shown in FIG. 25, the learning calculation unit 830 of the nonverbal information generation model learning apparatus 810 in accordance with the eighth embodiment is provided with a learning information acquisition unit 231, a learning additional information acquisition unit 731, a learning feature quantity extraction unit 732, the nonverbal information acquisition unit 33, the generation parameter extraction unit 34, a learning data creation unit 833, a learning unit 735, and a learned model storage unit 736.

The learning data creation unit 833 obtains detailed time information with regard to the text information for learning acquired by the learning information acquisition unit 231, and generates detailed time-information-stamped text information.

Here, the detailed time information is assigned on the basis of the result of partitioning a range of time when outputting the text for learning in accordance with the number of partitions when the text has been partitioned into the predetermined units.

For example, when the time information obtained regarding the text information is time information in utterance units, and time information in a predetermined unit (mora unit) should be obtained, the time information is obtained as follows.

Figure 26A:
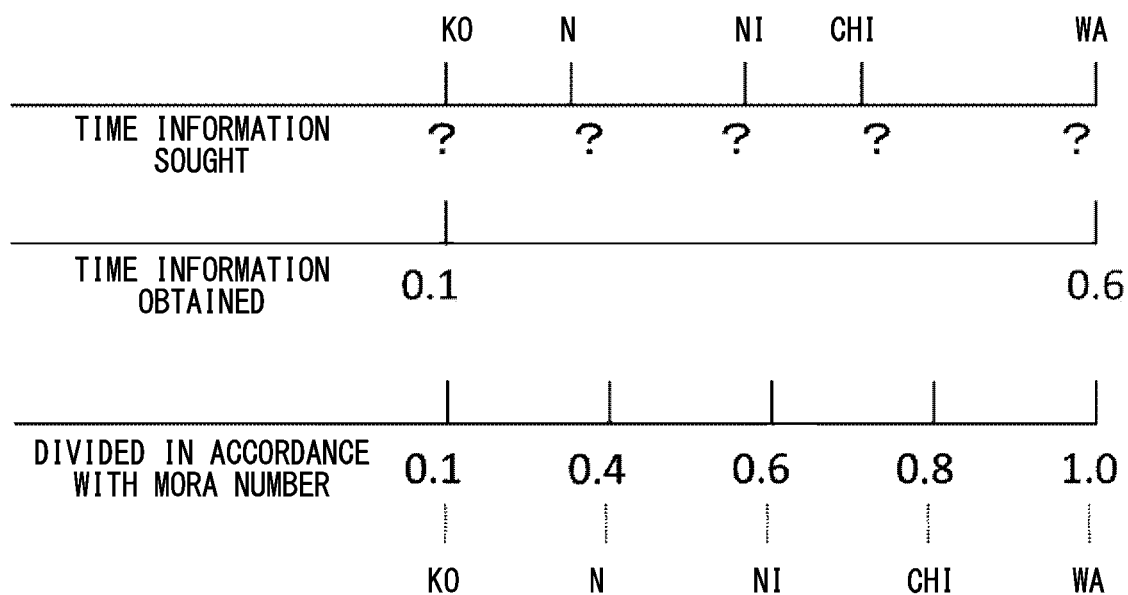
FIG. 26A is a diagram for describing a method of assigning detailed time information.

First, the utterance length of the text is normalized to 1, and the utterance length in the unit in which the time information can be obtained is partitioned by the number of predetermined units (in this case, the number of moras) (see FIG. 26A). Then, the time information obtained by the partitioning is used as the time information of the predetermined unit.

Moreover, with respect to the time-information-stamped text feature quantities for learning and time-information-stamped additional information extracted by the learning feature quantity extraction unit 732, and the time-information-stamped discretized nonverbal information for learning extracted by the generation parameter extraction unit 34, the learning data creation unit 833 uses the detailed time information obtained above to generate detailed time-information-stamped text feature quantities for learning, additional information for learning, and nonverbal information for learning.

The learning data creation unit 833 outputs a combination of the detailed time-information-stamped text feature quantities for learning, the detailed time-information-stamped additional information for learning, and the detailed time-information-stamped nonverbal information for learning as learning data to the learning unit 735.
<Configuration of Nonverbal Information Generation Apparatus>

Figure 26B:
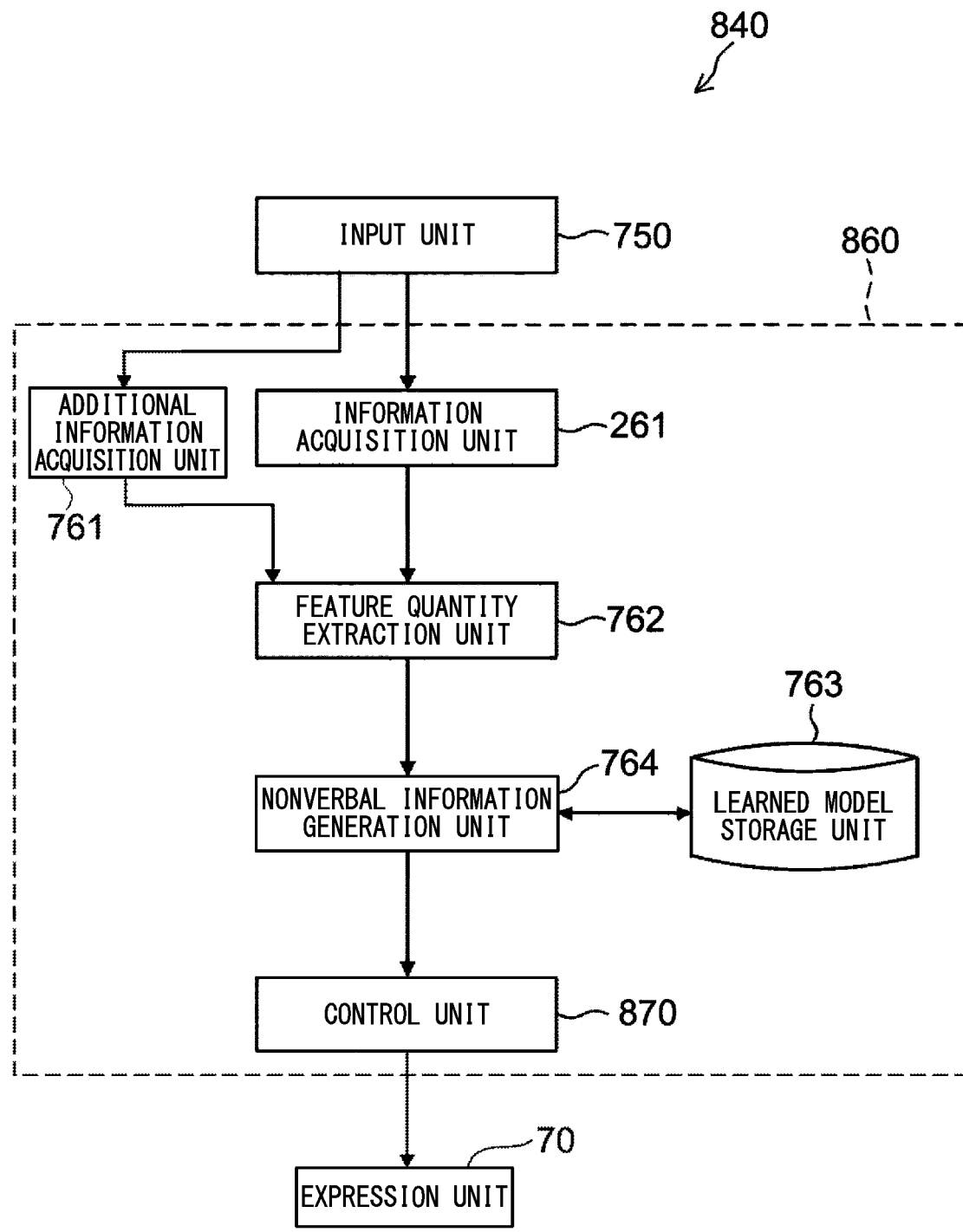
FIG. 26B is a block diagram showing an example of the configuration of the nonverbal information generation apparatus in accordance with the eighth embodiment.

As shown in FIG. 26B, a calculation unit 860 of a nonverbal information generation apparatus 840 in accordance with the eighth embodiment is provided with an information acquisition unit 261, an additional information acquisition unit 761, a feature quantity extraction unit 762, a learned model storage unit 763, a nonverbal information generation unit 764, and a control unit 870.

Similarly to the first embodiment and the second embodiment, the expression unit 70, along with outputting the text information, expresses the behavior indicated by the time-information-stamped nonverbal information that has been generated in accordance with the time information. In addition, voice corresponding to the text information may also be output.

Similarly to the learning feature quantity extraction unit 732, the feature quantity extraction unit 762 extracts time-information-stamped text feature quantities indicating the feature quantities of the text information from the text information and time information acquired by the information acquisition unit 261. Also, similarly to the learning feature quantity extraction unit 732, the feature quantity extraction unit 762 generates time-information-stamped additional information from the additional information acquired by the additional information acquisition unit 761 and the time information acquired by the information acquisition unit 261.

Moreover, similarly to the learning data creation unit 833, the feature quantity extraction unit 762 obtains detailed time information regarding the text information, and obtains detailed time information of the text information.

Further, the feature quantity extraction unit 762 generates detailed time-information-stamped text feature quantities and additional information using the detailed time information obtained above with regard to the time-information-stamped text feature quantities and additional information.

The nonverbal information generation unit 764 generates detailed time-information-stamped nonverbal information corresponding to the detailed time-information-stamped text feature quantities and additional information extracted by the feature quantity extraction unit 762, on the basis of the detailed time-information-stamped text feature quantities and the detailed time-information-stamped additional information generated by the feature quantity extraction unit 762, and the learned nonverbal information generation model stored in the learned model storage unit 763.

Then, the control unit 870 controls the expression unit 70 so that the generation parameter corresponding to the detailed time-information-stamped nonverbal information that has been generated is output from the expression unit 70, and performs control so that text information is output by the expression unit 70 in accordance with the time information.

Under the control of the control unit 870, the expression unit 70 outputs the text information received by the input unit 750 or the voice information corresponding to the text information in accordance with the detailed time information, and also expresses the nonverbal information generated by the nonverbal information generation unit 764 in accordance with the detailed time information.

<Operation of Nonverbal Information Generation Model Learning Apparatus 810>

Figure 27:
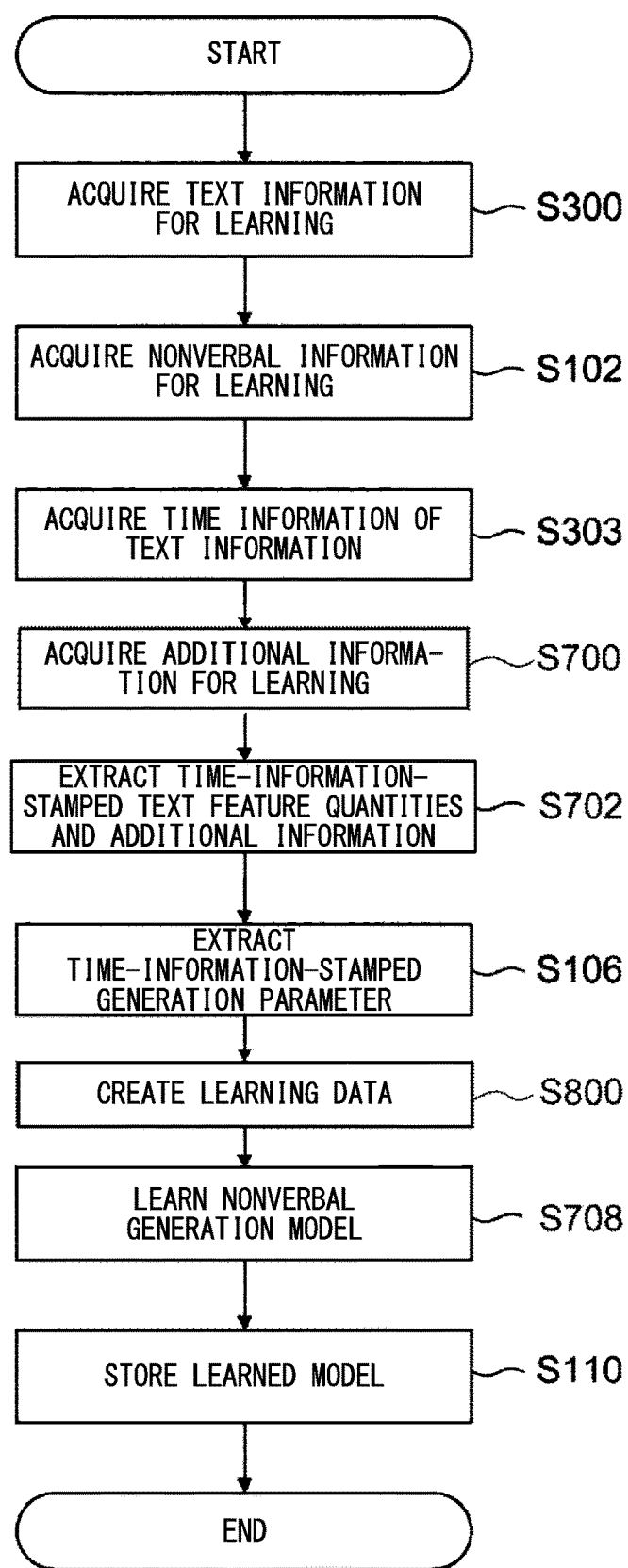
FIG. 27 is a flowchart showing an example of the flow of the learning process in accordance with the eighth embodiment.

Next, the operation of the nonverbal information generation model learning apparatus 810 in accordance with the eighth embodiment will be described. First, when learning data representing a combination of a plurality of pieces of text information for learning, a plurality of pieces of additional information for learning, and a plurality of pieces of nonverbal information for learning is input to the learning input unit 720 of the nonverbal information generation model learning apparatus 810, the nonverbal information generation model learning apparatus 810 executes the learning processing routine shown in FIG. 27.

First, in Step S300, the learning information acquisition unit 231 acquires text information for learning from among the plurality of sets of learning data received by the learning input unit 720 (specifically, combinations of text information, nonverbal information, and additional information).

In Step S102, the nonverbal information acquisition unit 33 acquires, from among the plurality of sets of learning data received by the learning input unit 720, the nonverbal information for learning and time information representing the time from the start time to the end time when the behavior represented by the nonverbal information for learning is performed.

In Step S303, the learning text analysis unit 237 performs a predetermined text analysis on the text information for learning acquired in Step S300 and acquires a result of the text analysis. The learning voice synthesis unit 238 synthesizes voice information for learning corresponding to the text information for learning on the basis of the text analysis result acquired by the learning text analysis unit 237. Then, the learning voice synthesis unit 238 acquires time information representing the time from the start time to the end time when the voice information for learning is emitted.

In Step S700, the learning additional information acquisition unit 731 acquires the additional information for learning from among the plurality of sets of learning data received by the learning input unit 720.

In Step S702, the learning feature quantity extraction unit 732 extracts time-information-stamped text feature quantities for learning from the text information for learning and the time information acquired in Step S303. Moreover, the learning feature quantity extraction unit 732 generates time-information-stamped additional information for learning from the additional information for learning acquired in Step S700 and the time information acquired in Step S303.

In Step S106, the generation parameter extraction unit 34 extracts time-information-stamped discretized nonverbal information from the nonverbal information for learning and the time information acquired in Step S102.

In Step S800, the learning data creation unit 833 obtains, from the text information for learning and the time information acquired in Step S303, detailed time information with regard to the text information for learning.

Moreover, with regard to the time-information-stamped text feature quantities and additional information extracted by the learning feature quantity extraction unit 732, and the time-information-stamped discretized nonverbal information for learning extracted by the generation parameter extraction unit 34, the learning data creation unit 833 uses the detailed time information obtained above to generate detailed time-information-stamped text feature quantities for learning, additional information for learning, and nonverbal information for learning.

The learning data creation unit 833 outputs a combination of the detailed time-information-stamped text feature quantities for learning, the detailed time-information-stamped additional information for learning, and the detailed time-information-stamped nonverbal information for learning as learning data to the learning unit 735.

In Step S708, the learning unit 735 learns a nonverbal information generation model for generating a detailed time-information-stamped generation parameter from the detailed time-information-stamped text feature quantities and additional information on the basis of the detailed time-information-stamped text feature quantities for learning and the detailed time-information-stamped additional information for learning extracted in Step S800 and the detailed time-information-stamped generation parameter for learning acquired in Step S800.

In Step S110, the learning unit 735 stores the learned nonverbal information generation model obtained in Step S708 in the learned model storage unit 736, and ends the learning processing routine.

<Operation of Nonverbal Information Generation Apparatus>

Figure 28:
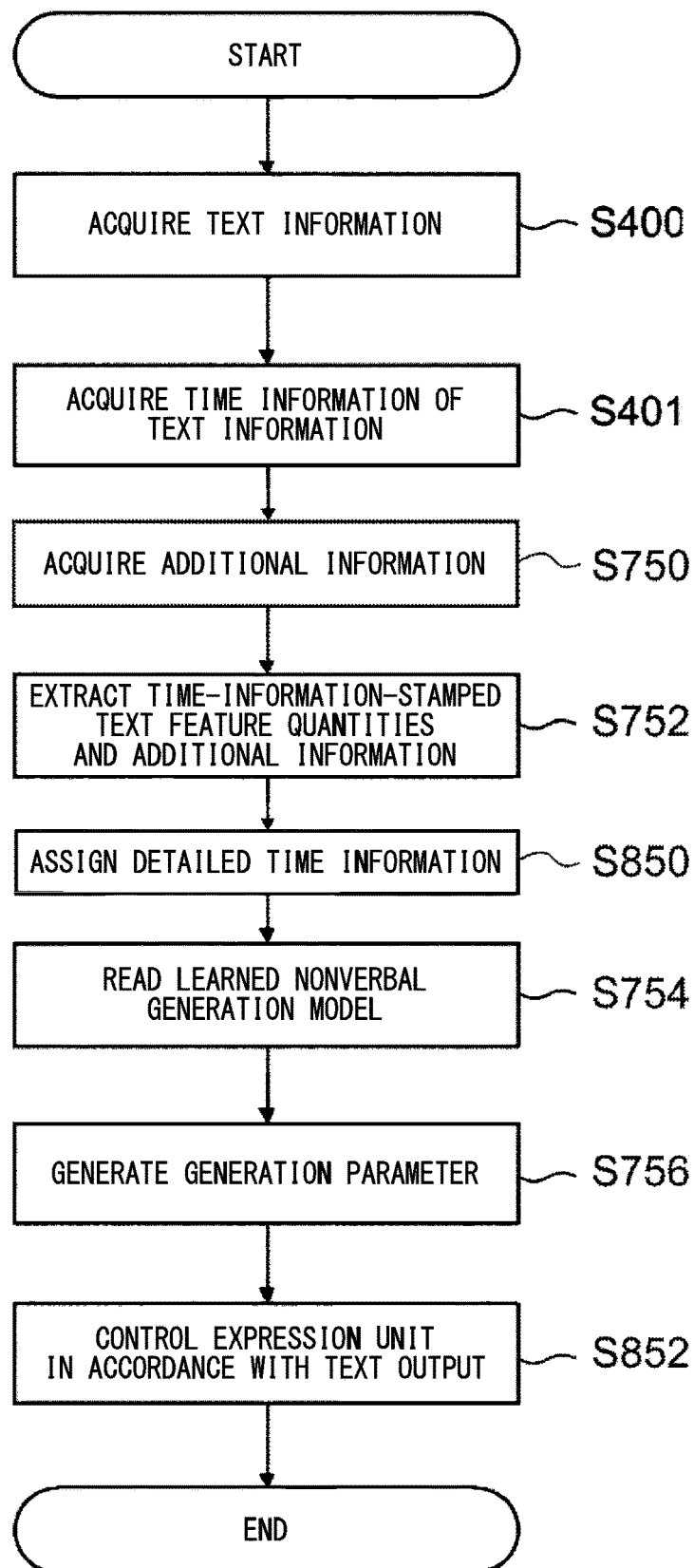
FIG. 28 is a flowchart showing an example of the flow of the nonverbal information generation process in accordance with the eighth embodiment.

Next, the operation of the nonverbal information generation apparatus 840 in accordance with the eighth embodiment will be described. First, when the learned nonverbal information generation model stored in the learned model storage unit 736 of the nonverbal information generation model learning apparatus 810 is input to the nonverbal information generation apparatus 840, the learned nonverbal information generation model is stored in the learned model storage unit 763 of the nonverbal information generation apparatus 840. Then, when text information and additional information that are targets of nonverbal information generation are input to the input unit 750, the nonverbal information generation apparatus 840 executes the nonverbal information generation processing routine shown in FIG. 28.

In Step S400, the information acquisition unit 261 acquires the text information received by the input unit 750.

In Step S401, the text analysis unit 265 performs a predetermined text analysis on the text information acquired in Step S400 and acquires a result of the text analysis. Further, the voice synthesis unit 266 synthesizes voice information corresponding to the text information on the basis of the text analysis result obtained by the text analysis unit 265. Also, the voice synthesis unit 266 acquires time information representing the time from the start time to the end time when the voice information is emitted.

In Step S750, the additional information acquisition unit 761 acquires the additional information received by the input unit 750.

In Step S752, the feature quantity extraction unit 762 extracts time-information-stamped text feature quantities from the text information and the time information acquired in Step S401, and generates time-information-stamped additional information from the additional information acquired in Step S750 and the time information acquired in Step S401.

In Step S850, the feature quantity extraction unit 762 obtains, from the text information and time information acquired in Step S401, detailed time information regarding the text information. Moreover, the feature quantity extraction unit 762 generates detailed time-information-stamped text feature quantities using the detailed time information obtained above for the time-information-stamped text feature quantities.

Also, the feature quantity extraction unit 762 generates detailed time-information-stamped additional information using the detailed time information obtained above with regard to the time-information-stamped additional information.

In Step S754, the nonverbal information generation unit 764 reads the learned nonverbal information generation model stored in the learned model storage unit 763.

In Step S756, the nonverbal information generation unit 764 generates a time-information-stamped generation parameter corresponding to the detailed time-information-stamped text feature quantities and additional information generated in Step S850, on the basis of the detailed time-information-stamped text feature quantities and additional information generated in Step S850, and the learned nonverbal information generation model read in Step S754.

In Step S852, the control unit 870 controls the expression unit 70 such that the text acquired in Step S400 and the time-information-stamped nonverbal information generated in Step S756 are output from the expression unit 70 in accordance with the time information, and ends the nonverbal information generation processing routine.

It should be noted that since other configurations and operations of the nonverbal information generation apparatus and the nonverbal information generation model learning apparatus in accordance with the eighth embodiment are the same as those in the first embodiment, descriptions thereof will be omitted.

As described above, the nonverbal information generation apparatus in accordance with the eighth embodiment can output text information in accordance with time information of predetermined units along with the expression of the behavior indicated by the nonverbal information by partitioning the time information of text information into time information of predetermined units and assigning to the text information, even when time information of the required granularity cannot be obtained for the text information.

It should be noted that in the embodiment described above, the case of partitioning the time information using the number of moras as the unit number in accordance with the pronunciation characteristics of the target language has been described as an example, but the present invention is not limited thereto. In the case of English, the time information may be partitioned using the number of accents. Moreover, in addition to the number of moras and the number of accents, the time information may be partitioned and assigned in accordance with the number of parts of speech, the number of categories in a thesaurus, and the like.

Further, weighting may be performed after the time information has been partitioned by a predetermined unit number. The weighting may be determined by machine learning, or a weighting DB (in which weighting is set for each of types of units in accordance with the pronunciation characteristics of the target language) may be prepared in advance. The learning data for machine learning may be created by using a voice synthesizer that can assign detailed time information or may be created manually.

Also, in the nonverbal information generation apparatus, when it is sufficient that only text be output, the playback speed information of the utterance text is acquired, and the expression of the behavior need only be synchronized in accordance with the text display of the utterance. Moreover, at that time, it is sufficient that the behavior be expressed in accordance with the utterance length (or time length of the clause) to be played back, without partitioning the time information assigned to the nonverbal information by the predetermined unit number.

Ninth Embodiment

Next, a ninth embodiment of the present invention will be described. It should be noted that components with the same configuration as those in the first embodiment are denoted by the same reference signs, with descriptions thereof being omitted.

Outline of Ninth Embodiment

When insufficient consideration is given to the time-series information during the generation of nonverbal information, or when a nonverbal information generation model is learned for each of a plurality of actions to generate nonverbal information individually for each action, unnatural or impossible nonverbal information is generated. Unnatural nonverbal information leads to behavior that is not appropriate when performed at the same time, for example, behavior such as jumping while bowing. Further, impossible nonverbal information means behavior that is inappropriate when viewed in chronological order, for example, the behavior of slowly nodding five times assigned to only one morpheme. By being assigned to only one morpheme, this behavior is impossible behavior because there is not enough time.

Therefore, in the present embodiment, constraint conditions are set in relation to the generated nonverbal information, with correction (insertion/deletion/replacement) of the generated data being performed.

For example, in order to express natural nonverbal information, unnatural nonverbal information is deleted from learning data and/or generated nonverbal information using constraint conditions. Alternatively, nonverbal information is added using constraint conditions.

At least one of a constraint condition of the nonverbal information itself, a constraint condition due to the shape of the expression unit (CG character/robot), and a constraint condition using additional information is used as the constraint conditions. Further, the constraint conditions are manually defined as a set of rules.

<Configuration of Nonverbal Information Generation Model Learning Apparatus>

Since the nonverbal information generation model learning apparatus in accordance with the ninth embodiment has the same configuration as the nonverbal information generation model learning apparatus 810 in accordance with the eighth embodiment, the same reference signs are given, with descriptions thereof being omitted.

In the nonverbal information generation model learning apparatus in accordance with the ninth embodiment, with regard to time-information-stamped discretized nonverbal information for learning extracted by the generation parameter extraction unit 34, the learning data creation unit 833 changes the nonverbal information for learning or time information so as to satisfy a constraint condition relating to a time series of the nonverbal information, or a constraint condition relating to the nonverbal information to which time corresponds.

For example, the minimum necessary time information or number of text units (clauses, morphemes, etc.) is set as a constraint condition for each action. For this, constraint conditions are set based on the shape of the expression unit 70, the possible action speed, the current posture due to the previous behavior, and the like.

Specifically, the case in which an action is generated for each clause will be described as an example. In the case of a constraint condition being set in which a hand gesture A always acts across three clauses, when the hand gesture A is generated in only one clause, a change is performed so as to assign the label of the hand gesture A to the preceding clause or the subsequent clause or both clauses. If that is not possible, the behavior label of the hand gesture A is deleted. It should be noted that if it is determined that expression of the generated nonverbal information is impossible, it is preferable that an alternative behavior be prepared.

Also, regarding the setting of constraint conditions, it is possible to create in advance, based on actual human behavior data, which behavior should be generated and for how long (or the number of text units). At this time, as shown in FIG. 2, it is possible to use data created by acquiring nonverbal information (Y) of the speaker who is speaking using a predetermined measuring apparatus at the same time as acquiring the voice information (X) of the speaker who is speaking. Thereby, it is possible to set constraint conditions that enable more natural movement as a human being. It should be noted that if the expression unit 70 does not imitate a human being, the constraint conditions may be set to allow unnatural movement.

Also, the learning data creation unit 833, in consideration of the time-information-stamped additional information extracted by the learning feature quantity extraction unit 732, changes the nonverbal information for learning or time information so as to satisfy constraint conditions set using the additional information. For example, when the talk speed increases due to emotion, it is conceivable for actions that were hitherto possible being no longer performable, and thus the time information assigned to the nonverbal information for learning is changed.

The learning unit 735 learns a nonverbal information generation model for generating time-information-stamped nonverbal information from the time-information-stamped text feature quantities and additional information on the basis of the time-information-stamped text feature quantities for learning and time-information-stamped additional information extracted by the learning feature quantity extraction unit 732, and the time-information-stamped nonverbal information for learning changed by the learning data creation unit 833. At this time, it is preferable to learn a nonverbal information generation model using sequence labeling (conditional random fields (CRF)).

In this case, in order to consider the time series relationship of labels in $$Y^{T1,T2}$$ [Expression 56]

, sequence information such as Begin, Inside, Outside (BIO) tags may be assigned. For example, when certain labels appear consecutively, the B (Begin) label is assigned to the start label, and the I (Inside) is assigned to subsequent labels. This increases the accuracy when estimating consecutive labels.

Using the data labeled in this way, a nonverbal information generation model for generating gestures is learned by using the technique of sequence labeling. It is possible to use SVM for this, but it is more preferable to use hidden Markov model (HMM) or conditional random fields (CRF, see Reference Document 9).

[Reference Document 9] Japanese Patent No. 5152918

<Configuration of Nonverbal Information Generation Apparatus>

Since the nonverbal information generation apparatus in accordance with the ninth embodiment has the same configuration as the nonverbal information generation apparatus 740 in accordance with the seventh embodiment, the same reference signs are given, with descriptions thereof being omitted.

In the nonverbal information generation apparatus in accordance with the ninth embodiment, the nonverbal information generation unit 764 generates time-information-stamped nonverbal information corresponding to the time-information-stamped text feature quantities and additional information extracted by the feature quantity extraction unit 762 on the basis of the time-information-stamped text feature quantities and time-information-stamped additional information generated by the feature quantity extraction unit 762 and the learned nonverbal information generation model stored in the learned model storage unit 763.

Similarly to the learning data creation unit 833, the nonverbal information generation unit 764, with regard to the generated time-information-stamped nonverbal information, changes the nonverbal information or the time information assigned to the nonverbal information so as to satisfy a constraint condition relating to the time series of the nonverbal information, or a constraint condition relating to the nonverbal information to which time corresponds.

Then, the nonverbal information generation unit 764 controls the expression unit 70 so that the generation parameter corresponding to the time-information-stamped nonverbal information that has been changed is output from the expression unit 70 on the basis of the time information assigned to the generation parameter.

Under the control of the nonverbal information generation unit 764, the expression unit 70 outputs the text information or the voice information corresponding to the text information received by the input unit 750 in accordance with the detailed time information, and also expresses the nonverbal information generated by the nonverbal information generation unit 764 in accordance with the detailed time information.

<Operation of Nonverbal Information Generation Model Learning Apparatus>

Figure 29:
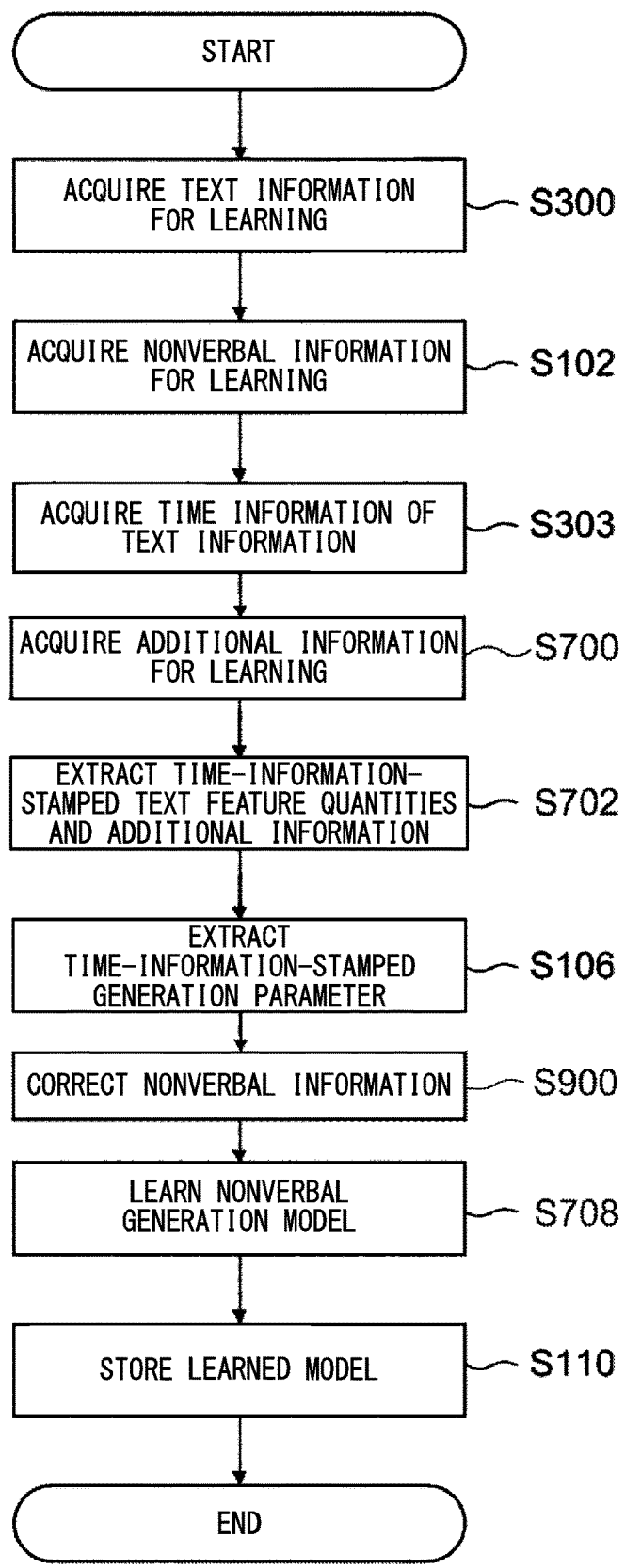
FIG. 29 is a flowchart showing an example of the flow of the learning process in accordance with a ninth embodiment.

Next, the operation of the nonverbal information generation model learning apparatus in accordance with the ninth embodiment will be described. First, when learning data representing a combination of a plurality of pieces of text information for learning, a plurality of pieces of additional information for learning, and a plurality of pieces of nonverbal information for learning is input to the learning input unit 720 of the nonverbal information generation model learning apparatus, the nonverbal information generation model learning apparatus executes the learning processing routine shown in FIG. 29.

First, in Step S300, the learning information acquisition unit 231 acquires text information for learning from among the plurality of sets of learning data received by the learning input unit 720 (specifically, combinations of text information, nonverbal information, and additional information).

In Step S102, the nonverbal information acquisition unit 33 acquires, from among the plurality of sets of learning data received by the learning input unit 720, the nonverbal information for learning and the time information representing the time from the start time to the end time when the behavior represented by the nonverbal information for learning is performed.

In Step S303, the learning text analysis unit 237 performs a predetermined text analysis on the text information for learning acquired in Step S300 and acquires a result of the text analysis. Further, the learning voice synthesis unit 238 synthesizes voice information for learning corresponding to the text information for learning on the basis of the text analysis result acquired by the learning text analysis unit 237. Then, the learning voice synthesis unit 238 acquires time information representing the time from the start time to the end time when the voice information for learning is emitted.

In Step S700, the learning additional information acquisition unit 731 acquires the additional information for learning from among the plurality of sets of learning data received by the learning input unit 720.

In Step S702, the learning feature quantity extraction unit 732 extracts the time-information-stamped text feature quantities for learning from the text information for learning and the time information acquired in Step S303. Moreover, the learning feature quantity extraction unit 732 generates time-information-stamped additional information for learning from the additional information for learning acquired in Step S700 and the time information acquired in Step S303.

In Step S106, the generation parameter extraction unit 34 extracts time-information-stamped discretized nonverbal information from the nonverbal information for learning and time information acquired in Step S102.

In Step S900, with regard to the time-information-stamped discretized nonverbal information extracted in Step S106, the learning data creation unit 833 changes the nonverbal information or time information assigned to the nonverbal information so as to satisfy a constraint condition relating to the time series of the nonverbal information, or a constraint condition relating to the nonverbal information to which time corresponds.

In Step S708, the learning unit 735 learns a nonverbal information generation model for generating a time-information-stamped generation parameter from the time-information-stamped text feature quantities and the additional information on the basis of the time-information-stamped text feature quantities for learning and the time-information-stamped additional information for learning extracted in Step S702 and the time-information-stamped nonverbal information for learning changed in Step S900.

In Step S110, the learning unit 735 stores the learned nonverbal information generation model obtained in Step S708 in the learned model storage unit 736, and ends the learning processing routine.

<Operation of Nonverbal Information Generation Apparatus>

Figure 30:
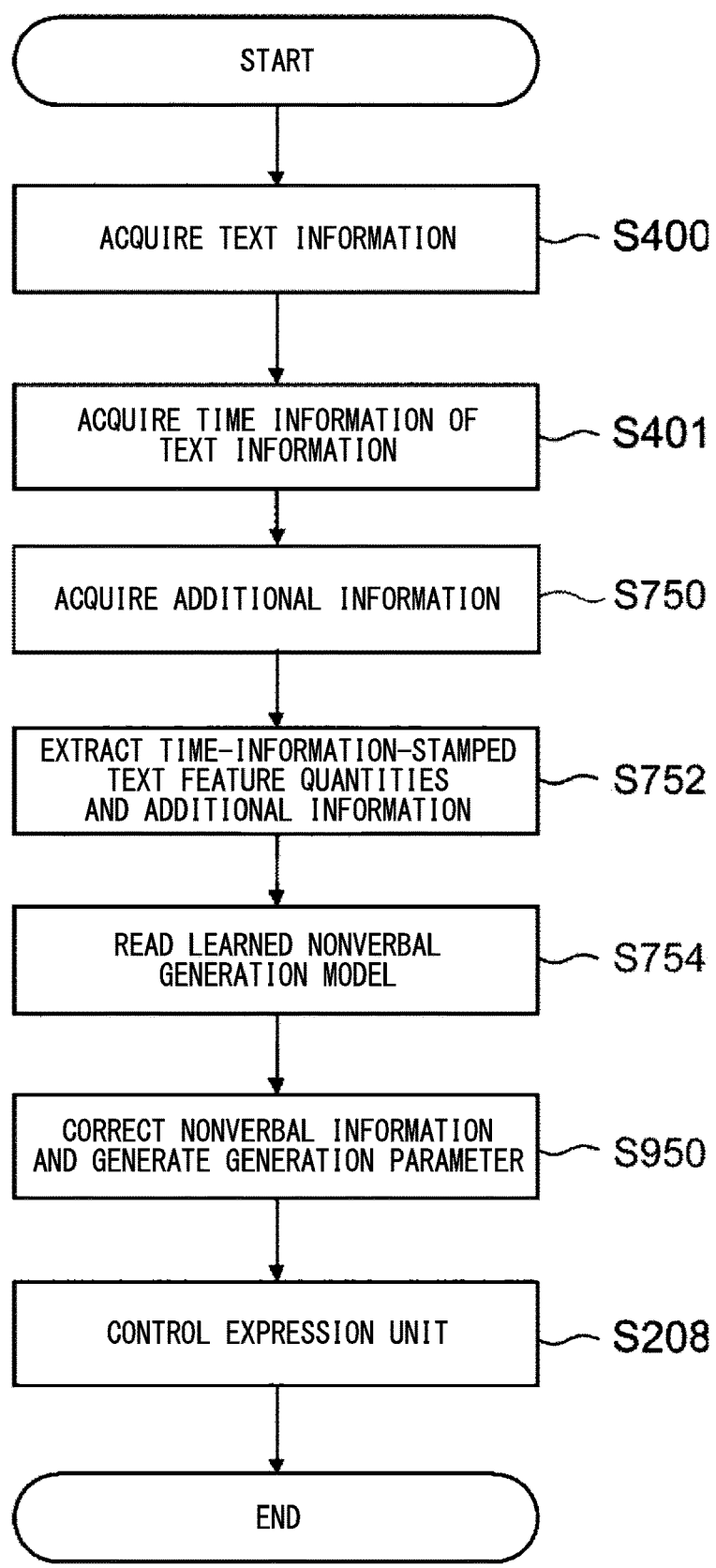
FIG. 30 is a flowchart showing an example of the flow of the nonverbal information generation process in accordance with the ninth embodiment.

Next, the operation of the nonverbal information generation apparatus in accordance with the ninth embodiment will be described. First, when the learned nonverbal information generation model stored in the learned model storage unit 736 of the nonverbal information generation model learning apparatus 810 is input to the nonverbal information generation apparatus, the learned nonverbal information generation model is stored in the learned model storage unit 763 of the nonverbal information generation apparatus. Then, when text information and additional information that are targets of nonverbal information generation are input to the input unit 750, the nonverbal information generation apparatus executes the nonverbal information generation processing routine shown in FIG. 30.

In Step S400, the information acquisition unit 261 acquires the text information received by the input unit 750.

In Step S401, the text analysis unit 265 performs a predetermined text analysis on the text information acquired in Step S400 and acquires a result of the text analysis. Further, the voice synthesis unit 266 synthesizes voice information corresponding to the text information on the basis of the text analysis result obtained by the text analysis unit 265. Then, the voice synthesis unit 266 acquires time information representing the time from the start time to the end time when the voice information is emitted.

In Step S750, the additional information acquisition unit 761 acquires the additional information received by the input unit 750.

In Step S752, the feature quantity extraction unit 762 extracts the time-information-stamped text feature quantities from the text information and time information acquired in Step S401, and generates time-information-stamped additional information from the additional information obtained in Step S750 and the time information obtained in Step S401.

In Step S754, the nonverbal information generation unit 764 reads the learned nonverbal information generation model stored in the learned model storage unit 763.

In Step S950, the nonverbal information generation unit 764 generates a time-information-stamped generation parameter corresponding to the time-information-stamped text feature quantities and additional information extracted in Step S752, on the basis of the time-information-stamped text feature quantities and the additional information extracted in Step S752, and the learned nonverbal information generation model read in Step S754. Then, the nonverbal information generation unit 764, with regard to the time-information-stamped generation parameter that has been generated, changes the nonverbal information or the time information assigned to the nonverbal information so as to satisfy a constraint condition relating to the time series of the nonverbal information, or a constraint condition relating to the nonverbal information to which time corresponds.

In Step S208, the nonverbal information generation unit 764 controls the expression unit 70 such that the time-information-stamped nonverbal information changed in Step S950 is output from the expression unit 70 on the basis of the time information assigned to the nonverbal information, and ends the nonverbal information generation processing routine.

It should be noted that since other configurations and operations of the nonverbal information generation apparatus and the nonverbal information generation model learning apparatus in accordance with the ninth embodiment are the same as those in the first embodiment, descriptions thereof will be omitted.

As described above, the nonverbal information generation apparatus in accordance with the ninth embodiment acquires voice information corresponding to text information, acquires time information representing the time from the start time to the end time when the voice information is emitted, generates time-information-stamped nonverbal information corresponding to the time-information-stamped text feature quantities on the basis of the time-information-stamped text feature quantities and the learned model for generating time-information-stamped nonverbal information, and changes the nonverbal information or time information of the nonverbal information so as to satisfy constraint conditions. This makes it possible to eliminate unnatural nonverbal information, automatically associate the text information with the nonverbal information, and reduce the cost of doing so.

Further, the nonverbal information generation model learning apparatus in accordance with the ninth embodiment, with regard to time-information-stamped nonverbal information for learning, changes the nonverbal information or time information of the nonverbal information so as to satisfy constraint conditions. Then, a nonverbal information generation model for generating time-information-stamped nonverbal information from the time-information-stamped text feature quantities is learned on the basis of the time-information-stamped text feature quantities for learning and the time-information-stamped nonverbal information for learning. Thereby, it is possible to obtain a nonverbal information generation model for generating nonverbal information from the text feature quantities while eliminating unnatural nonverbal information and reducing the cost of associating text information with nonverbal information. It should be noted that a machine learning model for rewriting may be created based on the constraint conditions.

Tenth Embodiment

Next, a tenth embodiment of the present invention will be described. It should be noted that components with the same configuration as those in the first embodiment are denoted by the same reference signs, with descriptions thereof being omitted.

Outline of Tenth Embodiment

The tenth embodiment differs from the ninth embodiment in that when nonverbal information that is impossible due to constraint conditions is detected, the time information assigned to the text information is changed in order to insert a pause into the voice data (including synthesized voice) or the display speed of the text (talk speed of synthesized voice) is changed so that the constraint conditions are satisfied.

The present embodiment is effective when nonverbal information is more important than voice (text). In particular, a high advantageous effect can be expected when creating the voice, which is an output, by voice synthesis or when outputting text.

<Configuration of Nonverbal Information Generation Model Learning Apparatus>

Since the nonverbal information generation model learning apparatus in accordance with the tenth embodiment has the same configuration as the nonverbal information generation model learning apparatus 810 in accordance with the eighth embodiment, the same reference signs are given, with descriptions thereof being omitted.

In the nonverbal information generation model learning apparatus in accordance with the tenth embodiment, with regard to text information for learning and time-information-stamped text feature quantities for learning acquired by the learning feature quantity extraction unit 732, the learning data creation unit 833 changes the time information of the text information for learning and the time information assigned to the text feature quantities for learning so as to satisfy a constraint condition relating to the time series of the nonverbal information.

For example, in order to satisfy the constraint condition, the time information assigned to the text information for learning and the text feature quantities for learning is changed so that a pause is inserted in accordance with the nonverbal information, or the time information assigned to the text information for learning and the text feature quantities is changed so as to change the display speed of the text (talk speed of synthesized voice) in accordance with the nonverbal information.

Moreover, the learning data creation unit 833, in consideration of the time-information-stamped additional information extracted by the learning feature quantity extraction unit 732, changes the time information assigned to the text information so as to satisfy a constraint condition set using the additional information.

The learning unit 735 learns a nonverbal information generation model for generating time-information-stamped nonverbal information from the time-information-stamped text feature quantities and additional information on the basis of the time-information-stamped text feature quantities for learning changed by the learning data creation unit 833, the time-information-stamped additional information extracted by the learning feature quantity extraction unit 732, and the time-information-stamped nonverbal information for learning extracted by the generation parameter extraction unit 34.

<Configuration of Nonverbal Information Generation Apparatus>

Since the nonverbal information generation apparatus in accordance with the tenth embodiment has the same configuration as the nonverbal information generation apparatus 740 in accordance with the seventh embodiment, the same reference signs are given, with descriptions thereof being omitted.

In the nonverbal information generation apparatus in accordance with the tenth embodiment, the nonverbal information generation unit 764 generates time-information-stamped nonverbal information corresponding to the timeinformation-stamped text feature quantities and additional information extracted by the feature quantity extraction unit 762 on the basis of time-information-stamped text feature quantities and time-information-stamped additional information generated by the feature quantity extraction unit 762 and the learned nonverbal information generation model stored in the learned model storage unit 763.

Similarly to the learning data creation unit 833, the nonverbal information generation unit 764 changes the time information for the text information and time-information-stamped text feature quantities so as to satisfy a constraint condition relating to the time series of the nonverbal information.

Then, the nonverbal information generation unit 764 controls the expression unit 70 so that the generation parameter corresponding to the time-information-stamped nonverbal information that has been generated is output from the expression unit 70 on the basis of the time information assigned to the generation parameter.

Under the control of the nonverbal information generation unit 764, the expression unit 70 outputs the text information or the voice information corresponding to the text information received by the input unit 750 in accordance with the changed time information, and also expresses the nonverbal information generated by the nonverbal information generation unit 764 in accordance with the time information.

It should be noted that since other configurations and operations of the nonverbal information generation apparatus and the nonverbal information generation model learning apparatus in accordance with the tenth embodiment are the same as those in the ninth embodiment, descriptions thereof will be omitted.

As described above, the nonverbal information generation apparatus in accordance with the tenth embodiment acquires voice information corresponding to text information, acquires time information representing the time from the start time to the end time when the voice information is emitted, generates time-information-stamped nonverbal information corresponding to the time-information-stamped text feature quantities on the basis of the time-information-stamped text feature quantities and the learned model for generating time-information-stamped nonverbal information, and changes the time information of the text information so as to satisfy constraint conditions. This makes it possible to eliminate an unnatural one, automatically associate the text information with the nonverbal information and to reduce the cost of doing so.

In addition, the nonverbal information generation model learning apparatus in accordance with the tenth embodiment, with regard to time-information-stamped text feature quantities for learning and nonverbal information for learning, changes the time information of the text feature quantities so as to satisfy constraint conditions. A nonverbal information generation model for generating time-information-stamped nonverbal information from the time-information-stamped text feature quantities is learned on the basis of the time-information-stamped text feature quantities for learning and the time-information-stamped nonverbal information for learning. Thereby, it is possible to obtain a nonverbal information general model for generating nonverbal information from the text feature quantities while removing an unnatural one and reducing the cost of associating text information with nonverbal information.

Eleventh Embodiment

Next, an eleventh embodiment of the present invention will be described. It should be noted that components with the same configuration as those in the first embodiment are denoted by the same reference signs, with descriptions thereof being omitted.

Outline of Eleventh Embodiment

When creating learning data for a gesture scenario and/or a nonverbal information generation model, it is indispensable to confirm or correct whether an action that is appropriate for an utterance, that is, the intended action, is performed. However, it is difficult to understand what kind of action is assigned to what kind of utterance when confirming or correcting of an action, and so the work cost tends to increase. Therefore, in the present embodiment, visualizing what kind of nonverbal information is assigned to what kind of text information simplifies confirmation and correction of the action.

Specifically, an easy-to-correct interface is provided by displaying nonverbal information in association with verbal information (text or voice) that has been partitioned into predetermined units and thereby enabling confirmation of the actual action for each predetermined unit. In addition, learning data can be added/corrected in accordance with the correction result, and moreover the nonverbal information generation model can be relearned.

Here, the usage scenes of the interface described in the present embodiment are, for example, the following five scenes.

(1) When creating a gesture scenario, the interface in accordance with the present embodiment is used. For example, with regard to the text information that has been input, time-information-stamped nonverbal information is generated on the basis of the learned nonverbal information generation model, the generated nonverbal information is corrected by the user's operation, and the correction result is output as a fixed scenario.

(2) When modifying learning data, the interface in accordance with the present embodiment is used. For example, the input learning data is read in, the text information or the nonverbal information included in the learning data is corrected by the user's operation, and the correction result is output as the learning data.

(3) When adding learning data, the interface in accordance with the present embodiment is used. For example, with regard to text information that has been input, time-information-stamped nonverbal information is generated on the basis of the learned nonverbal information generation model, the generated nonverbal information is corrected by the user's operation, and the correction result is output as learning data corresponding to the nonverbal information generation model.

(4) When relearning the learned nonverbal information generation model, the interface in accordance with the present embodiment is used. For example, with regard to text information that has been input, time-information-stamped nonverbal information is generated on the basis of the learned nonverbal information generation model, the generated nonverbal information is corrected by the user's operation, and the correction result is added as learning data corresponding to the nonverbal information generation model to relearn the nonverbal information generation model.

(5) The interface in accordance with the present embodiment is used when generating the constraint conditions described in the ninth embodiment and the tenth embodiment. For example, the constraint conditions are defined using the correction result obtained by the same method as any one of the above (1) to (4).

<Configuration of Nonverbal Information Generation Apparatus>

Figure 31:
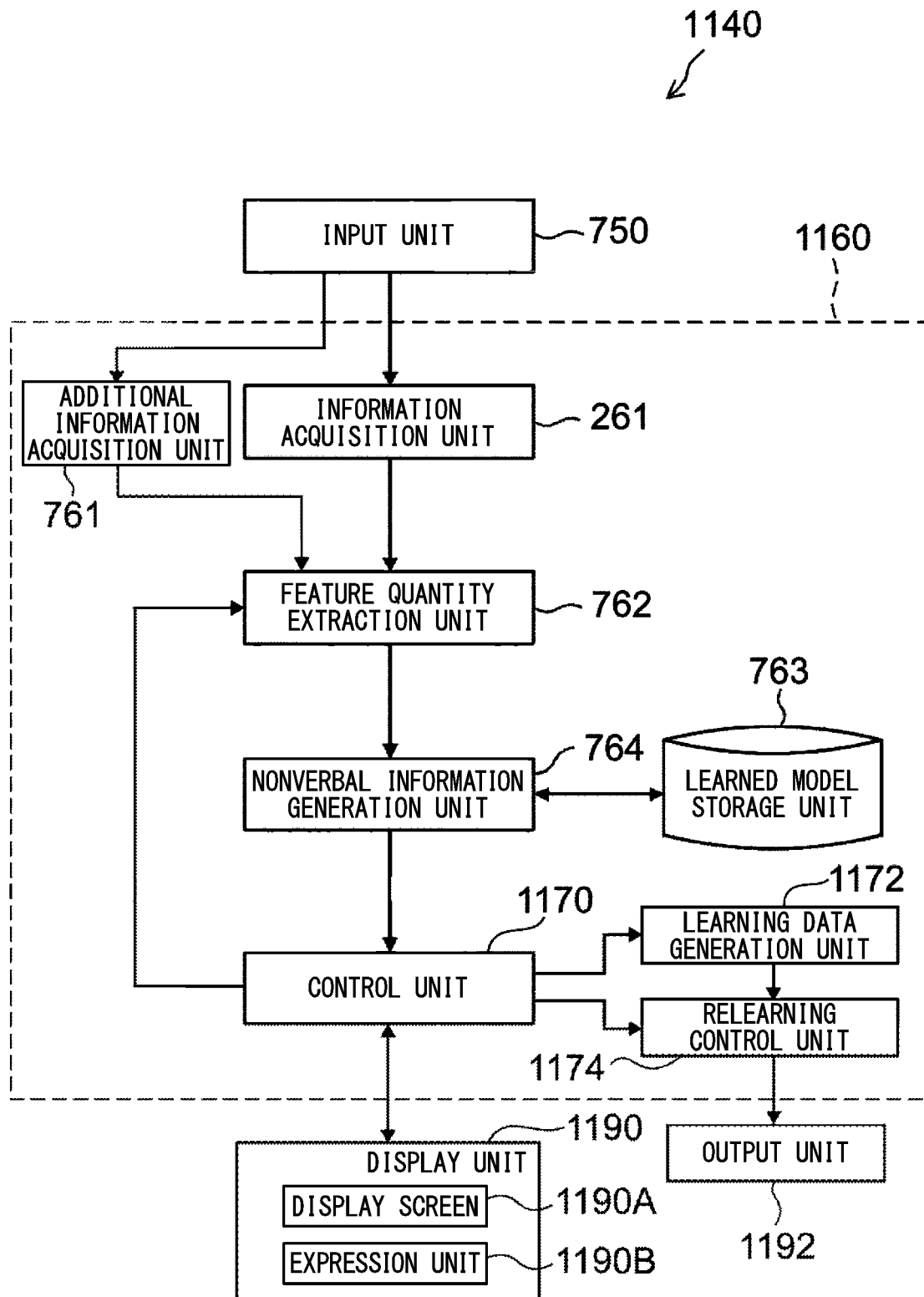
FIG. 31 is a block diagram showing an example of the configuration of a nonverbal information generation apparatus in accordance with an eleventh embodiment.

FIG. 31 is a block diagram illustrating an example of the configuration of a nonverbal information generation apparatus 1140 in accordance with the eleventh embodiment. As shown in FIG. 31, the nonverbal information generation apparatus 1140 in accordance with the eleventh embodiment is configured by a computer provided with a CPU, a RAM, and a ROM that stores a program for executing a nonverbal information generation processing routine described later. The nonverbal information generation apparatus 1140 is functionally provided with an input unit 750, a calculation unit 1160, a display unit 1190, and an output unit 1192.

The input unit 750 receives text information and additional information. The additional information to be received is additional information for each predetermined processing unit (for example, for each morpheme or each clause). It should be noted that when the additional information does not change for each predetermined processing unit (for example, gender), it need not be received for each predetermined processing unit. In this case, upon being received, the additional information needs only be deployed in the additional information for each predetermined processing unit on the apparatus side.

The calculation unit 1160 is provided with an information acquisition unit 261, an additional information acquisition unit 761, a feature quantity extraction unit 762, a learned model storage unit 763, a nonverbal information generation unit 764, a control unit 1170, a learning data generation unit 1172, and a relearning control unit 1174. It should be noted that the additional information acquisition unit 761 may be omitted. In the usage scenes of (1) and (5) above, the learning data generation unit 1172 and the relearning control unit 1174 may be further omitted. In addition, in the use scenes of (2) and (3) above, the relearning control unit 1174 may be further omitted.

The information acquisition unit 261 acquires the text information received by the input unit 750 in the same manner as the information acquisition unit 261 of the nonverbal information generation apparatus 240 in accordance with the second embodiment, and additionally acquires voice information corresponding to the text information and acquires time information representing the time from the start time to the end time when the voice information is emitted.

The additional information acquisition unit 761 acquires the additional information received by the input unit 750, similarly to the additional information acquisition unit 761 of the nonverbal information generation apparatus 740 in accordance with the seventh embodiment.

Similarly to the feature quantity extraction unit 762 of the nonverbal information generation apparatus 740 in accordance with the seventh embodiment, the feature quantity extraction unit 762 extracts time-information-stamped text feature quantities representing feature quantities of the text information from the text information and the time information acquired by the information acquisition unit 261. Further, the feature quantity extraction unit 762 generates time-information-stamped additional information from the additional information acquired by the additional information acquisition unit 761 and the time information acquired by the information acquisition unit 261.

Similarly to the learned model storage unit 763 of the nonverbal information generation apparatus 740 in accordance with the seventh embodiment, the learned model storage unit 763 stores the same learned nonverbal information generation model as the learned nonverbal information generation model stored in the learned model storage unit 736.

Similarly to the nonverbal information generation unit 764 of the nonverbal information generation apparatus 740 in accordance with the seventh embodiment, the nonverbal information generation unit 764 generates time-information-stamped nonverbal information corresponding to the time-information-stamped text feature quantities and additional information extracted by the feature quantity extraction unit 762 on the basis of the time-information-stamped text feature quantities and the time-information-stamped additional information extracted by the feature quantity extraction unit 762, and the learned nonverbal information generation model stored in the learned model storage unit 763.

The control unit 1170 controls the display unit 1190 so as to display the time-information-stamped nonverbal information generated by the nonverbal information generation unit 764, and the text information and additional information received by the input unit 750.

The display unit 1190 is provided with a display screen 1190A and an expression unit 1190B. It should be noted that in the present embodiment, the case in which the expression unit 1190B is included in the display unit 1190 will be described as an example, but the present invention is not limited thereto, and the expression unit 1190B may be configured with an apparatus (for example, a robot) separate from the display unit 1190.

The expression unit 1190B outputs voice corresponding to the text information and expresses behavior indicated by the time-information-stamped nonverbal information that has been generated in accordance with the time information. Alternatively, a balloon including text information may be displayed.

Figure 32:
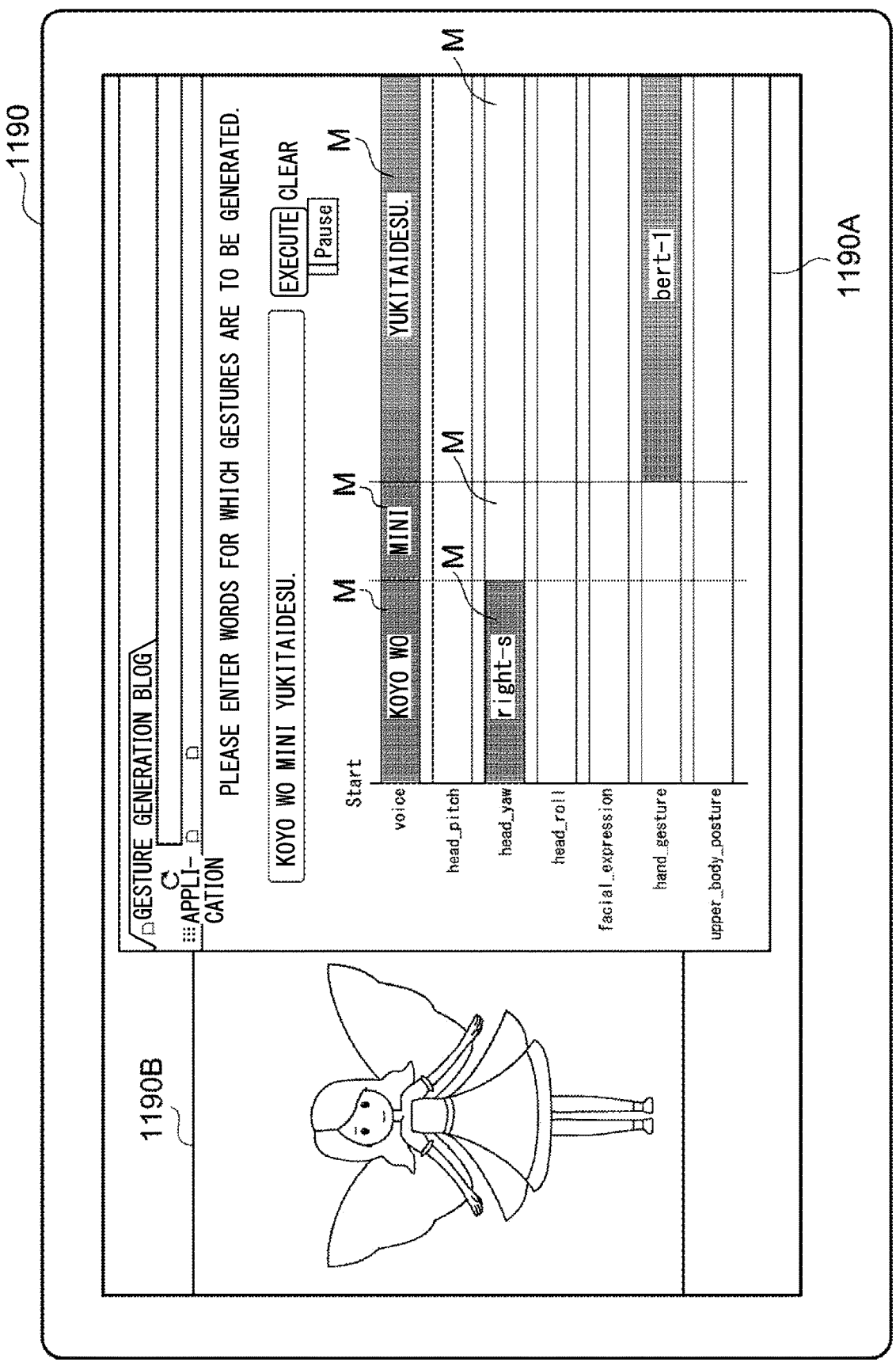
FIG. 32 is a drawing showing an example of the display screen in accordance with the eleventh embodiment.

FIG. 32 shows an example of the display screen 1190A displayed by the display unit 1190 at this time.

In the display screen 1190A, text partitioned into predetermined units is displayed, and a label showing the nonverbal information is displayed in association with each predetermined unit of the text on the basis of the time information assigned to the text feature quantities and the time information assigned to the nonverbal information. Moreover, the display screen 1190A may display a voice waveform of the voice corresponding to the text information.

It should be noted that the assigned time information is the time when outputting the text, and similarly to, for example, the eighth embodiment, it may be assigned on the basis of the result of partitioning a range of time when outputting the text in accordance with the number of partitions when the text has been partitioned in the predetermined units.

In addition, the display unit 1190 includes the expression unit 1190B that expresses behavior indicating nonverbal information, and displays the display screen 1190A in a state in which instructions for the expression unit 1190B to start, stop, fast-forward, or rewind by a predetermined unit (for example, one morpheme or one clause) the expression of behavior can be received. For example, a playback button, a pause button, a rewind button, and a fast-forward button are displayed in the display screen 1190A.

It should be noted that a slide bar capable of receiving instructions for fast-forwarding or rewinding the expression of behavior by the expression unit 1190B may be displayed in the display screen 1190A.

Upon receiving an instruction to start, stop, fast forward, or rewind an expression, the control unit 1170 controls the expression of the behavior by the expression unit 1190B in accordance with the instruction.

Further, the display unit 1190 may perform display in the display screen 1190A so that it is possible to identify to which part of the text the behavior expressed by the expression unit 1190B corresponds. For example, a playback bar may be displayed at the corresponding portion in the text corresponding to the behavior expressed by the expression unit 1190B, or the cell color of the corresponding portion in the text corresponding to the behavior expressed by the expression unit 1190B may be changed or made to flash.

Further, the display unit 1190 displays the display screen 1190A in a state in which settings of additional information can be received. Upon receiving a setting of additional information, the control unit 1170 outputs the additional information to the feature quantity extraction unit 762, and by further using the additional information, controls the display unit 1190 so as to display in the display screen 1190A a label showing the nonverbal information generated by the nonverbal information generation unit 764 and the text.

Further, the display unit 1190 displays the display screen 1190A in a state in which a change instruction for the label indicating the nonverbal information can be received.

Upon receiving a change instruction for the label indicating the nonverbal information, the learning data generation unit 1172 generates, as learning data for learning the nonverbal information generation model, a combination of time-information-stamped text feature quantities and additional information extracted by the feature quantity extraction unit 762, and a label indicating the nonverbal information changed in accordance with the change instruction.

Further, the display unit 1190 displays the display screen 1190A in a state in which a relearning instruction of the nonverbal information generation model and a setting of a weight for the learning data generated by the learning data generation unit 1172 can be received. Here, the weight for the learning data is set in accordance with how much importance is attached to the learning data to be added in comparison with the existing learning data at the time of the relearning. For example, when this weight is set to the maximum value, the nonverbal information generation model is relearned so that Y is always generated for X of the pair (X, Y) in the added learning data.

Upon receiving the relearning instruction and the setting of the weight, the relearning control unit 1174 uses the learning data generated by the learning data generation unit 1172 and the set weight to cause the nonverbal information generation model learning apparatus 710 to learn the nonverbal information generation model.

Specifically, the user operates the display screen 1190A as in the following Step 1 to Step 5.

(Step 1) The text is set by inputting or selecting the text indicating the uttered sentence for which nonverbal information is to be generated. For example, text is input when generating a gesture scenario as in the usage scene of (1) above or when adding learning data as in the usage scenes of (3) and (4) above. Further, when modifying the learning data as in the usage scene of (2) above, a collection of learning data is presented and the text of the learning data to be modified is selected.

(Step 2) The text indicating the uttered sentence is partitioned into predetermined units, and the label Y indicating the nonverbal information generated for each partitioned unit is displayed.

(Step 3) When the start of expression is instructed, the expression unit 1190B is put into operation by the generated nonverbal information.

(Step 4) The user visually confirms the action of the expression unit 1190B.

(Step 5) By clicking a cell M (a cell M with a label or a blank cell M) when an odd movement is performed, it is possible to rewrite the label to show correct nonverbal information. As a result, the label may be added to the learning data as a label indicating the correct nonverbal information for the input utterance (in that case, weighting may also be set).

Figure 33:
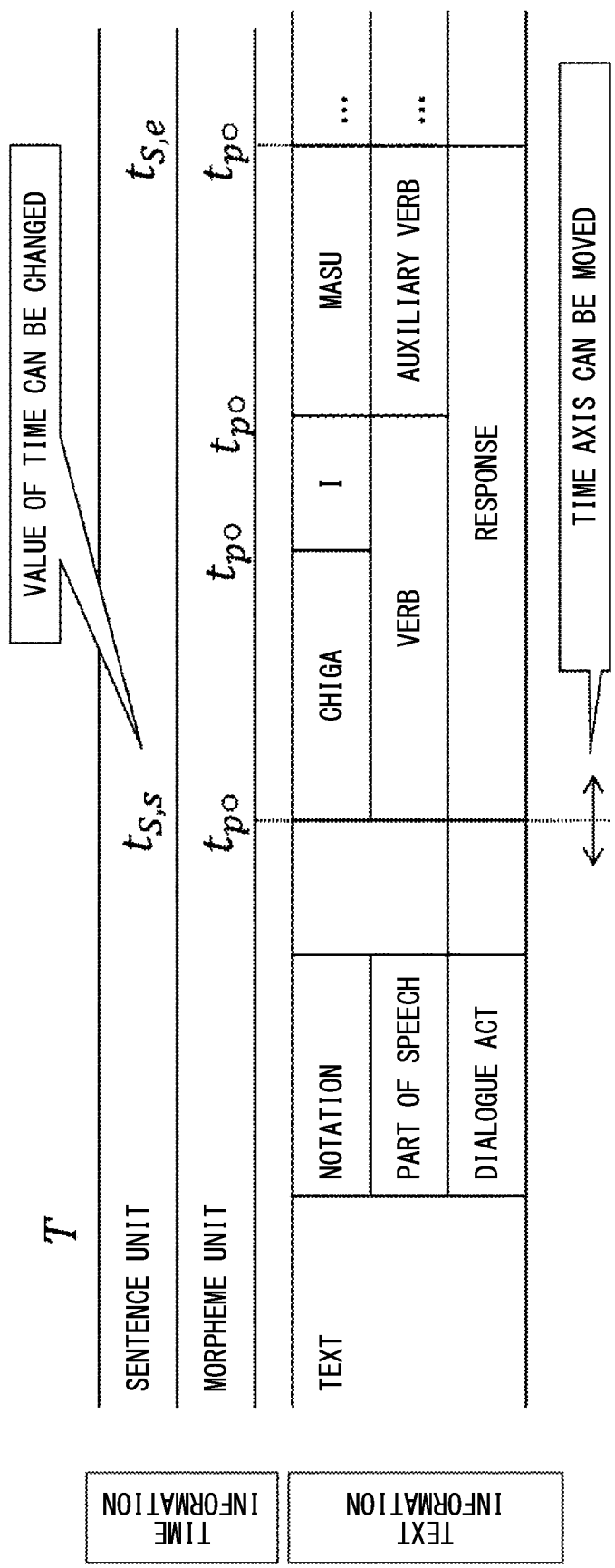
FIG. 33 is a drawing for describing an instruction to change time information.

It should be noted that the time information for each predetermined unit may be displayed, and the display screen 1190A may be displayed so that an instruction to change the time information can be received (see FIG. 33). For example, by clicking the value of time information, the value can be edited, and the value of time information can be changed. Alternatively, the start time for each predetermined unit can be changed by changing the position of the vertical bar indicating the start time for each predetermined unit to the left or right.

Figure 34:
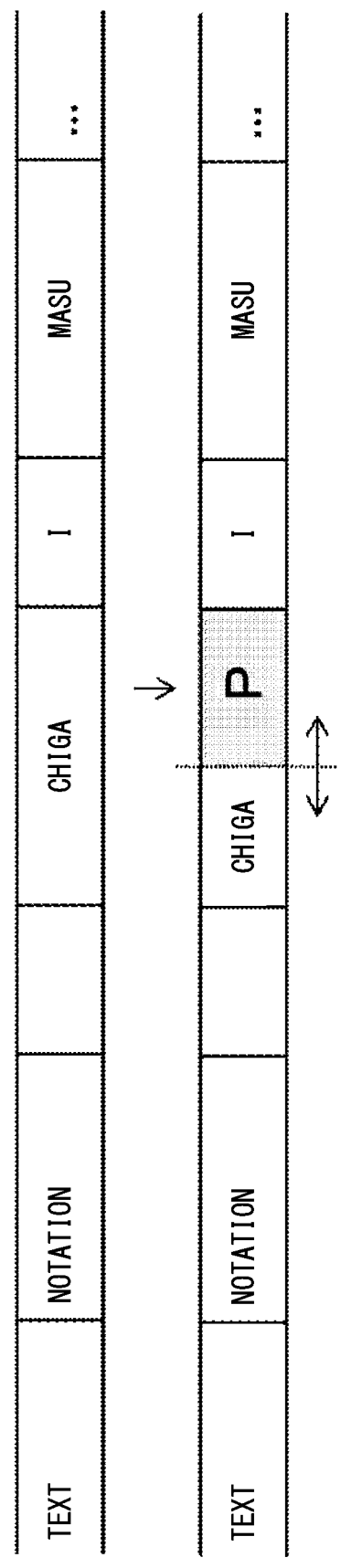
FIG. 34 is a drawing for describing an instruction to change time information.

Moreover, a change instruction to insert a pause in the voice data (including synthesized voice) may be displayed in the display screen 1190A so that the change instruction can be received. For example, as shown in FIG. 34, it is possible to receive a change instruction to insert the start position of a pause P (see the dotted vertical line in FIG. 34) in each predetermined unit of text information, and it is possible to receive a change instruction to change the ratio of the pause length by adjusting the start position of the pause P. Further, with respect to also a pause inserted so as to satisfy the constraint condition as described in the tenth embodiment, a change instruction for changing the ratio of the pause length by adjusting the start position of the pause P may be received.

Further, the text feature quantity for each predetermined unit (for example, clause) and the generation parameter corresponding to the nonverbal information may be displayed so that a change instruction can be received. For example, as shown in FIG. 32, when the user aligns the mouse cursor with the cell M of the text information or the cell M of the nonverbal information and right-clicks, the text feature quantity corresponding to the cell M is overlay-displayed, whereby a change instruction can be received. Further, when the text feature quantities corresponding to the cell M of the text information are overlay-displayed, all the text feature quantities extracted from the text information of the cell M may be displayed, and when the text feature quantities corresponding to the cell M of the nonverbal information are overlay-displayed, the text feature quantity that is the basis for generating the nonverbal information may be overlay-displayed.

The nonverbal information generation model learning apparatus in accordance with the eleventh embodiment is the same as the nonverbal information generation model learning apparatus 710 in accordance with the seventh embodiment, and therefore the same reference signs are given, with descriptions thereof being omitted.

<Operation of Nonverbal Information Generation Apparatus>

Figure 35:
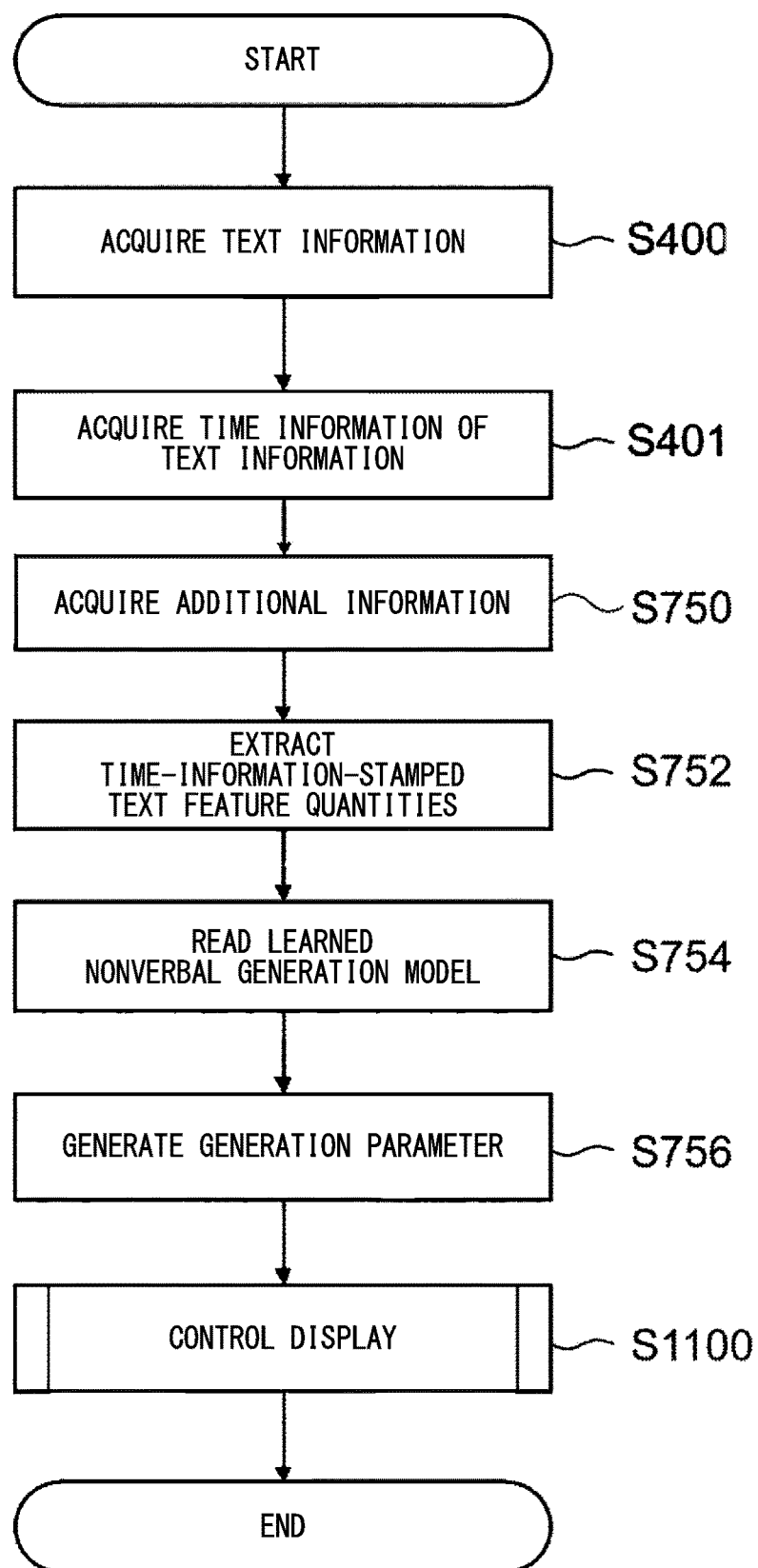
FIG. 35 is a flowchart showing an example of the flow of the nonverbal information generation process in accordance with the eleventh embodiment.

Next, the operation of the nonverbal information generation apparatus in accordance with the eleventh embodiment will be described. First, when the learned nonverbal information generation model stored in the learned model storage unit 736 of the nonverbal information generation model learning apparatus 710 is input to the nonverbal information generation apparatus, the learned nonverbal information generation model is stored in the learned model storage unit 763 of the nonverbal information generation apparatus. Then, when text information and additional information that are the target of nonverbal information generation are input to the input unit 750, the nonverbal information generation apparatus executes the nonverbal information generation processing routine shown in FIG. 35.

In Step S400, the information acquisition unit 261 acquires the text information received by the input unit 750.

In Step S401, the text analysis unit 265 performs a predetermined text analysis on the text information acquired in Step S400 and acquires a result of the text analysis. Further, the voice synthesis unit 266 synthesizes voice information corresponding to the text information on the basis of the text analysis result obtained by the text analysis unit 265. Then, the voice synthesizing unit 266 acquires time information representing the time from the start time to the end time when the voice information is emitted.

In Step S750, the additional information acquisition unit 761 acquires the additional information received by the input unit 750.

In Step S752, the feature quantity extraction unit 762 extracts time-information-stamped text feature quantities from the text information and time information acquired in Step S401, and generates time-information-stamped additional information from the additional information obtained in Step S750 and the time information obtained in Step S401.

In Step S754, the nonverbal information generation unit 764 reads the learned nonverbal information generation model stored in the learned model storage unit 763.

In Step S756, the nonverbal information generation unit 764 generates a time-information-stamped generation parameter corresponding to time-information-stamped text feature quantities and additional information extracted in Step S752, on the basis of the time-information-stamped text feature quantities and additional information extracted in Step S752, and the learned nonverbal information generation model read in Step S754.

In Step S1100, the control unit 1170 controls the display unit 1190 so as to display the time-information-stamped nonverbal information generated by the nonverbal information generation unit 764 and the text information and additional information received by the input unit 750, and then ends the nonverbal information generation processing routine.

Figure 36:
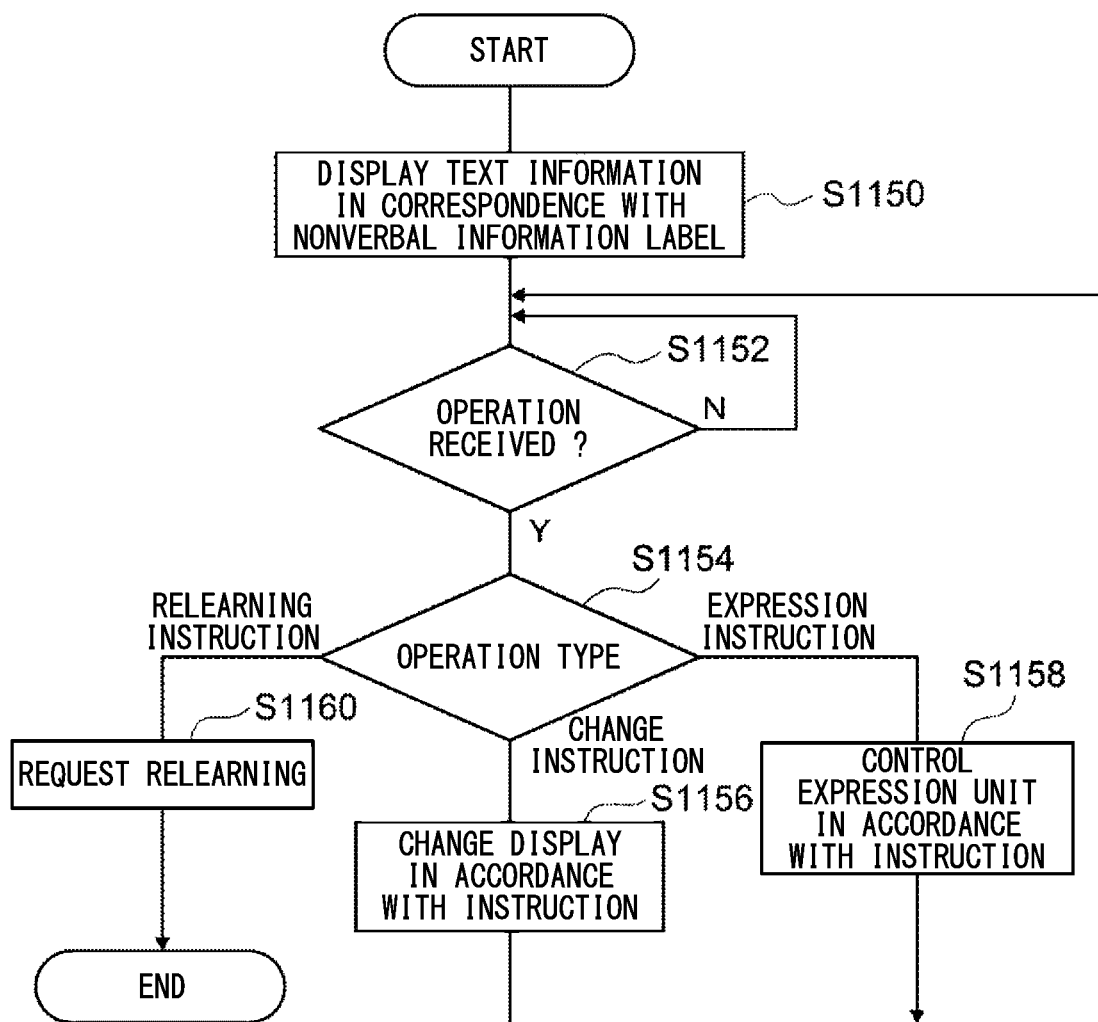
FIG. 36 is a flowchart showing an example of the flow of the display control process in accordance with the eleventh embodiment.

The process of Step S1100 is realized by the processing routine shown in FIG. 36.

First, in Step S1150, the control unit 1170 displays text that is partitioned into predetermined units, and displays a label indicating nonverbal information in the display screen 1190A in association with each predetermined unit of the text on the basis of the time information assigned to the text feature quantities and the time information assigned to the nonverbal information.

In Step S1152, the control unit 1170 determines whether or not an operation on the display screen 1190A has been received. When the control unit 1170 has received an operation on the display screen 1190A, the process proceeds to Step S1154.

In Step S1154, the control unit 1170 determines whether the type of operation received in Step S1152 is a change instruction, an expression instruction, or a relearning instruction. If the received operation is a setting of additional information or an instruction to change a label indicating nonverbal information, in Step S1156, the control unit 1170 displays in the display screen 1190A a result reflecting the change made in accordance with the change instruction. When the received operation is a setting of additional information, the control unit 1170 further outputs the additional information to the feature quantity extraction unit 762, and displays in the display screen 1190A the label indicating the nonverbal information generated by the nonverbal information generation unit 764 and text by further using the additional information.

Moreover, if the received operation is a change instruction for a label indicating nonverbal information, the learning data generation unit 1172 generates a combination of time-information-stamped text feature quantities and additional information extracted by the feature quantity extraction unit 762, and the label indicating the nonverbal information changed in accordance with the change instruction as learning data for learning a nonverbal information generation model, and performs output to the nonverbal information generation model learning apparatus 710. Then, the process returns to Step S1152.

Further, when an instruction to start, stop, or fast-forward or rewind by one clause at a time the expression of behavior by the expression unit 1190B is received, in Step S1158, the control unit 1170 controls the expression of behavior by the expression unit 1190B in accordance with the received instruction, and the process returns to Step S1152.

Further, when a relearning instruction and weight setting have been received, in Step S1160, the control unit 1170 uses the learning data generated by the learning data generation unit 1172 and the set weight to cause the nonverbal information generation model learning apparatus 710 to learn the nonverbal information generation model, and ends the processing routine.

As described above, by the user correcting the result of the nonverbal information generated using the nonverbal information generation model for the input text information and additional information, it is possible to generate learning data of the nonverbal information generation model and add learning data of the nonverbal information generation model. In addition, by the user instructing relearning of the nonverbal information generation model, the user can update the nonverbal information generation model by performing relearning using the added learning data.

As described above, the nonverbal information generation apparatus in accordance with the eleventh embodiment simplifies the work of correcting nonverbal information by visualizing what kind of nonverbal information is assigned to what kind of text information.

It should be noted that a gesture scenario composed of time-information-stamped text information and nonverbal information generated by the user performing a correction may be output as a fixed scenario.

In addition, similarly to the method described in the ninth embodiment or the tenth embodiment, when rewriting is performed on a combination of the time-information-stamped text information and nonverbal information based on constraint conditions, the correction may be performed by the user on the rewriting result, and a machine learning model relating to rewriting may be created using that data as learning data.

Further, when rewriting is performed on a combination of the time-information-stamped text information and nonverbal information based on constraint conditions, the rewriting history and which constraint condition has been applied may be displayed, and moreover a correction of the constraint condition itself may be received.

Moreover, the ranking of the text feature quantities associated with the label showing the nonverbal information may be obtained from the learning data and presented to the user. In this case, first, pairs each composed of text feature quantities and a label indicating nonverbal information are acquired from the learning data, and for each label indicating the nonverbal information, the type of the text feature quantity with which the pair is formed and the number of appearances thereof are counted. Then, for each label indicating the nonverbal information, the types of text feature quantities may be rearranged in descending order of the number of the counts to be presented as the ranking of the text feature quantities.

Also, after presenting the ranking of the text feature quantities, the selection of the learning data may be received and an edit to the selected learning data may be received. For example, as shown in FIG. 32, when the user aligns the mouse cursor with the cell M of the nonverbal information and right-clicks, the ranking of the feature quantity with respect to the label of the cell M is overlay-displayed. Then, a selection instruction (for example, click) of each feature quantity name in the feature quantity ranking can be received. When a feature quantity name is selected, the learning data composed of the nonverbal information label of the cell M and the selected text feature quantity are displayed. At this time, the learning data are displayed so as to be directly editable, with the learning data being edited by deletion, addition, editing, or the like.

Also, when the learning data has been corrected, the learning data before correction may be added as a negative example.

Moreover, a correction of the voice synthesis parameter (talk speed and the like) may be displayed so that the correction is received.

It should be noted that in the above seventh to eleventh embodiments, the case in which the input information is text information has been described as an example, but the present invention is not limited thereto. For example, the input information may be voice information. When the input information is voice information, the learning information acquisition unit in the nonverbal information generation model learning apparatus is the same as the learning information acquisition unit 31 of the first embodiment. When the input information is voice information, the information acquisition unit in the nonverbal information generation apparatus is the same as the information acquisition unit 61 of the first embodiment.

For example, configurations corresponding to combinations of the information acquisition unit (or the learning information acquisition unit) and the feature quantity extraction unit (or the learning feature quantity extraction unit) in each of the above-described embodiments are all four patterns illustrated in FIG. 15. In addition, possible variations of combinations of the configurations at the time of learning and at the time of nonverbal information generation are the patterns shown in FIG. 16.

Further, as the learning data used in the nonverbal information generation model learning apparatus described in the fourth to sixth embodiments, for example, in the scene shown in FIG. 2, the acquisition of the nonverbal information (Y) of a conversation partner who is the interlocutor of the speaker who is speaking using a measuring apparatus at the same time as the acquisition of the voice information (X) of the speaker who is speaking may be applied to each of the above seventh to eleventh embodiments.

EXPERIMENTAL EXAMPLE

Next, an experimental example relating to the fifth embodiment will be described.

[With Respect to Experimental Data]

Corpus data was constructed for two-person dialogues, including text information that represents utterances and nonverbal information that represents accompanying nodding. Participants in the two-person dialogues were Japanese men and women in their 20s to 50s who were meeting for the first time. There were a total of 24 participants (12 pairs). The participants sat facing each other. For the dialogue content, an animation explanation task was adopted in order to collect abundant data related to nodding that accompanies utterances. After each participant watched different animations, the participant explained the contents of the animations to the dialogue partner. During a 10-minute dialogue session, one participant explained in detail the animation to the dialogue partner. The dialogue partner was allowed to freely ask questions to the explainer and talk freely. A directional pin microphone attached to each subject's chest was used to record utterances. A video camera was used to record the overall appearance of the dialogue and the appearances of the participants. The video was recorded at 30 Hz. The acquired text information and nonverbal information are shown below.

Text information representing utterances: After manually transcribing the uttered words from the voice information, sentences were partitioned from the uttered content. Furthermore, each sentence was partitioned into clauses using a dependency analysis engine (see Reference Documents 10 and 11). The number of the partitioned clauses was 11,877.

[Reference Document 10] Kenji Imamura, "Japanese Dependency Analysis of Quasi-Spoken Languages Using Sequence Labeling", Proceedings of the 13th Annual Conference of the Linguistic Processing Society, pp. 518-521, 2007.

[Reference Document 11] E. Charniak, "A Maximum-Entropy-Inspired Parser", Proceedings of the 1st North American chapter of the Association for Computational Linguistics conference, pp. 132-139, 2000.

Nonverbal information representing nodding: Each section in which nodding occurred in the video was manually labeled. Nodding that occurred continuously was treated as a single nodding event.

In manual labeling (annotation), all of the aforementioned data were integrated at a 30 Hz time resolution.

[Nonverbal Information Generation Model]

Using the corpus data that was constructed, a nonverbal information generation model was constructed that generates nonverbal information representing nodding for each clause unit, with words, the respective parts of speech and thesaurus items thereof, word positions, and dialogue acts of the entire text information serving as input. In order to verify whether or not each text information is valid, a nonverbal information generation model using each text feature quantity and a nonverbal information generation model using all text feature quantities were constructed. Specifically, for each clause unit, the decision tree algorithm C4.5 (see Reference Document 12) was used to implement a nonverbal information generation model that outputs a binary value for the presence or absence of nodding, with the text feature quantities obtained from the target clause, the clause before the target clause, and the clause after the target clause serving as input. The text feature quantities used are as follows.

[Reference Document 12] J. R. Quinlan, "Improved use of continuous attributes in c4.5", Journal of Artificial Intelligence Research, 4: 77-90, 1996.

Character number: Number of characters in a clause

Position: Position of the clause from the beginning or end of the sentence

Word: Word information (bag-of-words) in clauses extracted by the morphological analysis tool Jtag (see Reference Document 13)

Part of speech: Part-of-speech information of a word in the clause extracted by Jtag Thesaurus: Thesaurus information of words in a clause based on the Japanese Lexicon (see Reference Document 14)

Dialogue act: Dialogue act (33 types) extracted for each sentence by a dialogue act estimation technique using word n-gram and thesaurus information (see Reference Documents 4 and 15)

[Reference Document 13] Takeshi Fuchi and Shinichiro Takagi, "Japanese morphological analyzer using word co-occurrence -Jtag-", In Proceedings of International conference on Computational linguistics, pages 409-413, 1998.

[Reference Document 14] Satoru Ikehara, Masahiro Miyazaki, Satoshi Shirai, Akio Yokoo, Hiromi Nakaiwa, Kentaro Ogura, Yoshifumi Oyama, and Yoshihiko Hayashi, "Japanese Lexicon", Iwanami Shoten, 1997.

[Reference 15] Toyomi Meguro, Ryuichiro Higashinaka, Yasuhiro Minami, and Kohji Dohsaka, "Controlling listening-oriented dialogue using partially observable Markov decision processes", In Proceedings of International Conference on Computational Linguistics, pages 761-769, 2010.

[With Respect to Experimental Results]

Out of the data of 24 participants, the data of 23 people was used for learning, and an evaluation was carried out by the 24 cross-validation method in which the data of the remaining 1 person was used for evaluation. Thereby, an evaluation of how much nodding can be generated from the data of others was performed. It should be noted that with regard to the data on the presence or absence of nodding in each operation, the number of data items was reduced to match that with the small amount of data so that the amount of data was the same. Therefore, the baseline chance level is 0.50. Table 5 shows the average values of the performance evaluation results.

As a result of evaluation of the nonverbal information generation model, it was obtained that the accuracy was good in the order of lexicon, part of speech, and word. In machine learning, when the resolution of the extracted text feature quantities is too high (number of types is numerous), the appearance frequency of each text feature quantity is relatively low, while text feature quantities that have never appeared even once in the learning data appear more frequently during execution, which tends to reduce the accuracy of generation. On the other hand, as the resolution is lowered (the number of types is reduced by abstraction), the above-mentioned problem does not occur, but differences in data can no longer be expressed, and so the accuracy of the generation tends to decrease.

The thesaurus information consists of words classified by meanings and attributes, and since the number of types thereof is smaller than the number of words but more numerous than the parts of speech, it is considered that learning was efficiently performed even with the learning data amount of this experiment. Since the thesaurus information has a hierarchical structure and it is possible to perform high-level conceptualization (abstraction) of words in multiple stages, it is easy to control the degree of abstraction in accordance with the size of the learning data.

Creating a huge amount of corpus data is expensive and also difficult. When the learning data cannot be sufficiently prepared, a better learning effect can be expected by using the thesaurus information even with a relatively small amount of data.

TABLE 5

| Feature quantity | Compatibility rate | Reproducibility rate | F value |
| --- | --- | --- | --- |
| Chance level | 0.500 | 0.500 | 0.500 |
| Number of characters | 0.561 | 0.556 | 0.558 |
| Word | 0.357 | 0.529 | 0.431 |
| Part of speech | 0.522 | 0.528 | 0.525 |
| Lexicon | 0.615 | 0.538 | 0.579 |
| All | 0.578 | 0.601 | 0.593 |

INDUSTRIAL APPLICABILITY

The present invention can be used for, for example, a technique of expressing a nonverbal action in accordance with the reproduction of utterance. In accordance with the present invention, it is possible to automate the association of at least one of voice information and text information with nonverbal information.

DESCRIPTION OF THE REFERENCE SIGNS 10, 210, 710, 710A, 810: Nonverbal information generation model learning apparatus
20, 220, 720: Learning input unit
30, 230, 730, 730A, 830: Learning calculation unit
31, 231, 331, 431: Learning information acquisition unit
32, 232, 332, 432, 732: Learning feature quantity extraction unit
33: Nonverbal information acquisition unit
34: Generation parameter extraction unit
35, 235, 735: Learning unit
36, 63, 236, 263, 736, 763: Learned model storage unit
40, 240, 740, 740A, 840, 1140: Nonverbal information generation apparatus
50, 250, 750: Input unit
60, 260, 760, 760A, 860, 1160: Calculation unit
61, 261, 361, 461: Information acquisition unit
62, 262, 362, 462, 762: Feature quantity extraction unit
64, 264, 764: Nonverbal information generation unit
70, 1190B: Expression unit
237, 338, 437: Learning text analysis unit
238, 438: Learning voice synthesis unit
265, 366, 465: Text analysis unit
266, 466: Voice synthesis unit
337: Learning voice recognition unit
365: Voice recognition unit
731: Learning additional information acquisition unit
731A: Learning additional information estimation unit
761: Additional information acquisition unit
761A: Additional information estimation unit
833: Learning data creation unit
870, 1170: Control unit
1172: Learning data generation unit
1174: Relearning control unit
1190: Display unit
1190A: Display screen
1192: Output unit

The invention claimed is:

1. A nonverbal information generation apparatus comprising: a hardware processor that generates time-information-stamped nonverbal information that corresponds to time-information-stamped text feature quantities on the basis of the time-information-stamped text feature quantities and a learned nonverbal information generation model,
wherein the time-information-stamped text feature quantities are configured to comprise feature quantities that have been extracted from text and time information representing times assigned to predetermined units of the text, and the nonverbal information is information for controlling an expression device that expresses behavior that corresponds to the text.

2. The nonverbal information generation apparatus according to claim 1, wherein the hardware processor performs a text analysis on text that has been input, assigns a playback time when it is assumed that the text will be output externally as voice to the text for each predetermined unit as the time information, and extracts the time-information-stamped text feature quantities.

3. The nonverbal information generation apparatus according to claim 1, wherein the text feature quantities comprise at least one of a dialogue act extracted from the text and thesaurus information.

4. The nonverbal information generation apparatus according to claim 1, further comprising the expression device that expresses the nonverbal information,
wherein the hardware processor controls the expression device so that the time-information-stamped nonverbal information is expressed from the expression device on the basis of time information assigned to the nonverbal information.

5. A non-transitory computer-readable medium having computer-executable instructions that, upon execution of the instructions by a processor of a computer, cause the computer to function as the nonverbal information generation apparatus according to claim 1.

6. A nonverbal information generation apparatus comprising: a hardware processor that generates time-information-stamped nonverbal information that corresponds to time-information-stamped voice feature quantities on the basis of the time-information-stamped voice feature quantities and a learned nonverbal information generation model,
wherein the time-information-stamped voice feature quantities are configured to comprise feature quantities that have been extracted from voice information and time information representing times of predetermined units when the voice information is emitted, and the nonverbal information is information for controlling an expression device that expresses behavior that corresponds to the voice information.

7. The nonverbal information generation apparatus according to claim 6, further comprising the expression device that expresses the nonverbal information,
wherein the hardware processor controls the expression device so that the time-information-stamped nonverbal information is expressed from the expression device on the basis of time information assigned to the nonverbal information.

8. A non-transitory computer-readable medium having computer-executable instructions that, upon execution of the instructions by a processor of a computer, cause the computer to function as the nonverbal information generation apparatus according to claim 6.

9. A nonverbal information generation model learning apparatus comprising:
a hardware processor that:
acquires text information representing text corresponding to voice of a speaker and time information representing times assigned to predetermined units of the text;
acquires nonverbal information representing information relating to behavior of the speaker when the speaker performed speaking corresponding to the text, and time information representing times at which the behavior was performed and corresponding to the nonverbal information, and creates time-information-stamped nonverbal information;
extracts time-information-stamped text feature quantities representing feature quantities of the text information from the acquired text information and the time information corresponding to the text information; and
learns a nonverbal information generation model for generating the acquired time-information-stamped nonverbal information on the basis of the extracted time-information-stamped text feature quantities.

10. The nonverbal information generation model learning apparatus according to claim 9, wherein the text feature quantities comprise at least one of a dialogue act extracted from the text and thesaurus information.

11. A non-transitory computer-readable medium having computer-executable instructions that, upon execution of the instructions by a processor of a computer, cause the computer to function as the nonverbal information generation model learning apparatus according to claim 9.

12. A nonverbal information generation model learning apparatus comprising:
a hardware processor that:
acquires voice information corresponding to voice of a speaker and time information representing times of predetermined units when the voice information is emitted;
acquires nonverbal information representing information relating to behavior of the speaker when the speaker performed speaking corresponding to the voice and time information representing times at which the behavior was performed and corresponding to the nonverbal information, and creates time-information-stamped nonverbal information;
extracts time-information-stamped voice feature quantities representing feature quantities of the voice information from the acquired voice information and the time information corresponding to the voice information; and
learns a nonverbal information generation model for generating the acquired time-information-stamped nonverbal information on the basis of the extracted time-information-stamped voice feature quantities.

13. A non-transitory computer-readable medium having computer-executable instructions that, upon execution of the instructions by a processor of a computer, cause the computer to function as the nonverbal information generation model learning apparatus according to claim 12.

14. A nonverbal information generation model learning apparatus comprising:
  a hardware processor that:
    acquires text information representing text corresponding to voice of a speaker and time information representing times assigned to predetermined units of the text;
    acquires nonverbal information representing information relating to behavior of a listener of speaking of the speaker corresponding to the text when the speaker performed the speaking, and time information representing times at which the behavior was performed and corresponding to the nonverbal information, and creates time-information-stamped nonverbal information;
    extracts time-information-stamped text feature quantities representing feature quantities of the text information from the acquired text information and the time information corresponding to the text information; and
    learns a nonverbal information generation model for generating the acquired time-information-stamped nonverbal information on the basis of the extracted time-information-stamped text feature quantities.

15. The nonverbal information generation model learning apparatus according to claim 14, wherein the text feature quantities comprise at least one of a dialogue act extracted from the text and thesaurus information.

16. A non-transitory computer-readable medium having computer-executable instructions that, upon execution of the instructions by a processor of a computer, cause the computer to function as the nonverbal information generation model learning apparatus according to claim 14.

17. A nonverbal information generation model learning apparatus comprising:
  a hardware processor that:
    acquires voice information corresponding to voice of a speaker and time information representing times of predetermined units when the voice information is emitted;
    acquires nonverbal information representing information relating to behavior of a listener of speaking of the speaker corresponding to the voice when the speaker performed the speaking, and time information representing times at which the behavior was performed and corresponding to the nonverbal information, and creates time-information-stamped nonverbal information;
    extracts time-information-stamped voice feature quantities representing feature quantities of the voice information from the acquired voice information and the time information corresponding to the voice information; and
    learns a nonverbal information generation model for generating the acquired time-information-stamped nonverbal information on the basis of the extracted time-information-stamped voice feature quantities.

18. A non-transitory computer-readable medium having computer-executable instructions that, upon execution of the instructions by a processor of a computer, cause the computer to function as the nonverbal information generation model learning apparatus according to claim 17.

* * * * *